(12) United States Patent
Hirai et al.

(10) Patent No.: US 6,507,709 B2
(45) Date of Patent: Jan. 14, 2003

(54) PHOTOMETRY DEVICE

(75) Inventors: Isamu Hirai, Tokyo (JP); Yoshikazu Iida, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/731,741

(22) Filed: Dec. 8, 2000

(65) Prior Publication Data

US 2001/0003558 A1 Jun. 14, 2001

(30) Foreign Application Priority Data

| Dec. 9, 1999 | (JP) | ............................................ 11-349983 |
| Apr. 20, 2000 | (JP) | ...................................... 2000-119660 |
| Aug. 3, 2000 | (JP) | ...................................... 2000-235358 |
| Aug. 8, 2000 | (JP) | ...................................... 2000-239414 |
| Oct. 31, 2000 | (JP) | ...................................... 2000-332520 |

(51) Int. Cl.[7] ............................................... G03B 7/08
(52) U.S. Cl. ...................................... 396/225; 396/234
(58) Field of Search ................................ 396/225, 233, 396/234

(56) References Cited

U.S. PATENT DOCUMENTS

| 5,289,225 A | 2/1994 | Hirai ........................... 396/121 |
| 5,596,387 A | 1/1997 | Takagi ..................... 396/225 X |
| 5,710,948 A | 1/1998 | Takagi ..................... 396/225 X |
| 5,937,221 A | 8/1999 | Yamamoto et al. ..... 396/225 X |
| 5,987,265 A | 11/1999 | Iwasaki ....................... 396/225 |
| 6,014,525 A | 1/2000 | Ohkura et al. .............. 396/234 |
| 6,175,693 B1 * | 1/2001 | Iida ............................. 396/121 |

FOREIGN PATENT DOCUMENTS

| JP | 5-340804 | 12/1993 | ............. G01J/1/02 |
| JP | 6-281994 | 10/1994 | ............. G03B/7/28 |
| JP | 7-84299 | 3/1995 | ............. G03B/7/28 |
| JP | 10253449 | 9/1998 | ............. G01J/1/44 |

* cited by examiner

*Primary Examiner*—W. B. Perkey
(74) *Attorney, Agent, or Firm*—Greenblum & Bernstein, P.L.C.

(57) ABSTRACT

A photometry device for a camera includes a normal light metering system having spectral sensitivity characteristics close to visual sensitivity characteristics, and a plurality of light metering systems having spectral sensitivity characteristics that are different from those of the normal light metering system. Further provided is an exposure amount determining system that determines an exposure amount of an object in accordance with an output of the normal light metering system, a colorimetry system that judges a color of the object in accordance with the outputs of said plurality of light metering systems. An exposure compensation amount is determined in accordance with the color judged by the colorimetry system, and then, the exposure amount is compensated in accordance with the exposure compensation amount.

36 Claims, 48 Drawing Sheets

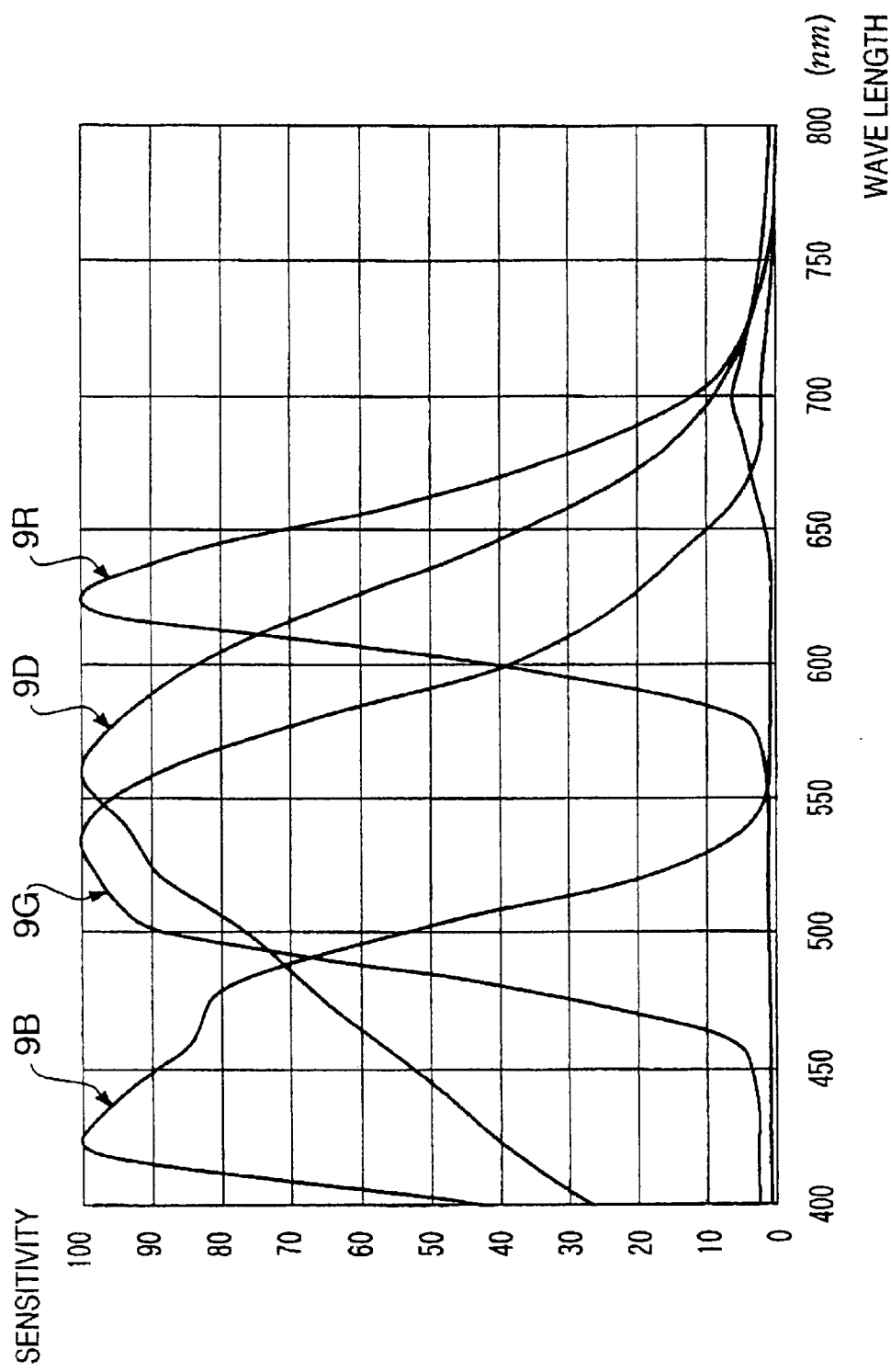

(EEPROM)

|  |  | THvalue | coefficient | CCcoefficient | CCadjustment |
|---|---|---|---|---|---|
| GREEN | g1 | 8 | 3/4 | 0 | 0 |
|  | g2 |  | 3/4 |  |  |
| BLUE | b1 | 8 | 3/4 | 2/16 | 2 |
|  | b2 |  | 3/4 |  |  |
| RED | r1 | 15 | 3/4 | 1/16 | 2 |
|  | r2 |  | 3/4 |  |  |
| MAGENTA | m1 | −40 |  | 0 | 0 |
| YELLOW | y1 | −9 |  | 1 | −4 |
| CYAN | c1 | −40 |  | 0 | 0 |

FIG.17

(EEPROM)

| COLOR | COMPENSATION VALUE |
|---|---|
| Y | −8 |
| M | 0 |
| C | 0 |
| B | +6 |
| G | 0 |
| R | +2 |

FIG.21

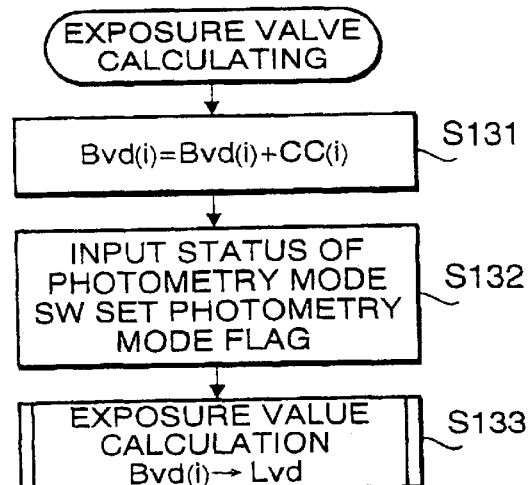
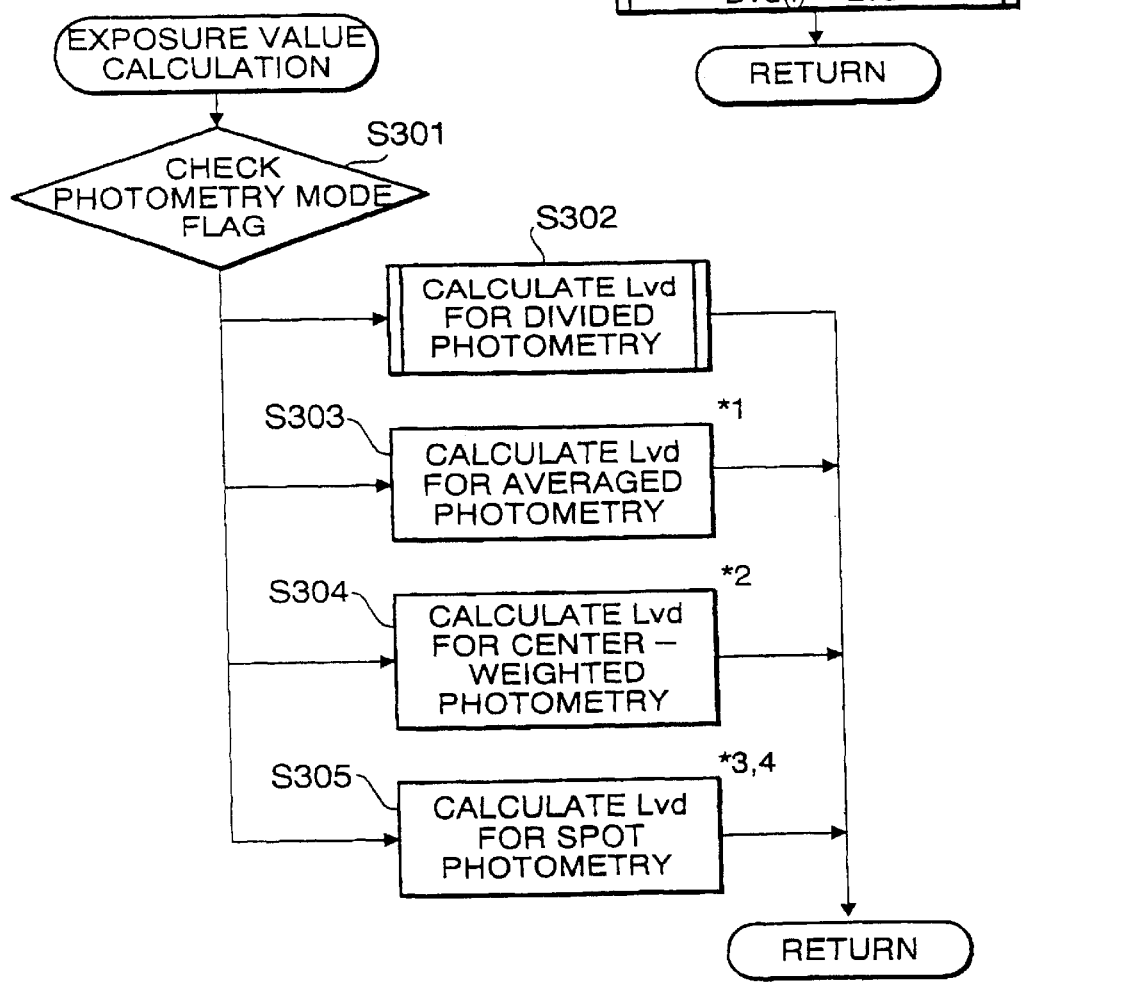

| PROCEDURE | FIG. | PHOTOMETRY SENSOR 12 IS NOT PROVIDE | PHOTOMETRY SENSOR 12 IS PROVIDED |
|---|---|---|---|
| START (MAIN PROCEDURE) | 38 |  | ○ |
| LENS COMMUNICATION | 39 | ○ | ○ |
| PHOTOMETRY SENSOR Bvd CALCULATION (W/O SENSOR 12) | 40 | ○ |  |
| PHOTOMETRY SENSOR Bvd CALCULATION (W/ SENSOR 12) | 53 |  | ○ |
| OPEN APERTURE PHOTOMETRY COMPENSATION CALCULATION | 41 | ○ | ○ |
| COLORIMETRY | 42 | ○ | ○ |
| LIGHT SOURCE COMPENSATION (W/O SENSOR 12) | 43 | ○ |  |
| LIGHT SOURCE COMPENSATION (W/ SENSOR 12) | 54 |  | ○ |
| LIGHT SOURCE DIFFERENCE COMPENSATION | 44 | ○ | ○ |
| COLORIMETRIC | 45 | ○ | ○ |
| COLORIMETRIC CONSTANT SETTING | 46 | ○ | ○ |
| READ CONSTANTS FROM EEPROM | 47 | ○ | ○ |
| COLOR JUDGMENT | 48 | ○ | ○ |
| COLORIMETRIC COMPENSATION VALUE CALCULATION | 49 | ○ | ○ |
| COLORIMETRIC COMPENSATION VALUE (EEPROM) | 50 | ○ | ○ |
| COLORIMETRIC COMPENSATION VALUE CALCULATION | 51 | ○ | ○ |
| EXPOSURE VALUE CALCULATING | 52 | ○ | ○ |
| EXPOSURE VALUE CALCULATION |  |  |  |
| DIVIDED PHOTOMETRY Lvd CALCULATION |  |  |  |

FIG.37

| | | THRESHOLD VALUE | COLORIMETRIC COMPENSATION COEFFICIENT | CCadjustment VALUE |
|---|---|---|---|---|
| | | THvalue·b1,y1 | CCcoefficient ·b1,y1 | CCadjustment ·b1,y1 |
| B | b1 | 8 | 2/16 | 2 |
| Y | y1 | −9 | 1 | −4 |

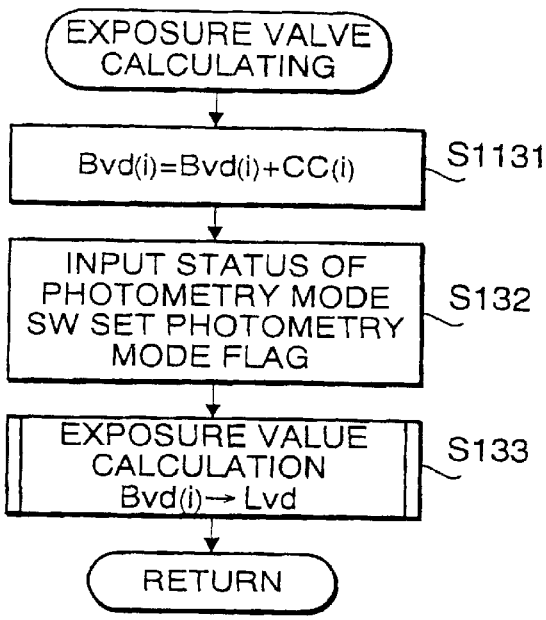
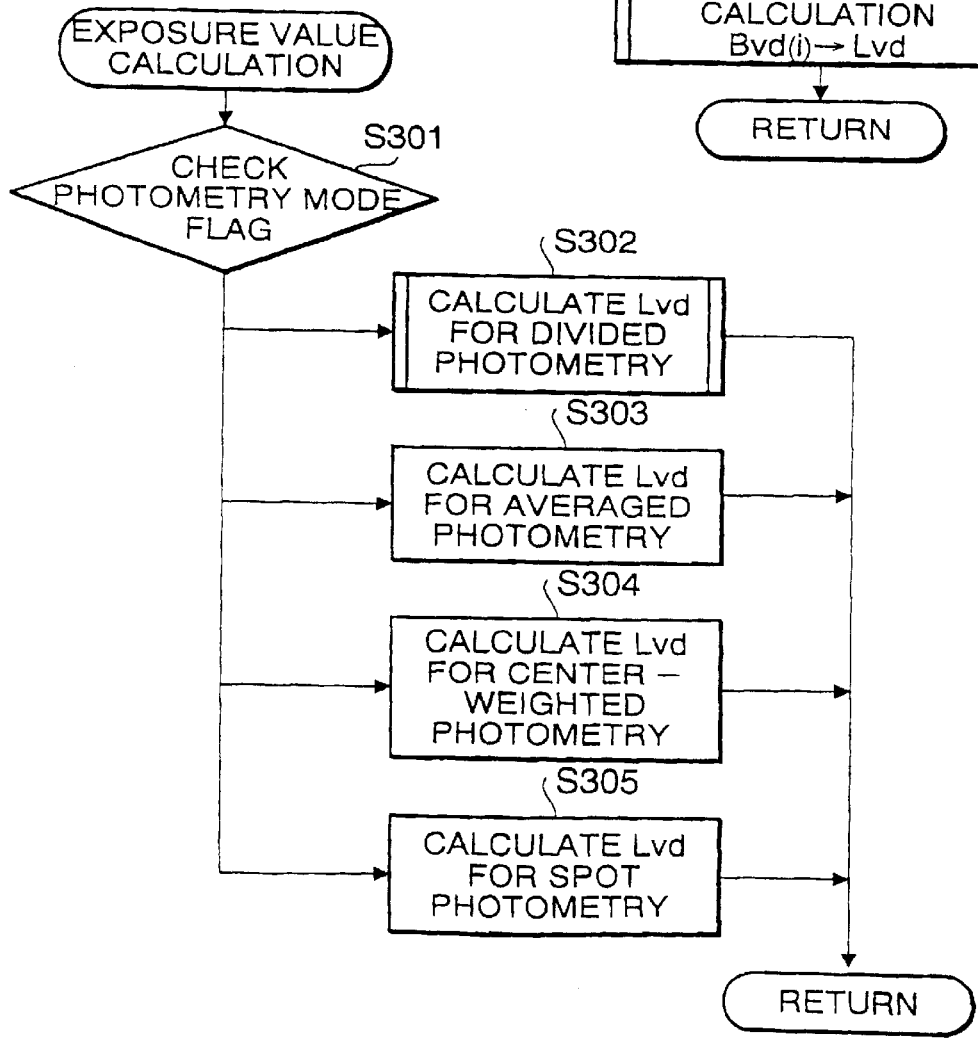

PHOTOMETRY DEVICE

BACKGROUND OF THE INVENTION

The present invention relates to a photometry device applicable to an SLR (Single Lens Reflex) camera, and more particularly to a photometry device with which exposure errors due to a difference of reflectivity of objects having different colors can be compensated.

Recently, in most of cameras, reflection type photometry devices are employed. The reflection type photometry device receives the light, which is reflected by an object and passed through an observing optical system of a camera, using a light receiving element, determines the brightness of the object based on the output of the measured value, and then calculates the exposure value of the camera based on the measured brightness. However, this type of the photometry device cannot detect the color of the object because of its structure. Accordingly, in such a device, the reflectivity of an object is generally assumed to be 18% and the exposure parameter is determined on this assumption. Therefore, regarding a whitish object whose reflectivity is greater than 18%, the brightness is measured as greater than the actual brightness. If the camera controls an exposure operation based on thus determined exposure value, the object is under exposed. A dark object whose reflectivity is less than 18% is measured to have a lower brightness. Therefore, such an object is over exposed. The difference of the reflectivity of the object may also occur depending on the color of the object. For example, when the color of an object is yellow, the reflectivity may be up to 70%. In such a case, if the standard exposure value is for the object whose reflectivity is 18%, the exposure value is approximately 2 Ev lower than necessary. If the object color is blue, the reflectivity is approximately 9%. In this case, the object is over exposed by approximately 1 Ev greater than necessary.

Therefore, in the conventional photometry device, photographer should guess the reflectivity of the object. Then, based on the reflectivity determined by the photographer, the exposure is controlled such that, if the object is a whitish or yellowish one having a relatively high reflectivity, it is to be overexposed, and if the object is a blackish or bluish one having a relatively low reflectivity, it is to be underexposed. With this operation, the above-described defects may be solved. However, to guess the reflectivity of the object and control the exposure can be done by only experienced and skilled photographers. It is impossible to require all the photographers to do such an operation. Further, it is not preferable that a manual operation of the photographer is required for exposure. Further, if such a manual operation is required, cameras become unsuitable for recent trend of the automatic photographing.

SUMMARY OF THE INVENTION

It is therefore an object of the invention to provide an improved photometry device with which appropriate exposure values can be obtained regardless of difference of reflectivity of the objects.

For the above object, according to an aspect of the invention, there is provided a photometry device for a camera, which is provided with a normal light metering system having spectral sensitivity characteristics close to visual sensitivity characteristics, a plurality of light metering systems having spectral sensitivity characteristics that are different from those of the normal light metering system, an exposure amount determining system that determines an exposure amount of an object in accordance with an output of the normal light metering system, a colorimetry system that judges a color of the object in accordance with the outputs of the plurality of light metering systems, a compensation amount determining system that determines an exposure compensation amount in accordance with the color judged by the colorimetry system; and a controller that compensates for the exposure amount determined by the exposure amount determining system in accordance with the exposure compensation amount.

With this configuration, since the exposure amount, which is determined similarly to a procedure in the conventional art is compensated in accordance with the color of the object. Therefore, regardless of the color of the object, an appropriate exposure value can be obtained.

Optionally, the normal light metering system may include a normal light photometry sensor, the spectral sensitivity characteristic of which has a peak sensitivity at a wavelength within a range from 500 nm through 600 nm, and the colorimetry system may include at least a first photometry sensor and a second photometry sensor, the peak sensitivity of the spectral sensitivity characteristic of the first photometry sensor is on a shorter wavelength side with respect to the peak sensitivity of the normal light photometry sensor, and the peak sensitivity of the spectral sensitivity characteristic of the second photometry sensor is on a longer wavelength side with respect to the peak sensitivity of the normal light photometry sensor.

Further optionally, the calorimetric system may include, a blue light photometry sensor that meters blue light, a green light photometry sensor that meters green light, and a red light photometry sensor that meters red light.

The photometry device may be configured such that the colorimetry system judges at least yellow, blue and red from among yellow, magenta, cyan, blue, green and red, in accordance with the outputs of the plurality of photometry sensors, the compensation amount determining system determines the exposure compensation amount in an over exposure side if the colorimetry system judges the color is yellow, and the compensation amount determining system determines the exposure compensation amount in an under exposure side if the colorimetry system judges the color is blue or red.

In this case, the compensation amount determining system may determine the compensation amount is zero if the colorimetry system judges the color is magenta, cyan or green.

Still optionally, each of the normal light metering system, and the plurality of light metering systems has divided photometry areas, the exposure amount determining system and compensation amount determining system determining the exposure amount and the exposure compensation amount in accordance with the metering amount obtained for each of the divided photometry areas.

In such a case, the colorimetry system may judge the color of the object at each of the photometry areas, and the compensation amount determining system determines the exposure compensation amount for each of the photometry areas.

Further, the exposure amount determining system may determine an exposure compensation amount for the entire object by applying a predetermined calculation to the exposure compensation amounts obtained for the plurality of photometry areas.

Optionally, the normal light metering system and the plurality of light metering systems are arranged on an eyepiece optical system side of a pentagonal prism of an single lens reflex camera, at least the normal light metering system being arranged at an upper central portion of the pentagonal prism.

In such a case, at the upper central portion of the pentagonal prism, the normal light metering system and the green light metering sensor are arranged side by side, the blue sensor and the red sensor being arranged at right-and-left portions of the eyepiece optical system.

In a particular case, the green light metering sensor may double as the normal light metering system.

In this case, the green light metering sensor is arranged at the upper central portion of the pentagonal prism, the blue sensor and the red sensor being arranged at right-and-left portions of the eyepiece optical system.

According to another aspect of the invention, there is provided a photometry device for a camera, which is provided with a normal light metering system having spectral sensitivity characteristics close to visual sensitivity characteristics, the normal light metering system dividing a photometry area into a plurality of areas and performing photometry for each of the plurality of areas, a plurality of light metering systems having spectral sensitivity characteristics that are different from those of the normal light metering system, each of the plurality of light metering system executing photometry for each of the plurality of areas, a brightness determining system that determines a brightness value of the object at each of the plurality of areas in accordance with the output of the normal light metering system, a colorimetry system that judges a color of the object at each of the plurality of areas in accordance with the outputs of the plurality of light metering systems, a compensation amount determining system that determines compensation amounts of the brightness values for the plurality of areas, respectively, in accordance with the colors of the plurality of areas judged by the colorimetry system, a compensation system that compensates for the brightness values of the plurality of areas in accordance with the compensation amounts, respectively, and an exposure amount determining system that determines an exposure amount in accordance with the compensated brightness amounts.

Optionally, the normal light metering system includes a normal light photometry sensor, the spectral sensitivity characteristic of which has a peak sensitivity at a wavelength within a range from 500 nm through 600 nm, and the colorimetry system includes at least a first photometry sensor and a second photometry sensor, the peak sensitivity of the spectral characteristic of the first photometry sensor is on a shorter wavelength side with respect to the peak sensitivity of the normal light photometry sensor, and the peak sensitivity of the spectral sensitivity characteristic of the second photometry sensor is on a longer wavelength side with respect to the peak sensitivity of the normal light photometry sensor.

Further, the colorimetric system may include a blue light photometry sensor that meters blue light, a green light photometry sensor that meters green light, and a red light photometry sensor that meters red light.

Furthermore, the colorimetry system judges at least yellow, blue and red from among yellow, magenta, cyan, blue, green and red, in accordance with the outputs of the plurality of photometry sensors, and wherein the compensation amount determining system determines the compensation amount in an over exposure side if the colorimetry system judges the color is yellow, and wherein the compensation amount determining system determines the compensation amount in an under exposure side if the colorimetry system judges the color is blue or red.

In this case, the compensation amount determining system determines the compensation amount is zero if the colorimetry system judges the color is magenta, cyan or green.

Further optionally, each of the normal light metering system and the plurality of light metering systems has divided photometry areas, the brightness amount determining system and compensation amount determining system determining the brightness value and the compensation amount in accordance with the metering amount obtained for each of the divided photometry areas.

In this case, the exposure amount determining system has at least one of, (a) a function of determining the exposure amount by performing a divided photometry in accordance with a predetermined algorithm based on the compensated brightness values for the plurality of photometry areas, (b) a function of determining the exposure amount by averaging the compensated brightness values for the plurality of photometry areas, respectively, (c) a function of determining the exposure amount by performing the center-weighted averaging of the brightness values, and (d) a function of determining the exposure amount by selecting one of the brightness values corresponding to the plurality of areas.

Further, the exposure amount determining system may determine the exposure value in accordance with the brightness values at a plurality of photometry areas corresponding to the areas at which focusing is performed.

In a particular case, the at least one of the functions is selectable.

Still optionally, the normal light metering system and the plurality of light metering systems are arranged on an eyepiece optical system side of a pentagonal prism of an single lens reflex camera, at least the normal light metering system being arranged at an upper central portion of the pentagonal prism.

Optionally, at the upper central portion of the pentagonal prism, the normal light metering system and the green light metering sensor are arranged side by side, the blue sensor and the red sensor being arranged at right-and-left portions of the eyepiece optical system.

Still optionally, the green light metering sensor doubles as the normal light metering system, and wherein the output of the green light metering sensor is regarded as the output of the normal light metering system.

According to a further aspect of the invention, there is provided a photometry device for a camera, which is provided with a normal light metering system having spectral sensitivity characteristics close to visual sensitivity characteristics, a first metering system, a spectral sensitivity characteristic of which has a peak sensitivity at a wavelength greater than 500 nm, a second metering system, a spectral sensitivity characteristic of which has a peak sensitivity at a wavelength shorter than 500 nm, a colorimetry system that determines a color of an object by comparing the outputs of the first metering system and the second metering system, a compensation amount determining system that determines a compensation value based on the determined color of the object, and an exposure amount determining system that determines an exposure amount in accordance with the output of the normal light metering system and the compensation amount.

Optionally, the first metering system doubles as the normal light metering system.

Further optionally, color metered by the first metering system is a complement color metered by the second metering system.

Still optionally, the first metering system may include a green light metering sensor that meters a green light component, and the second metering system includes a blue light metering sensor that meters a blue light component.

Furthermore, the first metering system and the second metering system may include photometry sensors having substantially the same characteristics, and optical filters arranged in front of the photometry sensors, respectively, the optical filters having the spectral sensitivity characteristics defining those of the first metering system and the second metering system, respectively.

Further, the photometry device may be provided with a beam splitter that splits at least part of light passed through a photographing lens of the camera into a first beam and a second beam, a wavelength range of the first beam and a wavelength range of the second beam being different from each other, the first metering system and the second metering system include photometry sensors having substantially the same characteristics, the first beam being incident on the first metering system, the second beam being incident on the second metering system.

Still optionally, the normal light metering system, the first metering system and the second metering system receive light passed through a photographing lens of the camera, respectively Further, the photometry device may include a light source metering system that meters the light of an external light source illuminating the object, the outputs of the first metering system and the second metering system being compensated in accordance with the output of the light source metering system.

Further, each of the normal light metering system, and the first and second metering systems has divided photometry areas, the colorimetry system determining the color of the object at each of the divided photometry areas, the compensation amount determining system determining compensation amount of the brightness values in accordance with the colors determined by the colorimetry system, the exposure amount determining system compensating the brightness value at each of the photometry areas output by the normal light metering system in accordance with the compensation amount, and determining the exposure amount in accordance with the compensated brightness values.

In such a case, the exposure amount determining system may have at least one of (a) a function of determining the exposure amount by performing a divided photometry in accordance with a predetermined algorithm based on the compensated brightness values for the plurality of photometry areas, (b) a function of determining the exposure amount by averaging the compensated brightness values for the plurality of photometry areas, respectively, (c) a function of determining the exposure amount by performing the enter-weighted averaging of the brightness values, and (d) a function of determining the exposure amount by selecting one of the brightness values corresponding to the plurality of areas.

Further, the exposure amount determining system determines the exposure value in accordance with the brightness values at a plurality of photometry areas corresponding to the areas at which focusing is performed.

Optionally, the at least one of the functions is selectable

Furthermore, the normal light metering system and the first and second light metering systems are arranged on an eyepiece optical system side of a pentagonal prism of an single lens reflex camera, at least the normal light metering system being arranged at an upper central portion of the pentagonal prism.

Still optionally, the first and second metering systems are arranged at right-and-left portions, on the eyepiece optical system side of a trapezoidal prism of the camera.

BRIEF DESCRIPTION OF THE ACCOMPANYING DRAWINGS

FIG. 1 shows a perspective view of a camera employing a photometry device according to the invention;

FIG. 2 schematically shows main components of the camera;

Figure 4A:
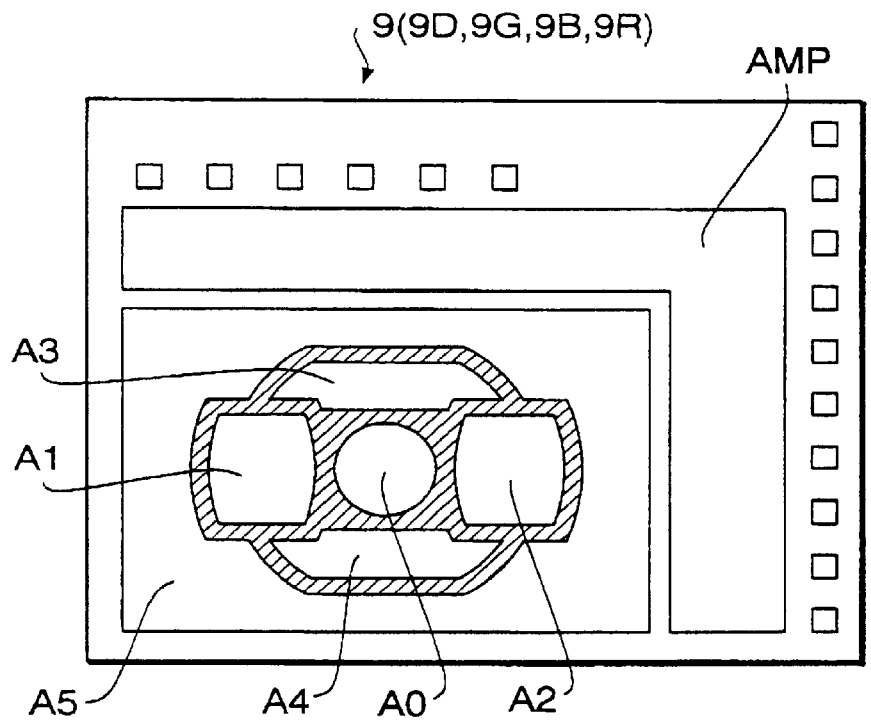
Figure 4B:
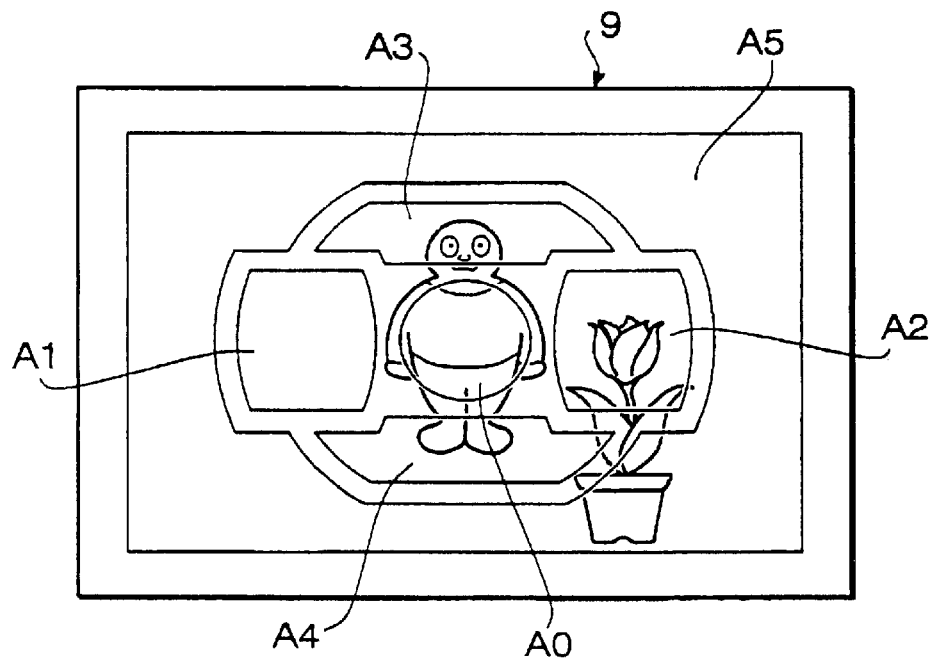
Figure 6:
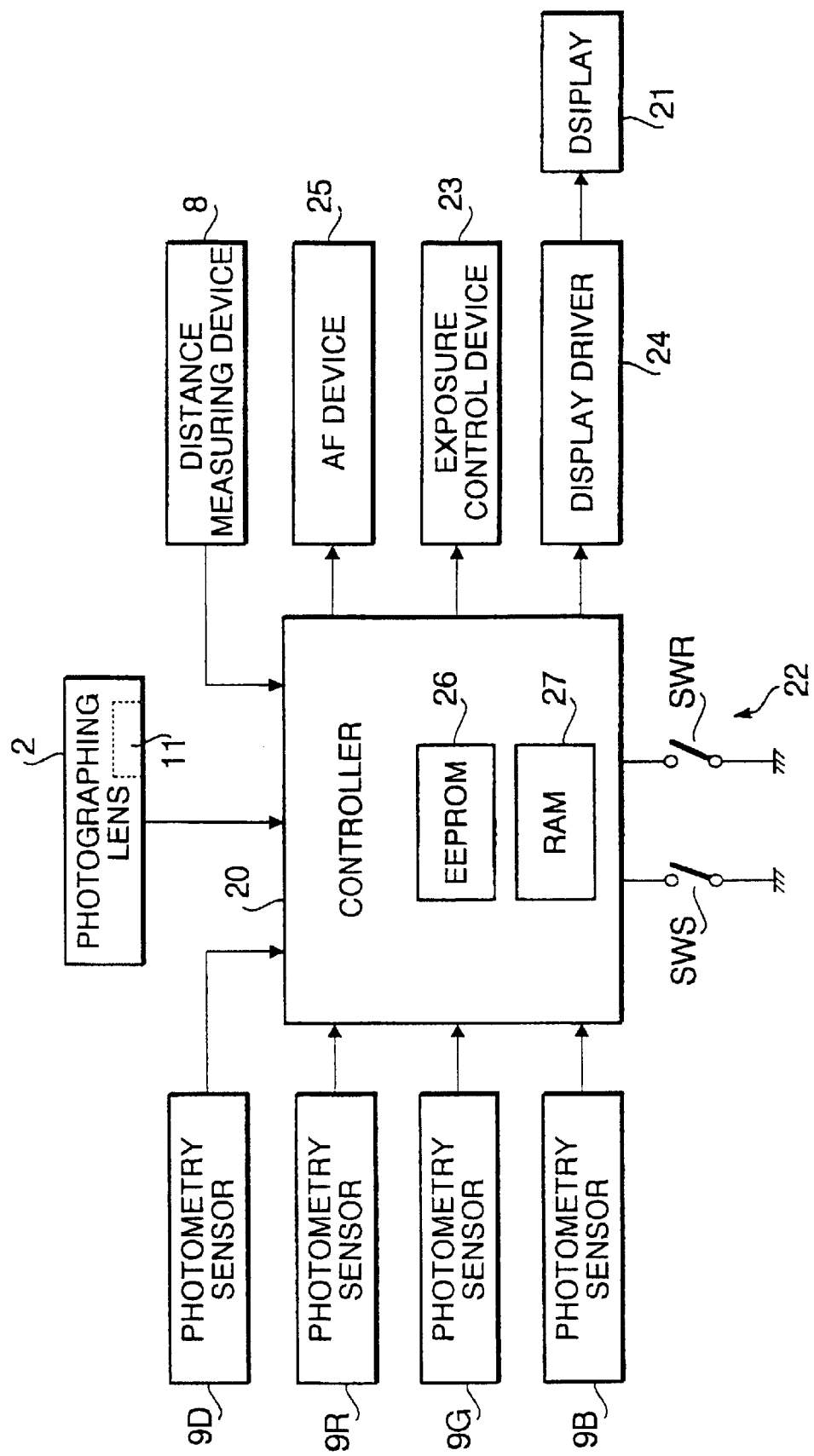
Figure 7:
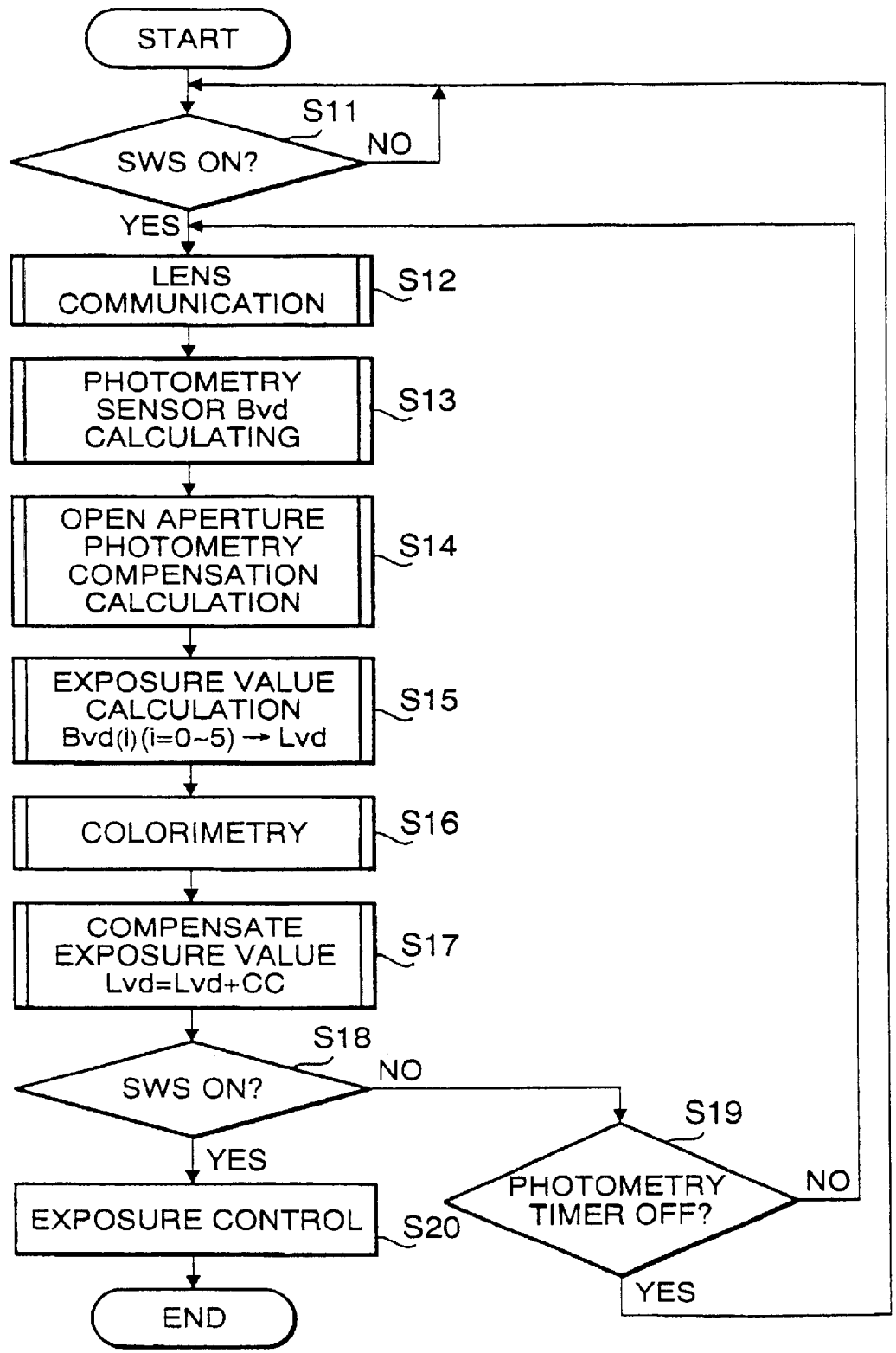
Figure 8:
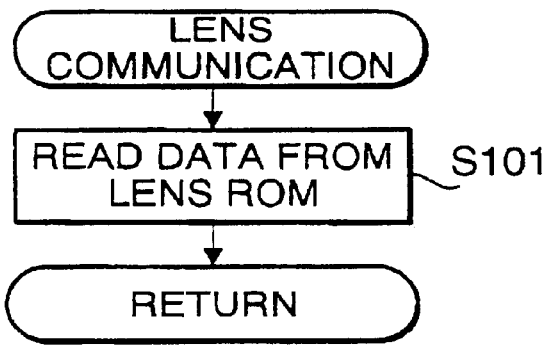
Figure 9:
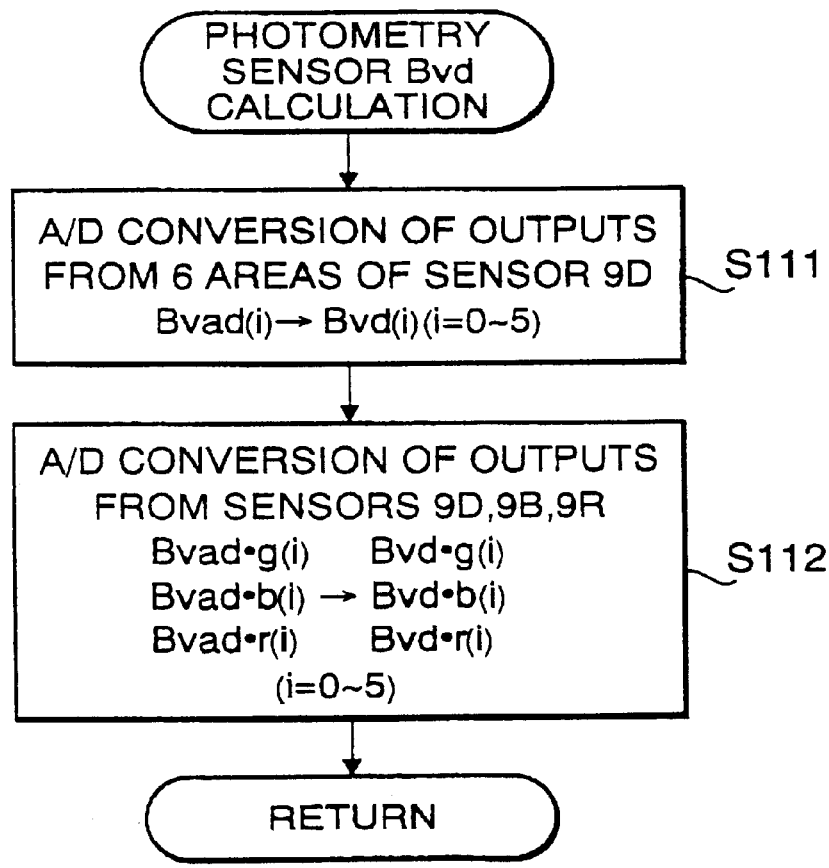
Figure 10:
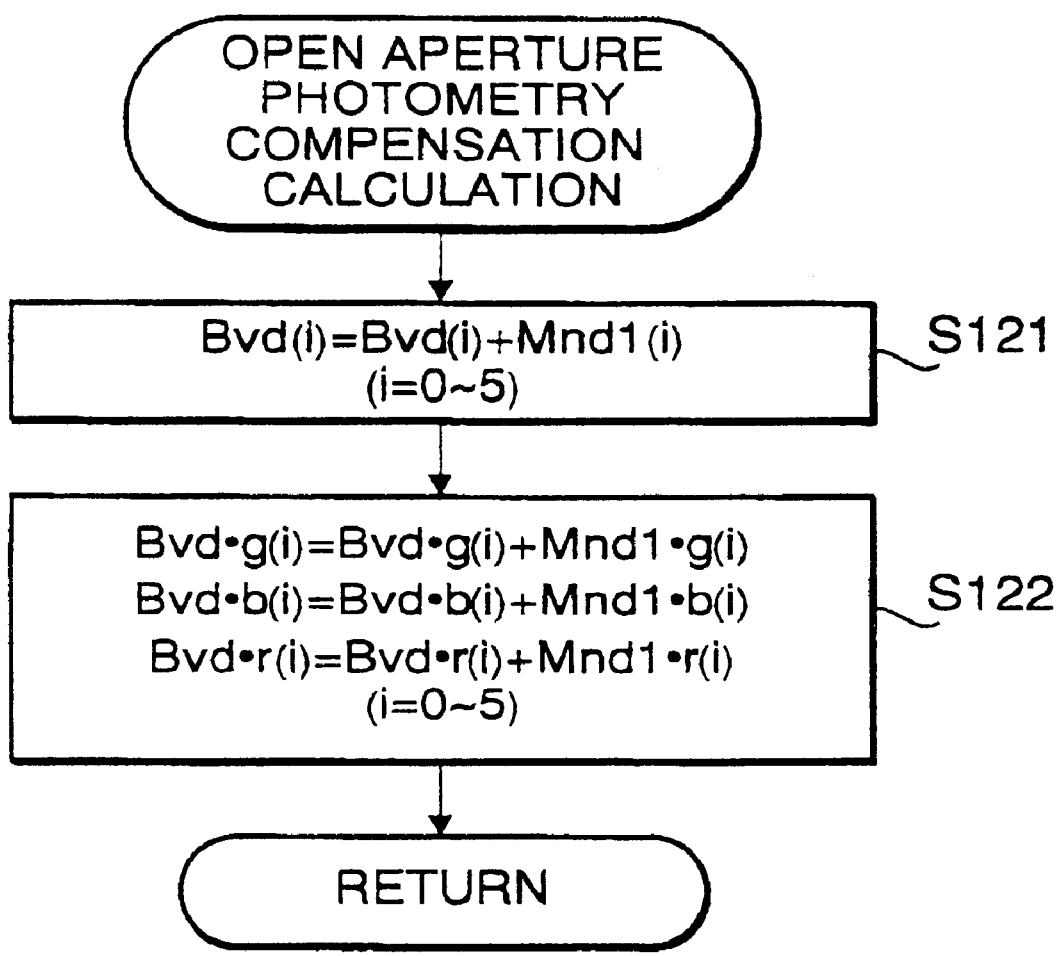
Figure 11:
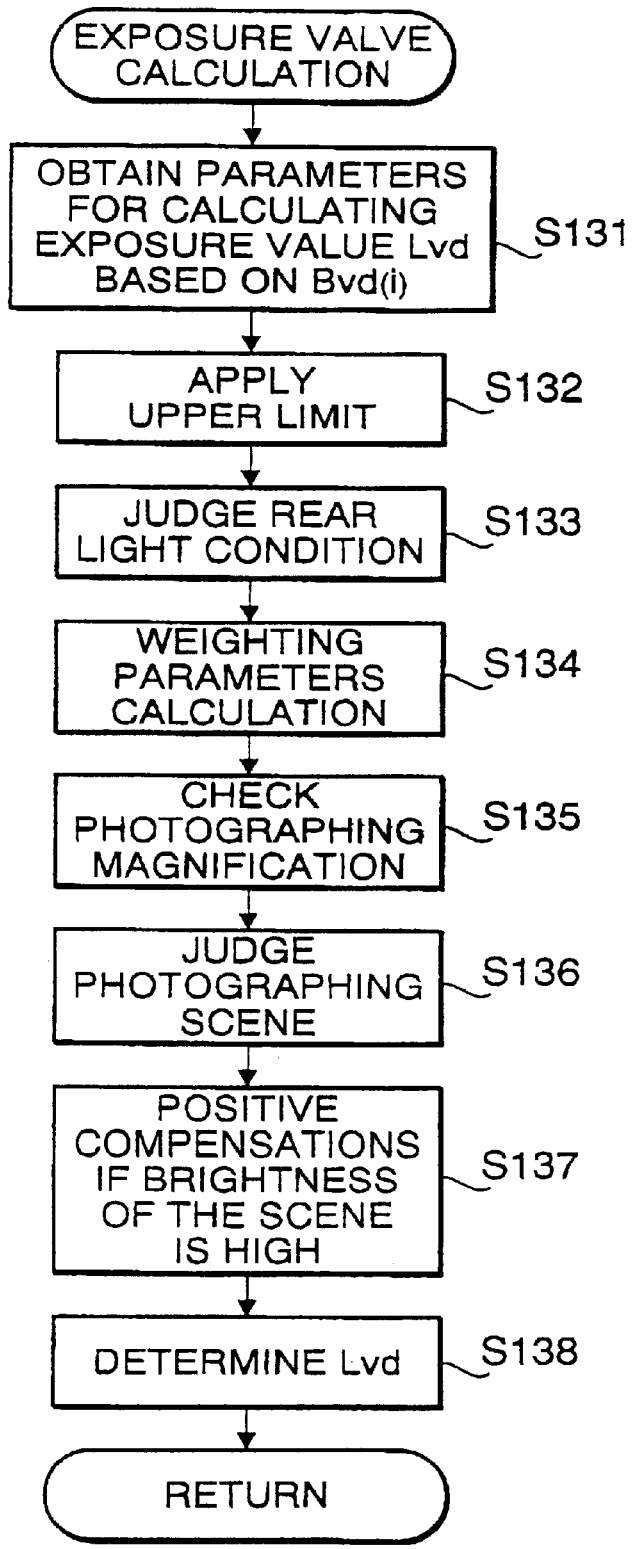
Figure 12:
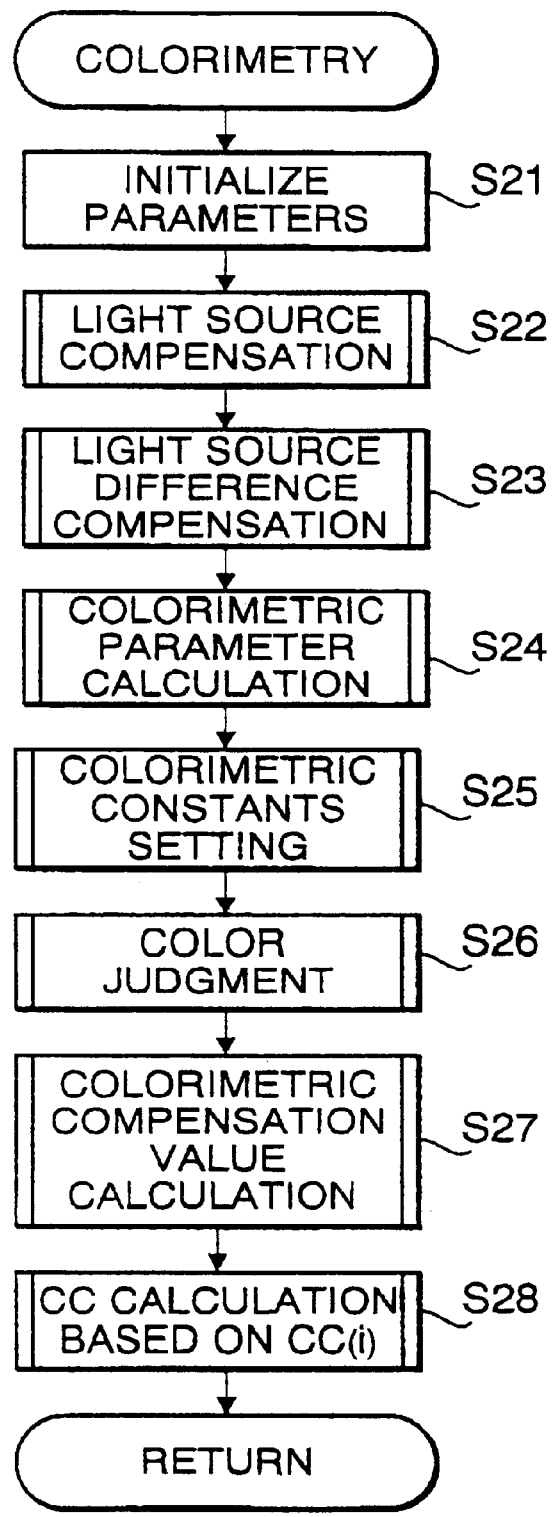
Figure 13:
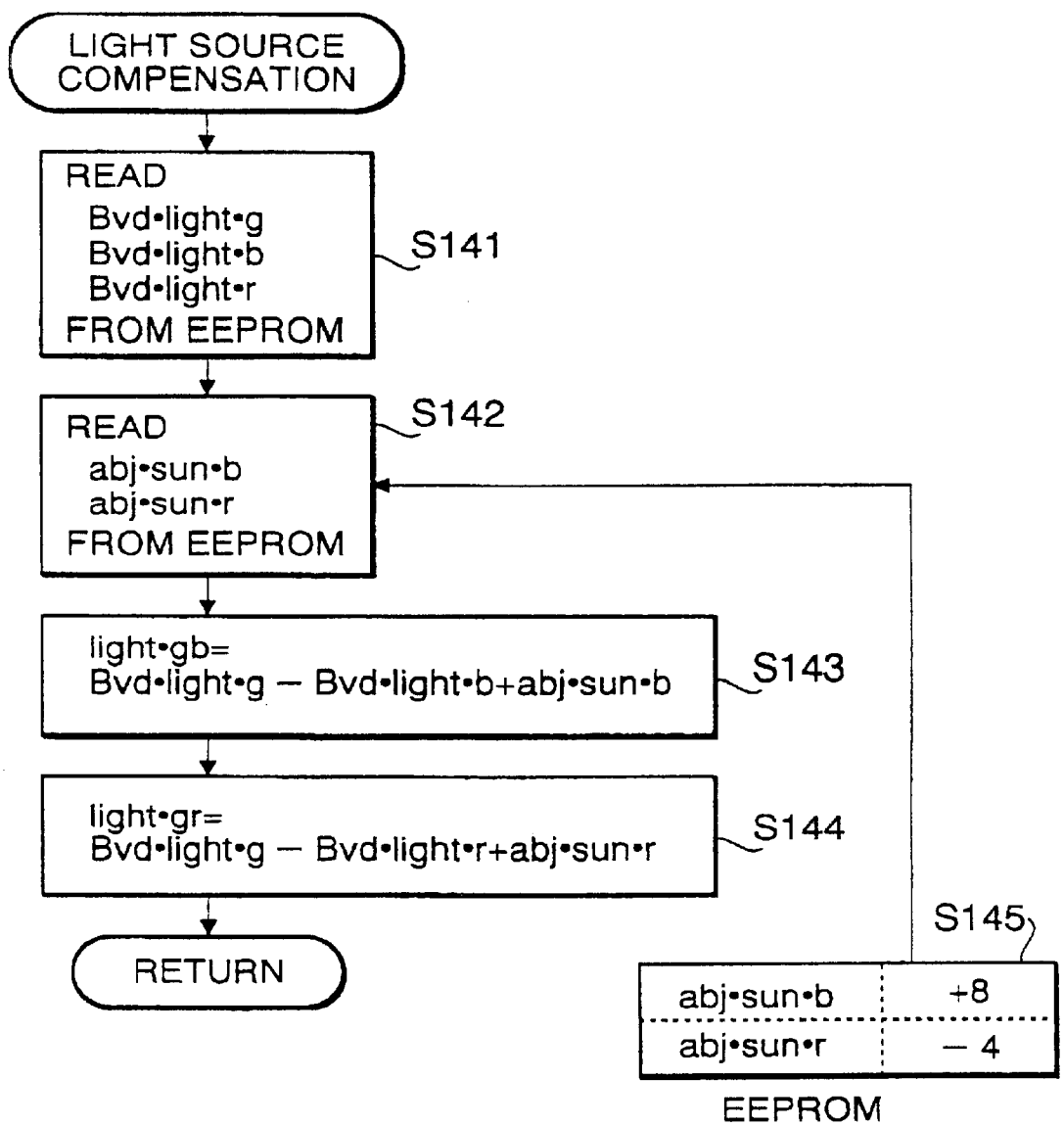
Figure 14:
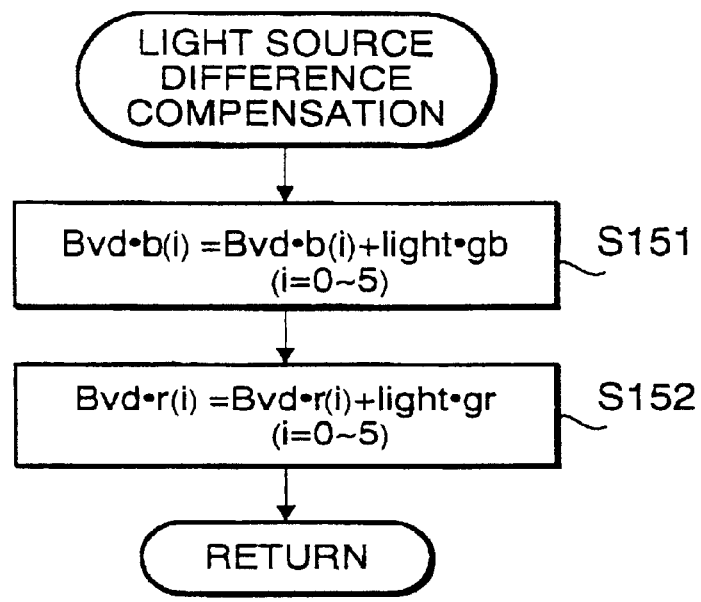
Figure 15:
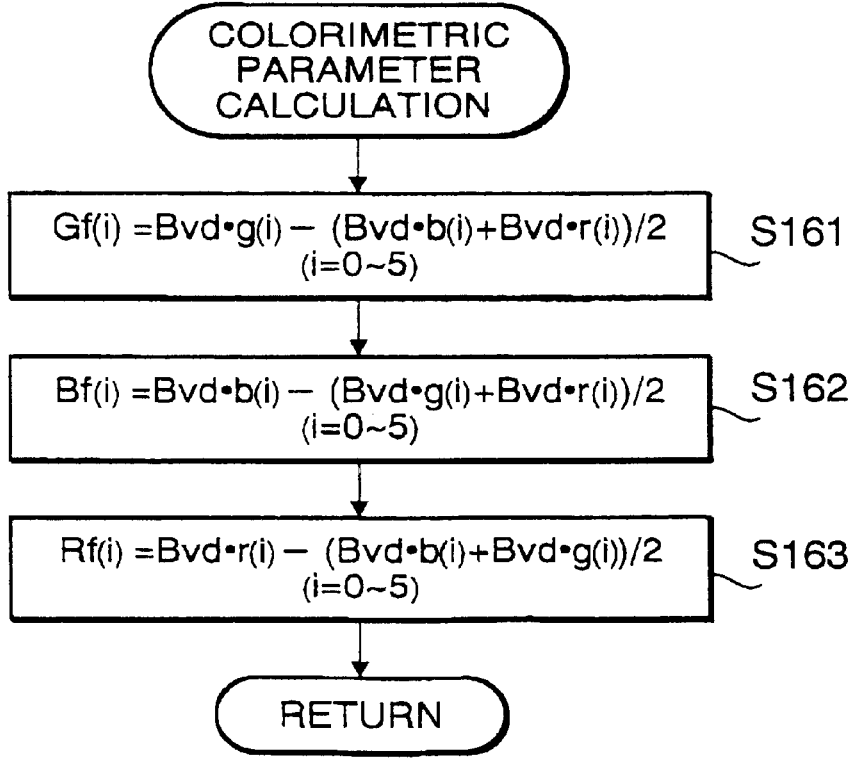
Figure 16:
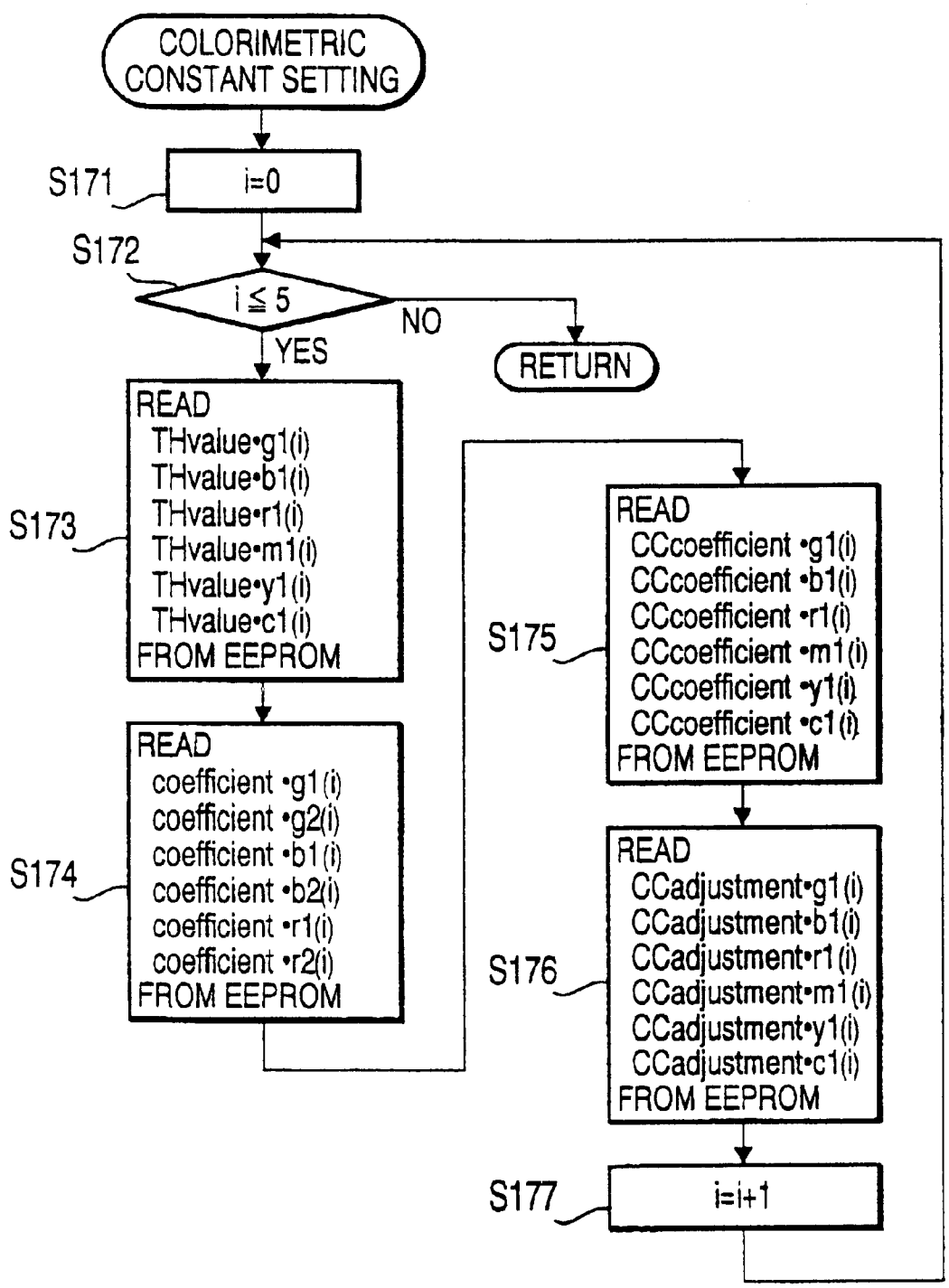
Figure 18:
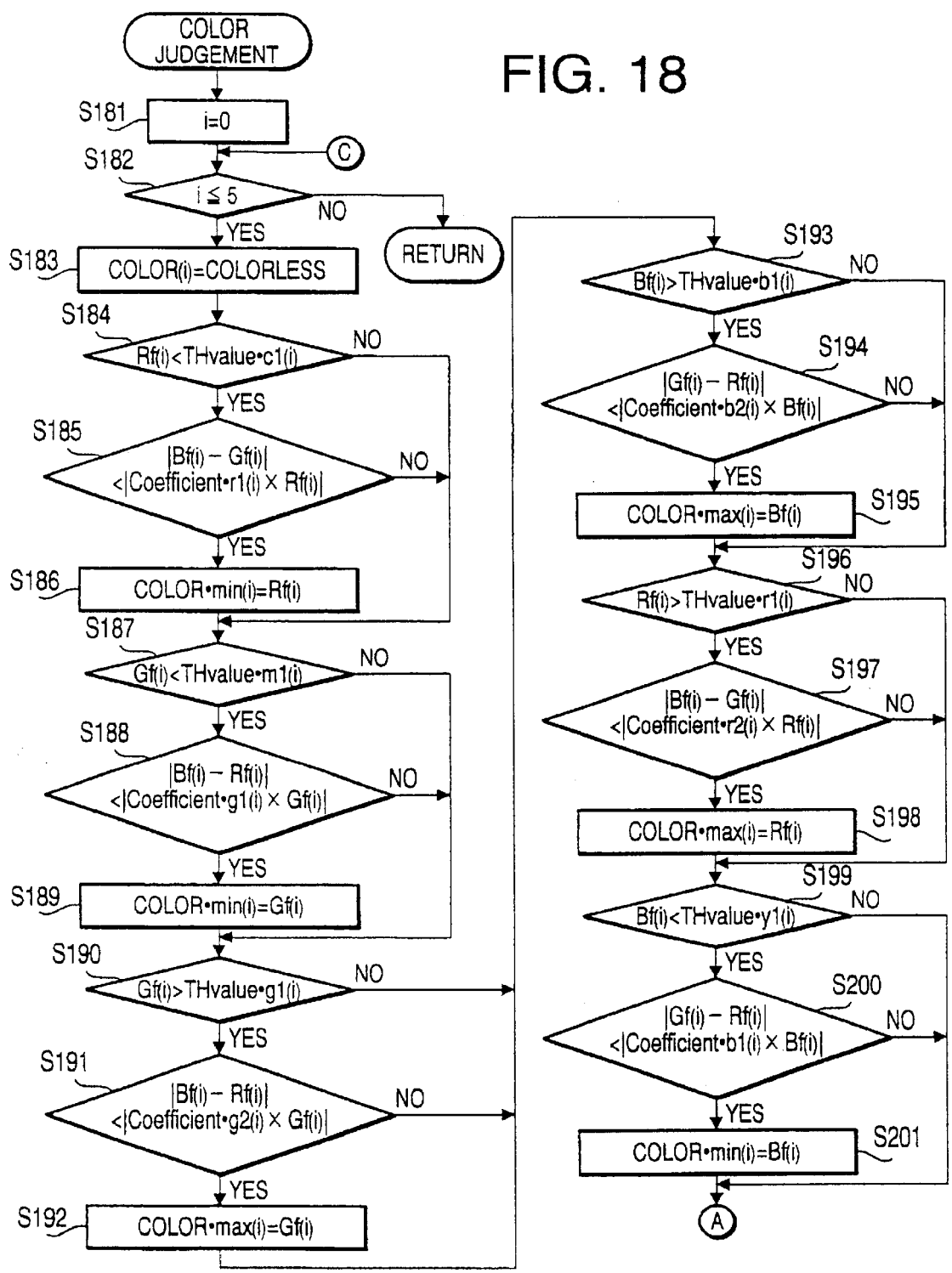
Figure 19:
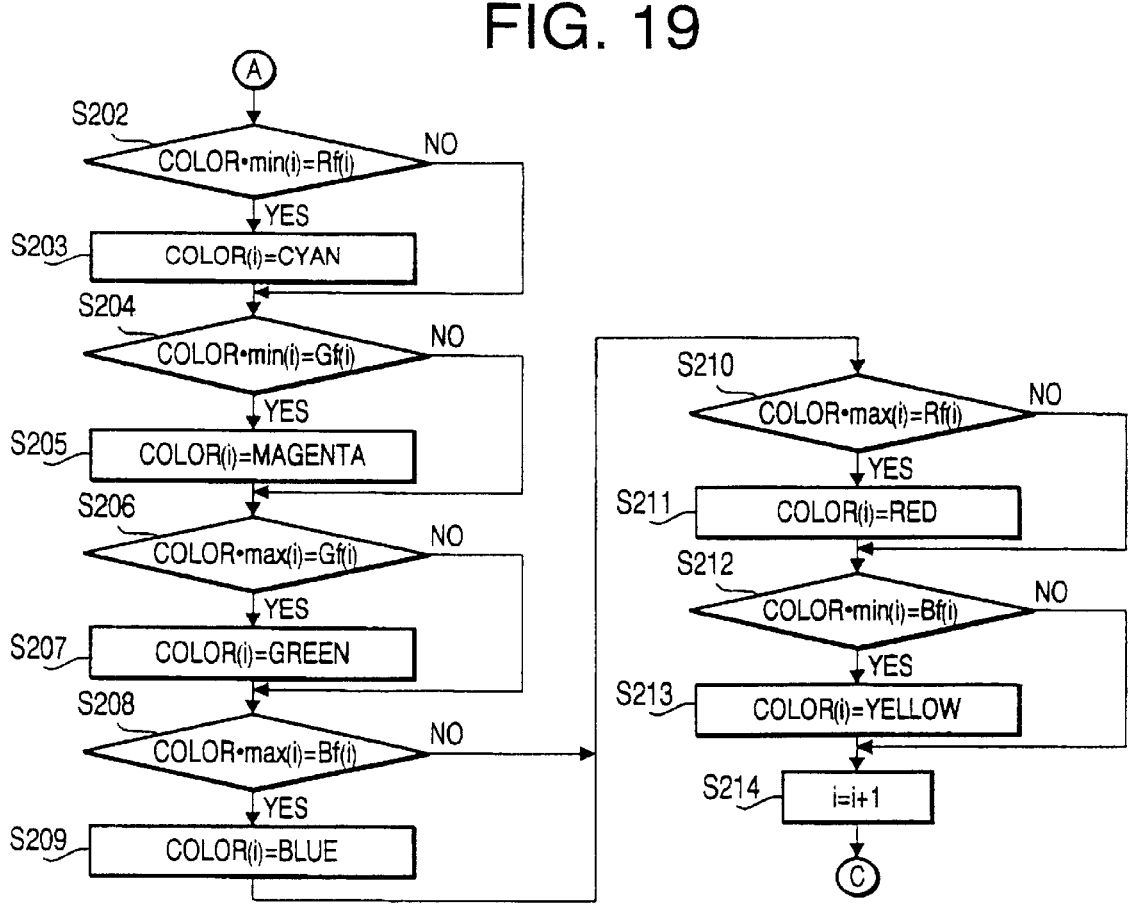
Figure 20:
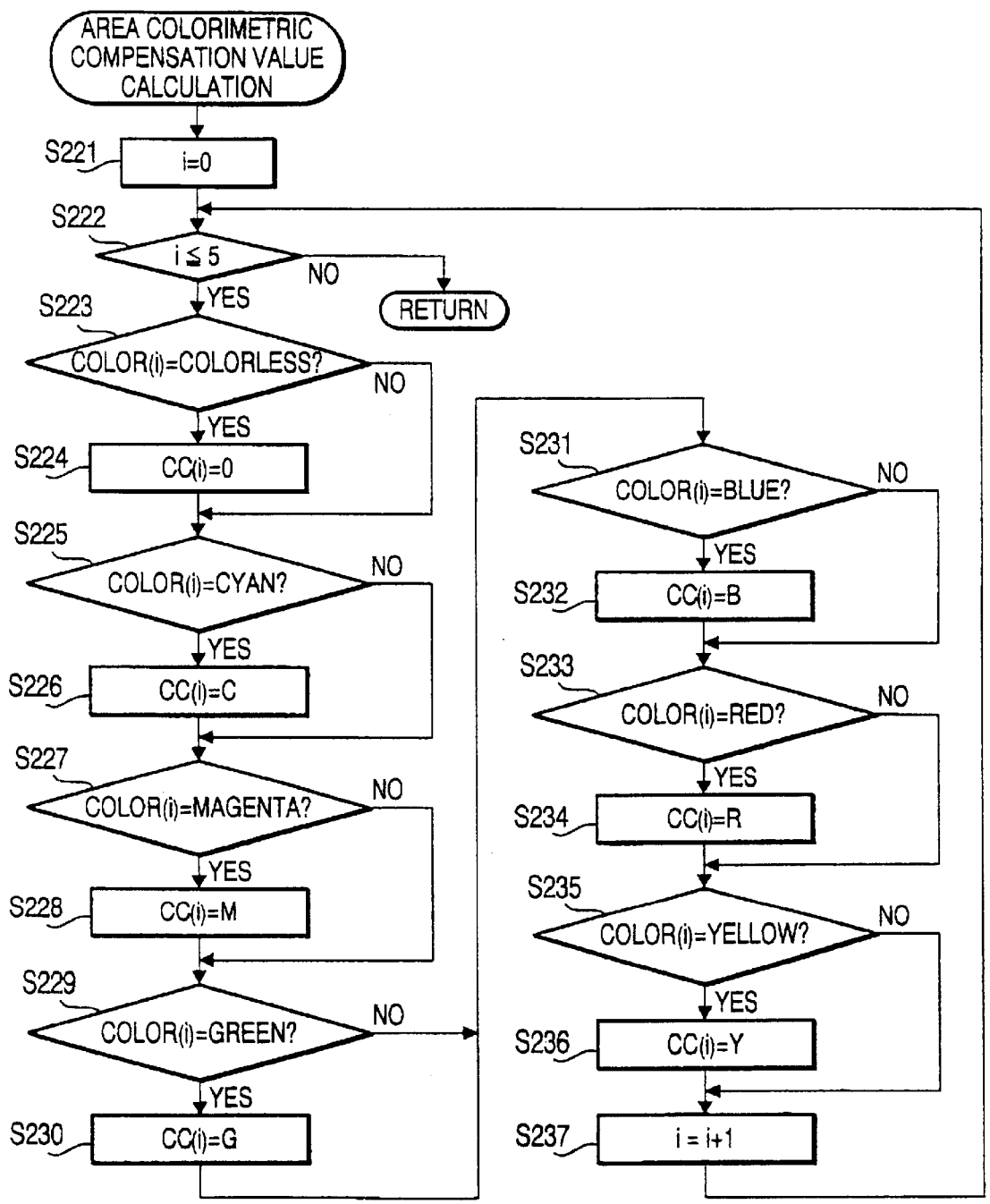
Figure 22:
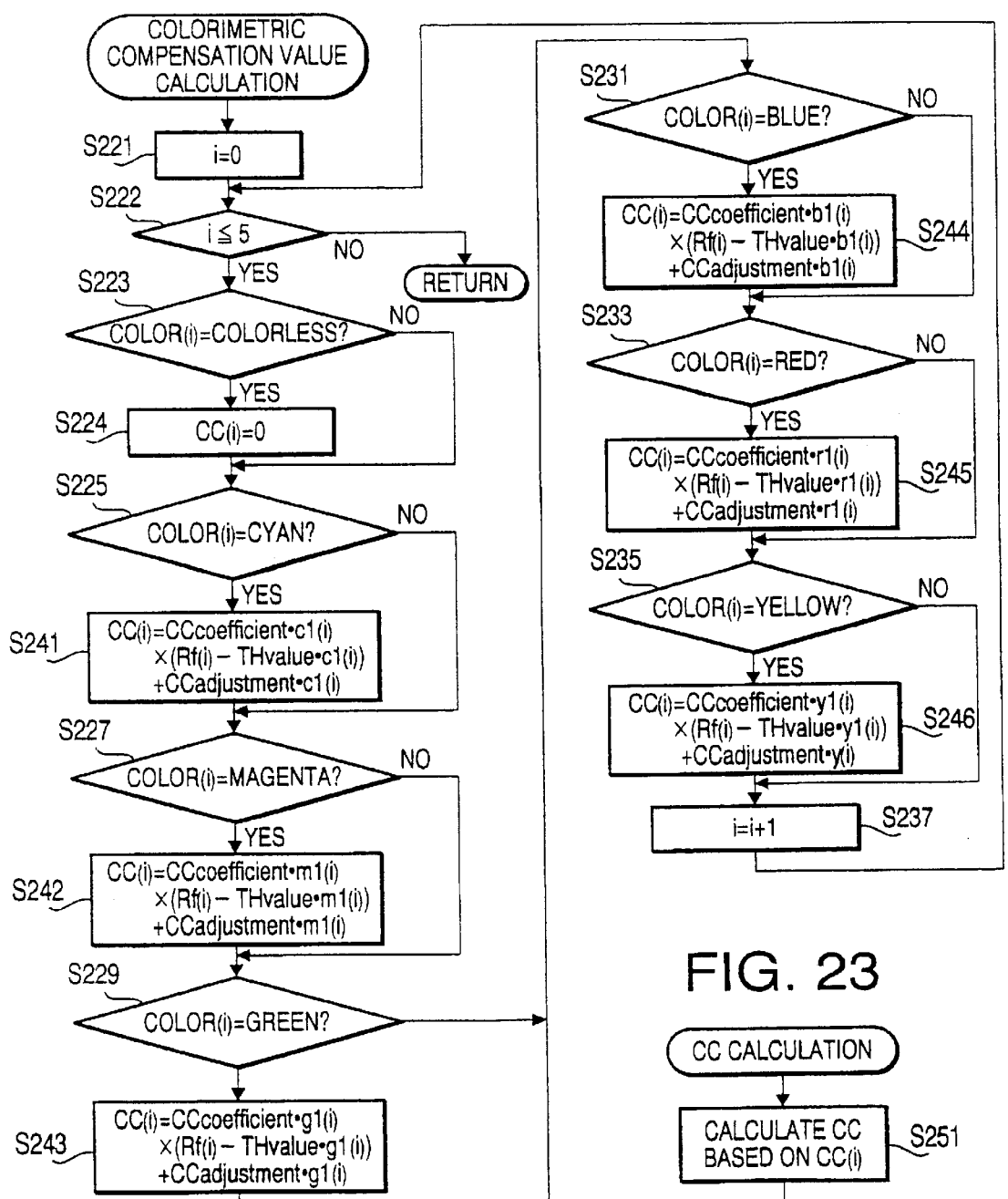
Figure 23:
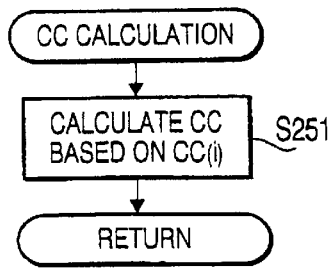
Figure 24:
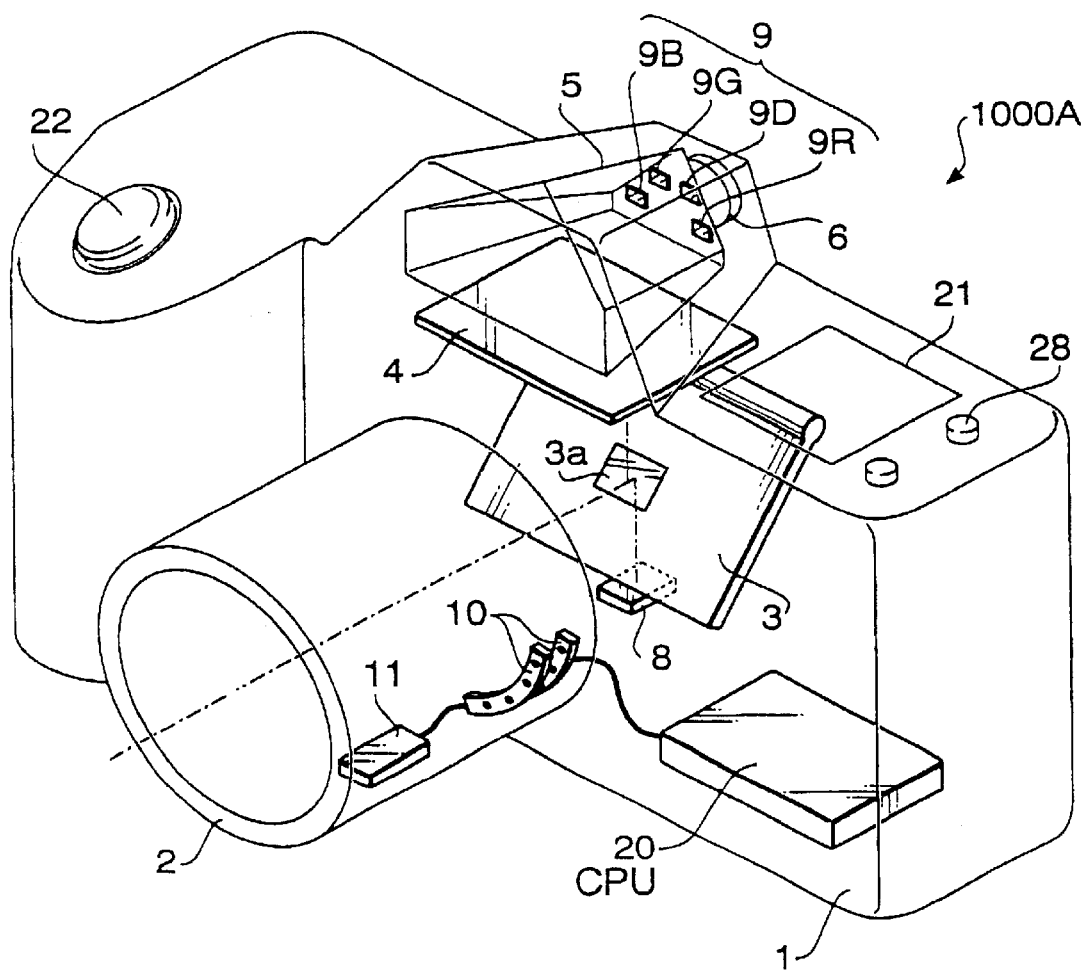
Figure 25:
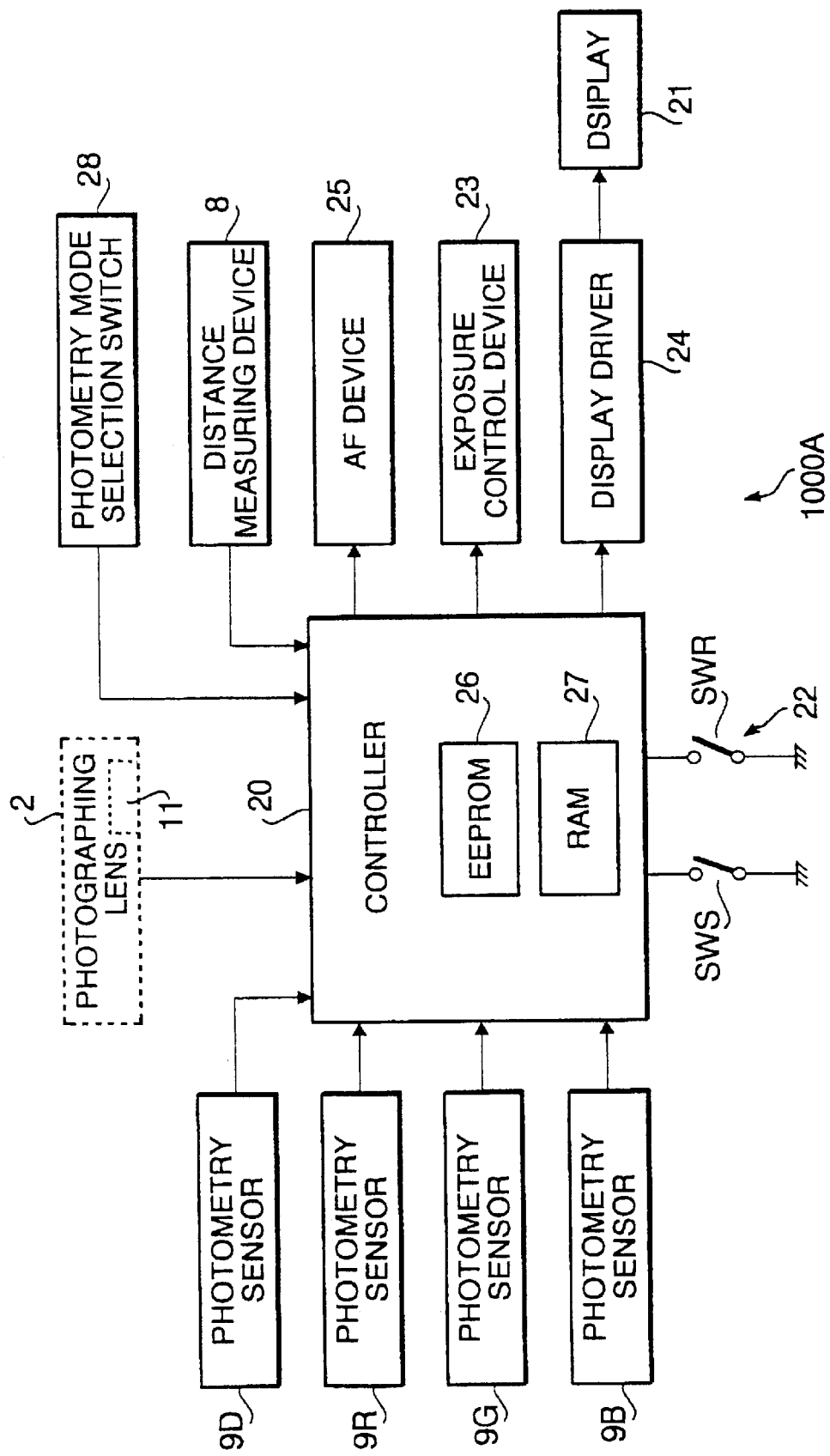
Figure 26:
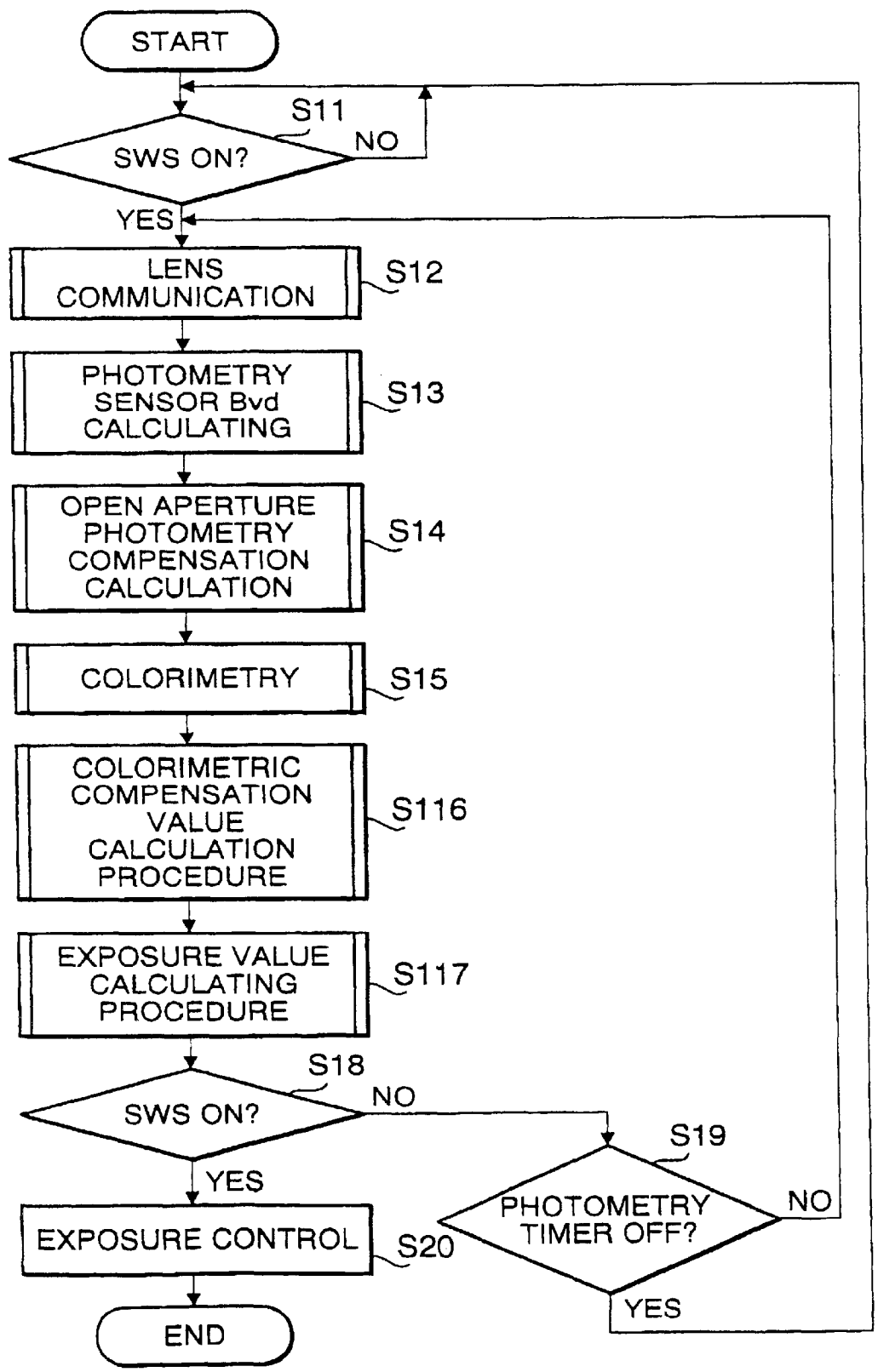
Figure 27:
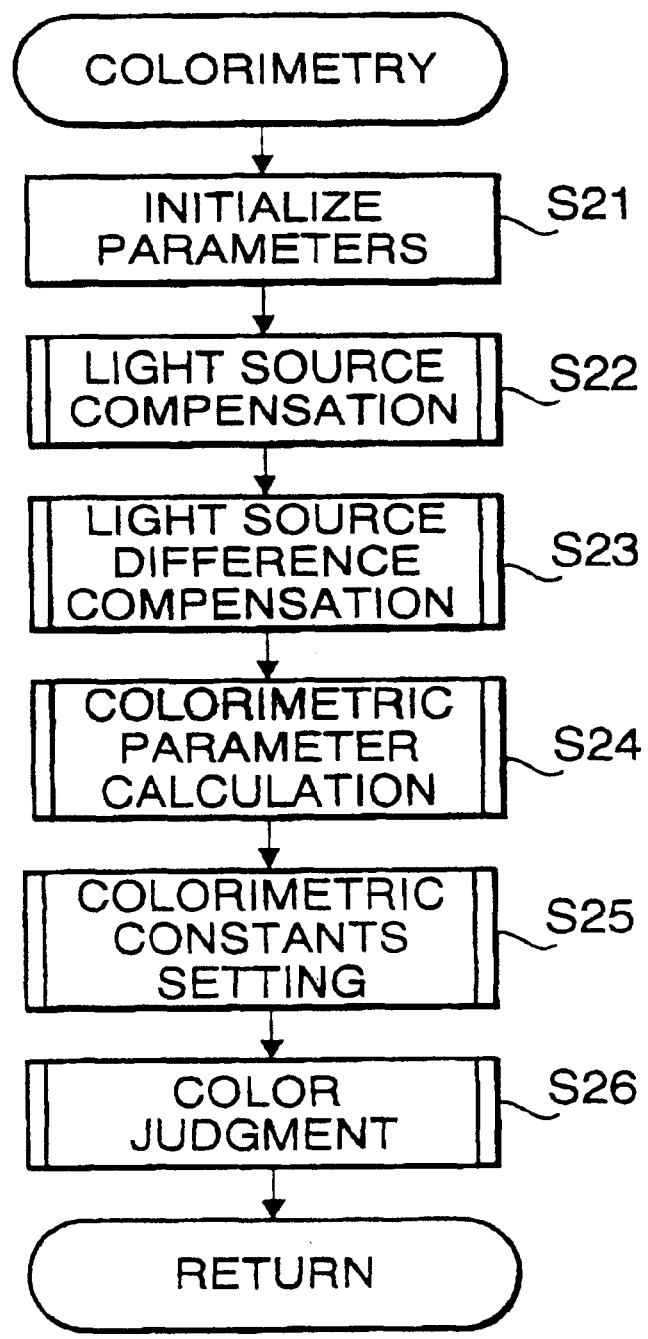
Figure 30:
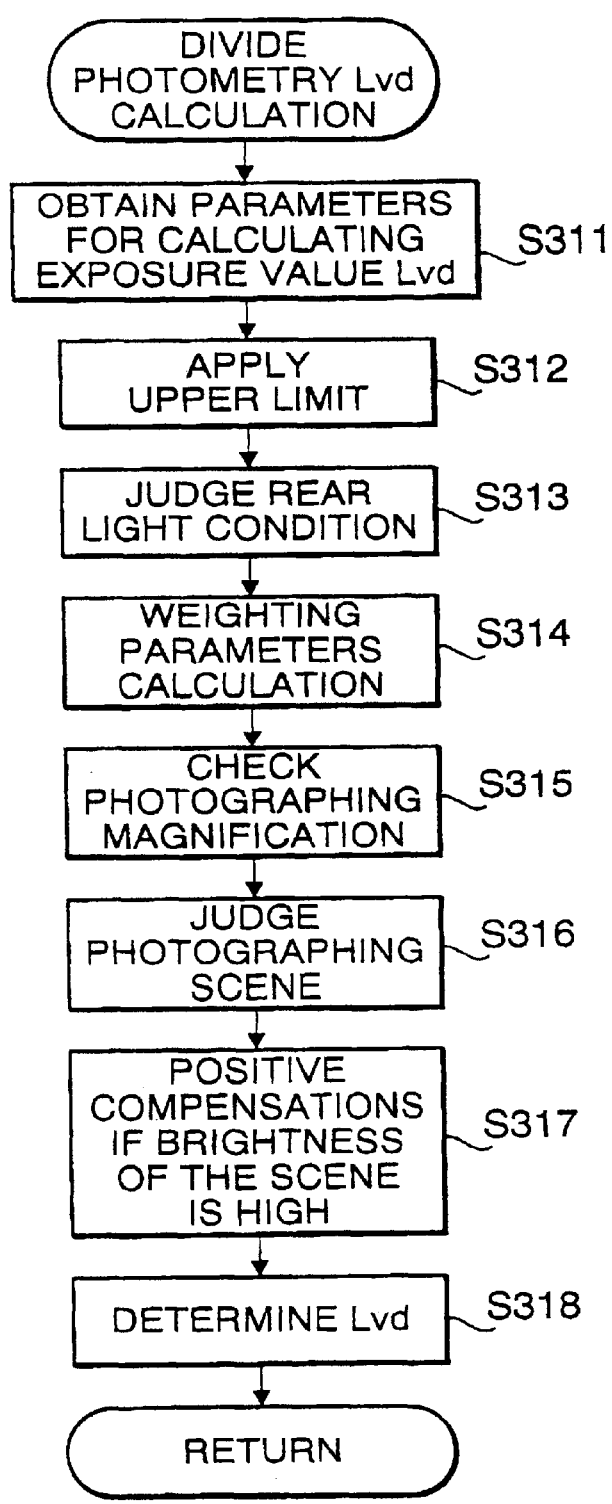
Figure 31:
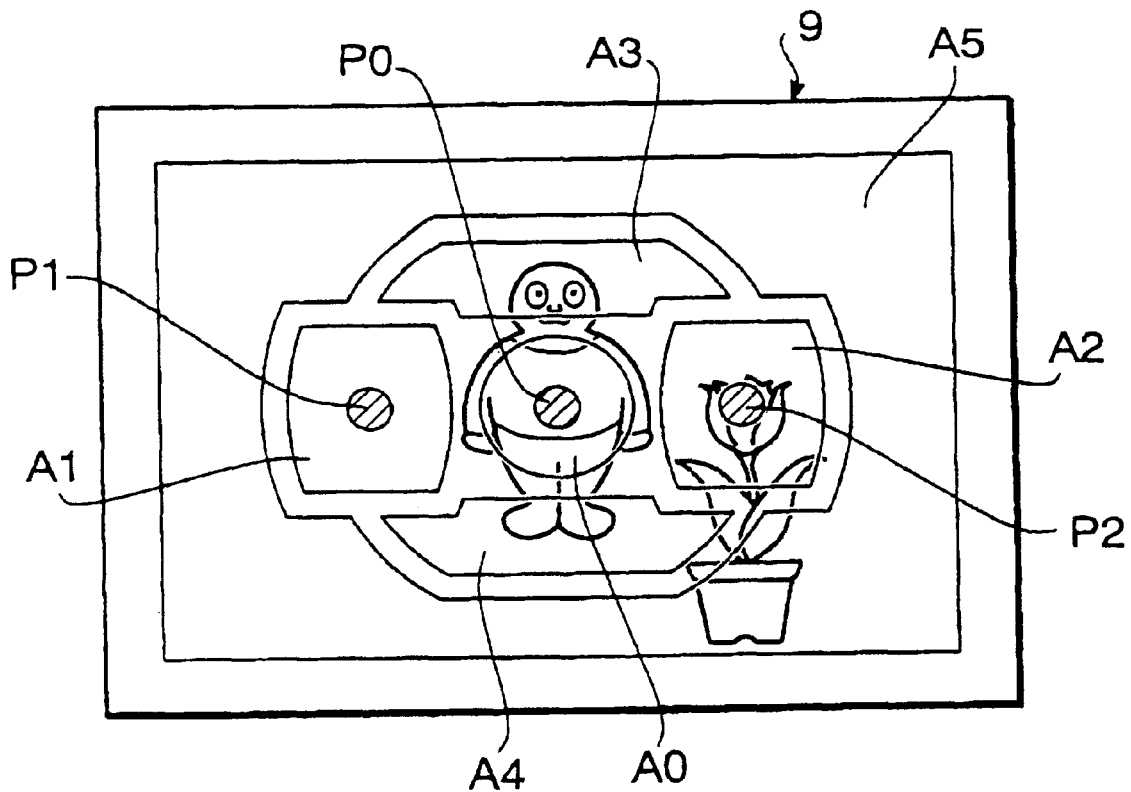
Figure 32:
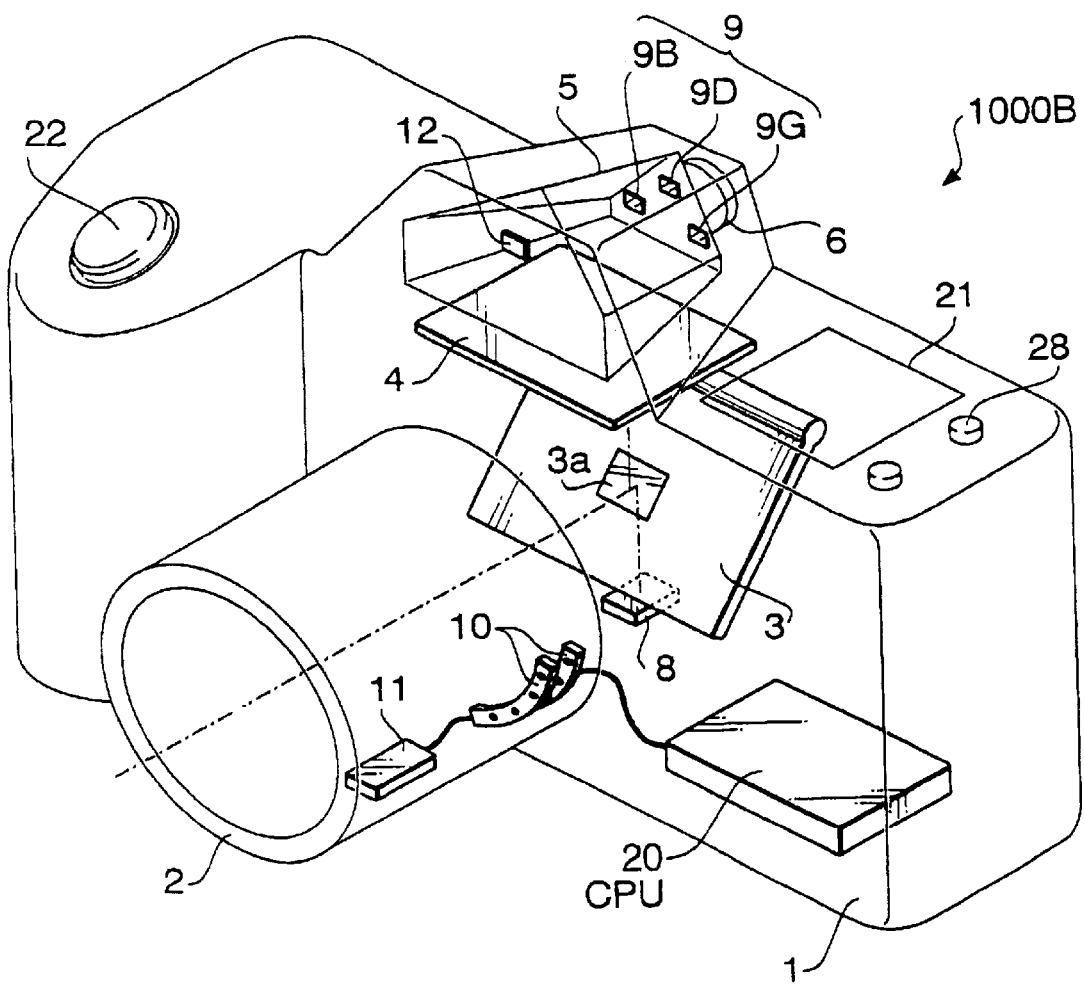
Figure 33:
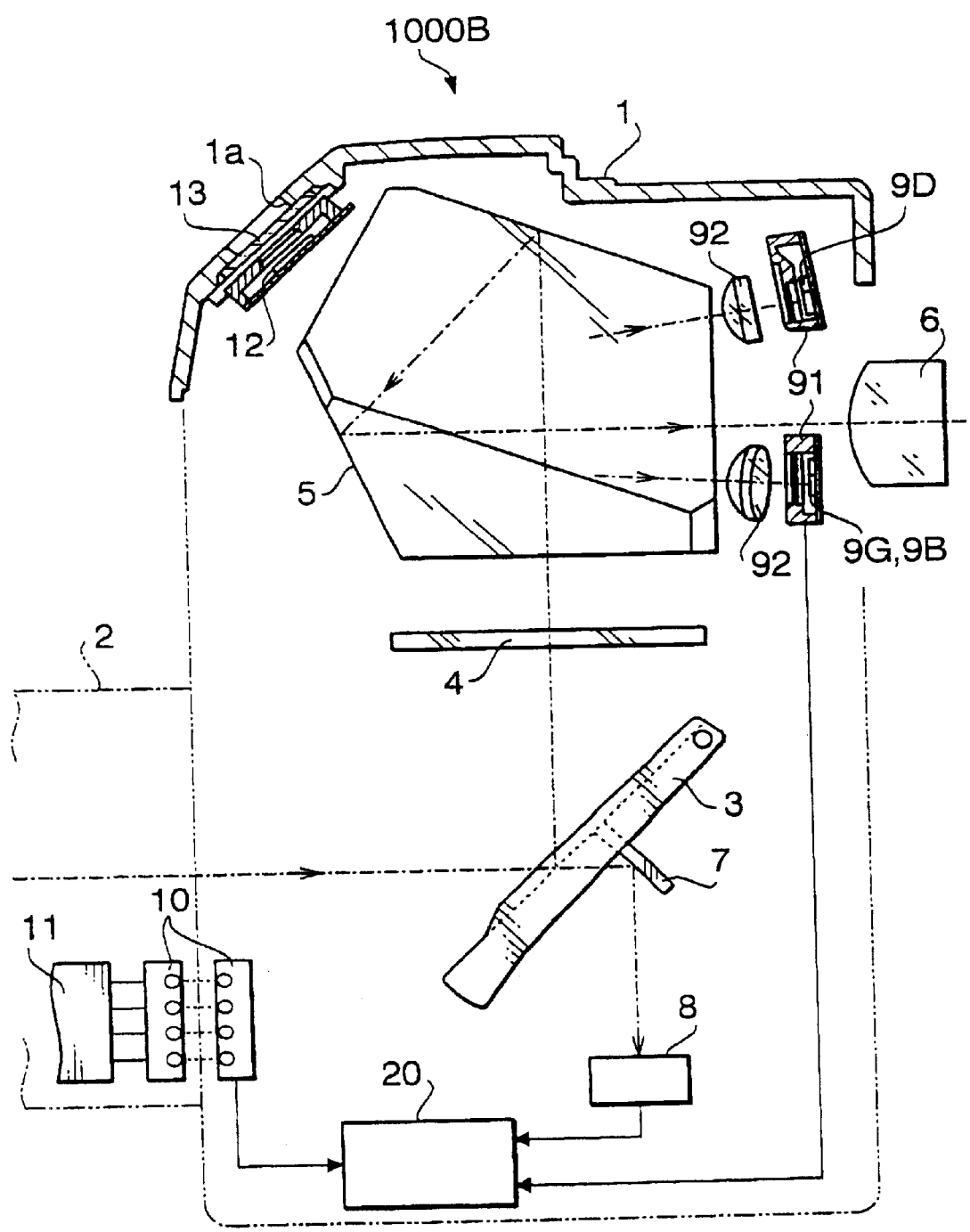
Figure 34A:
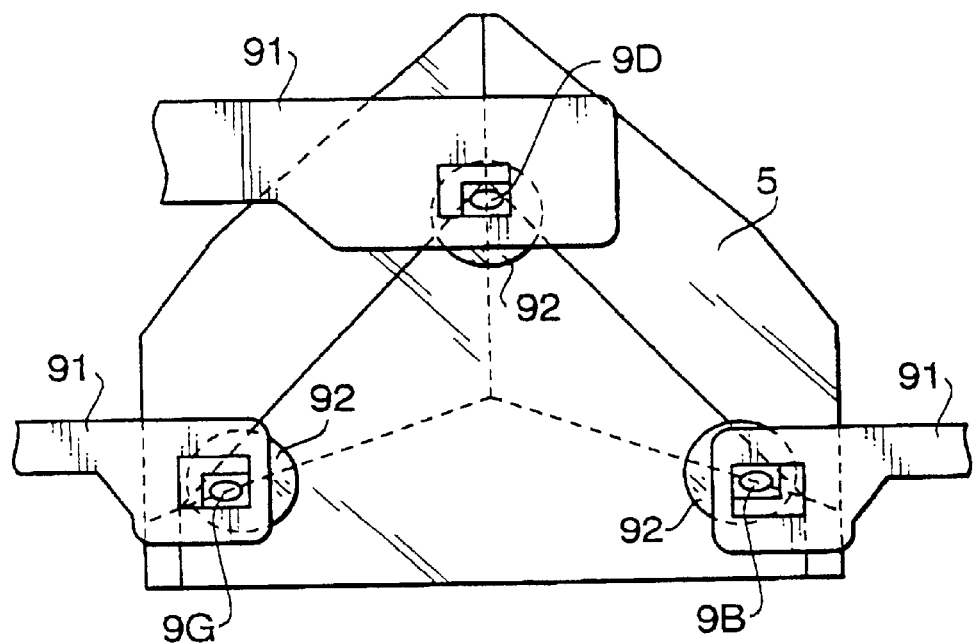
Figure 34B:
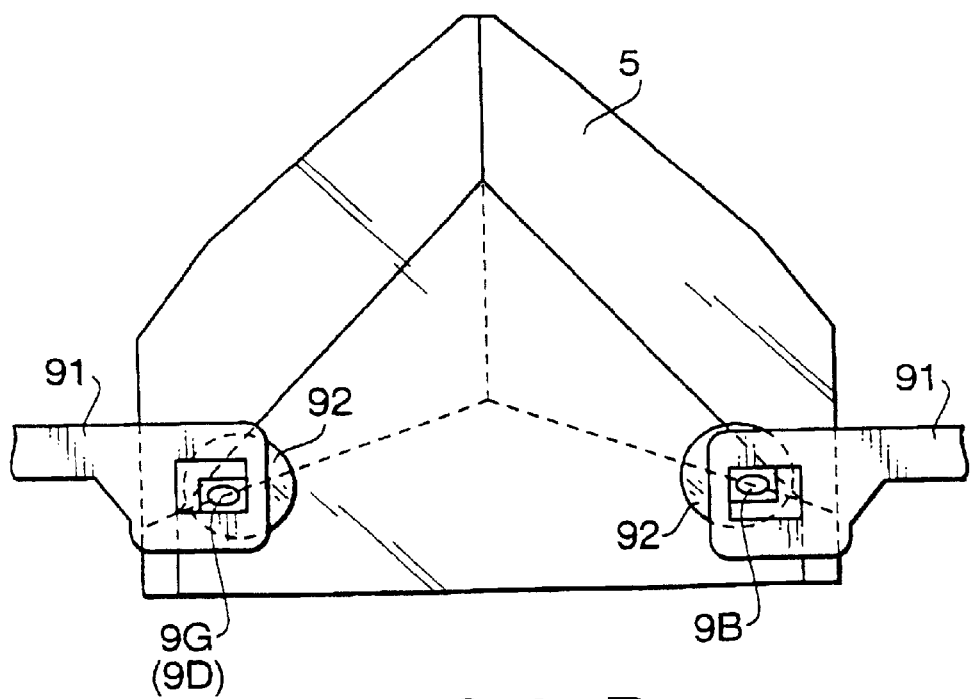
Figure 35A:
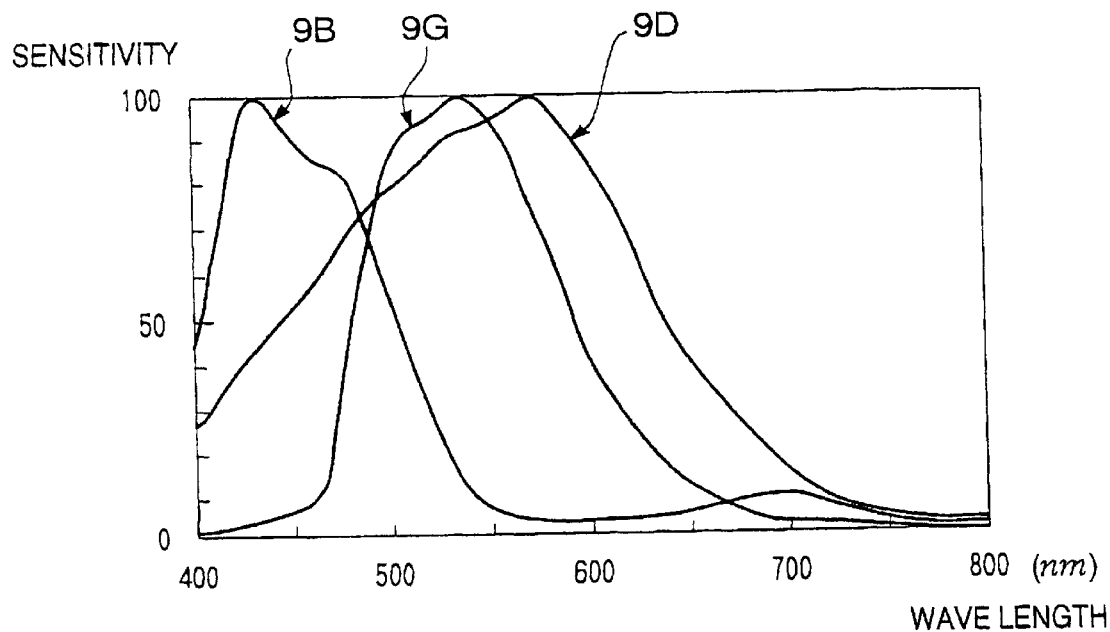
Figure 35B:
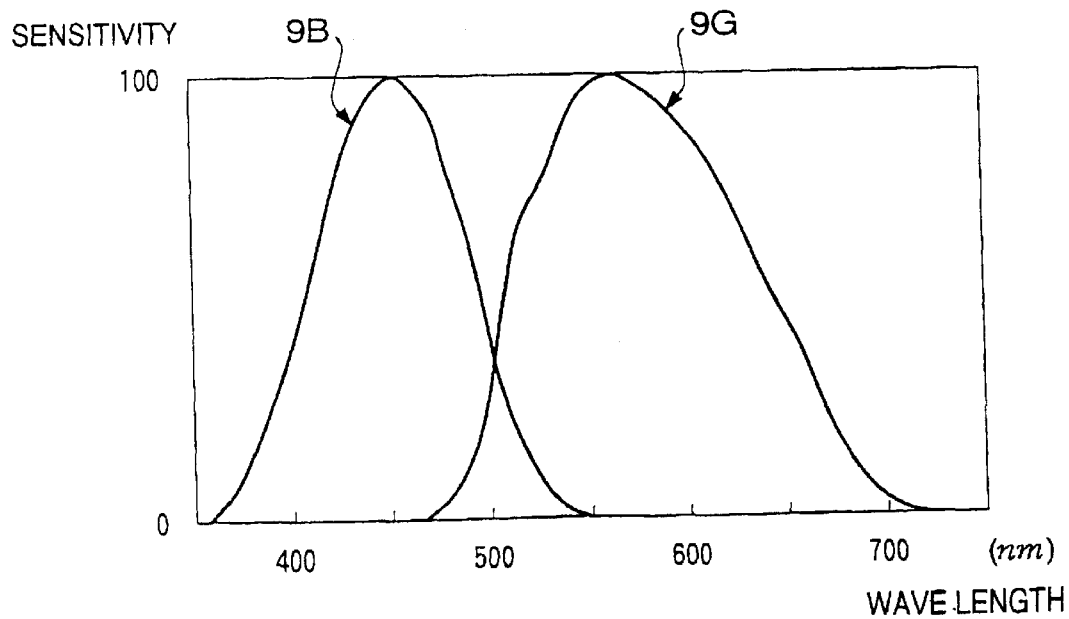
Figure 36:
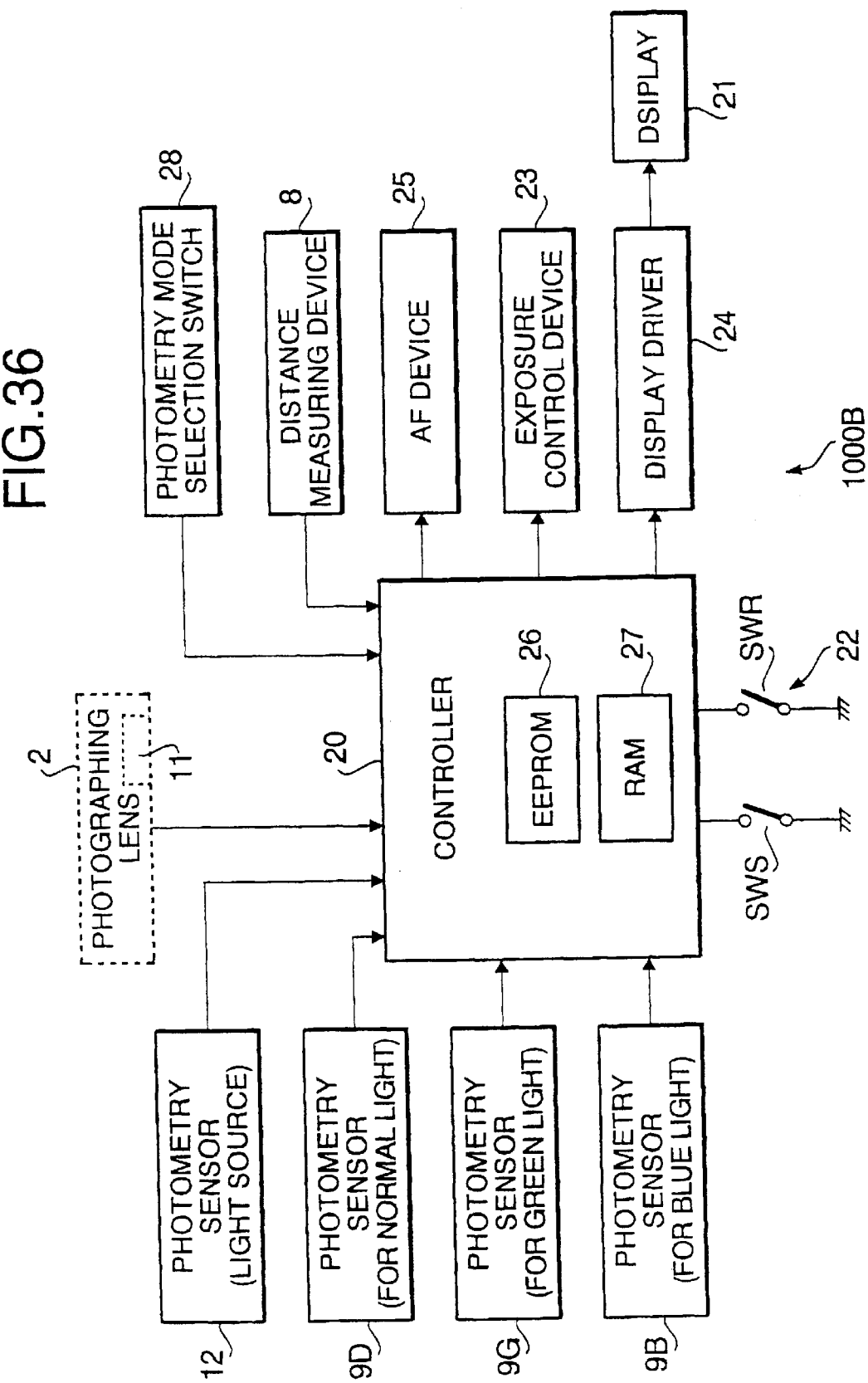
Figure 38:
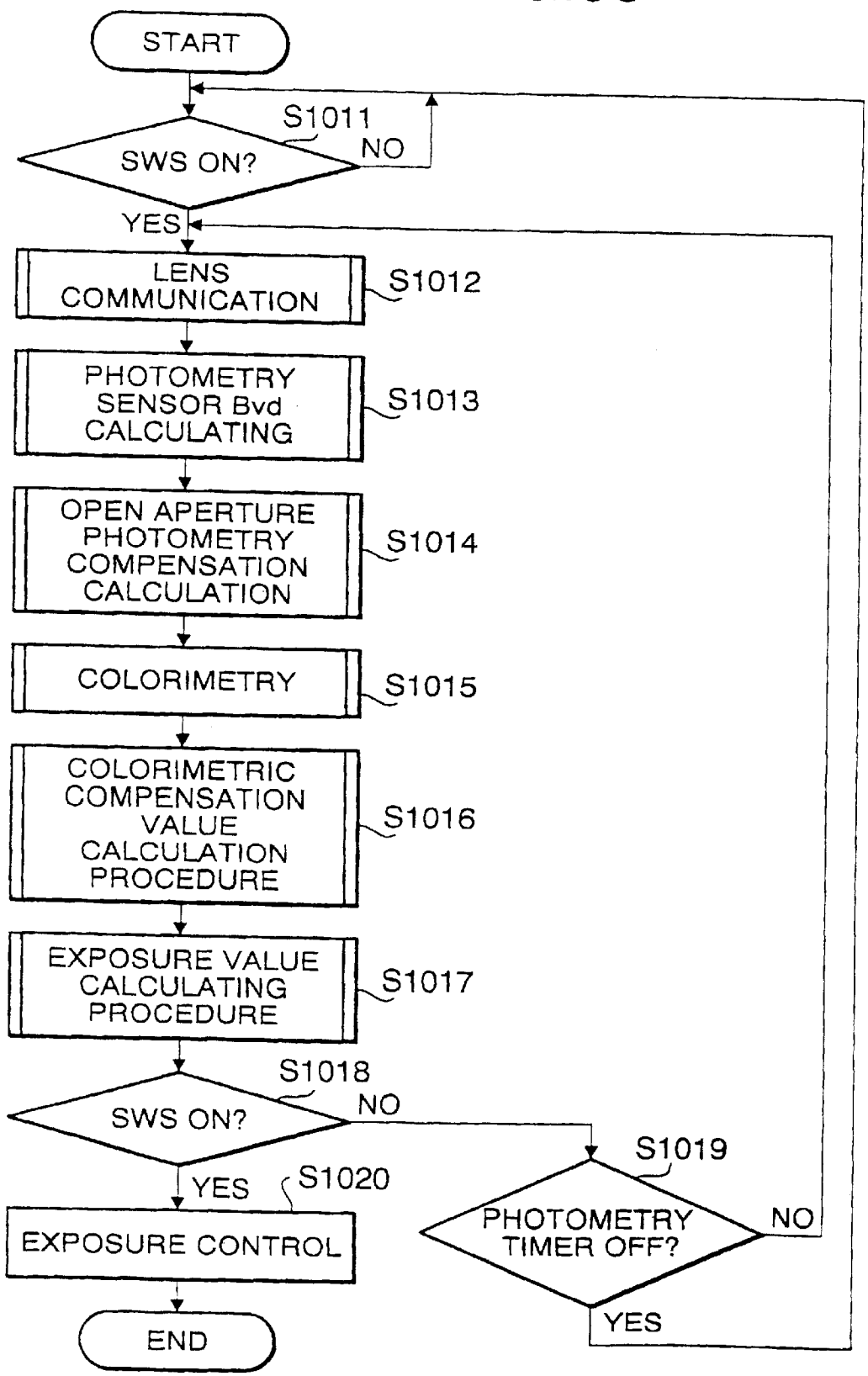
Figure 39:
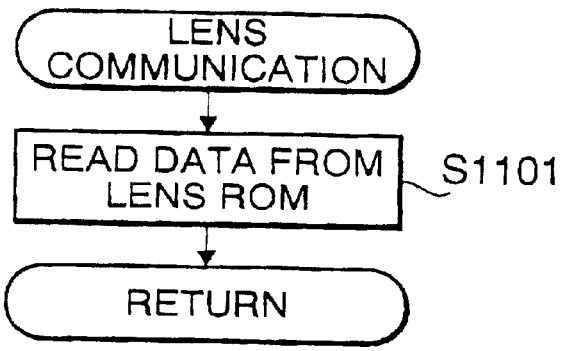
Figure 40:
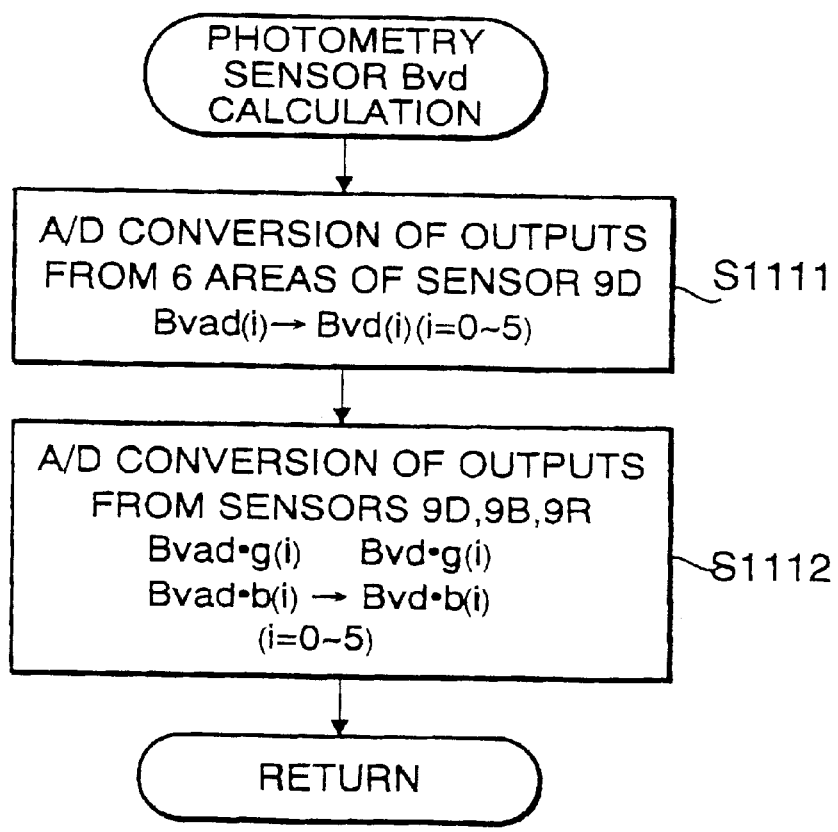
Figure 41:
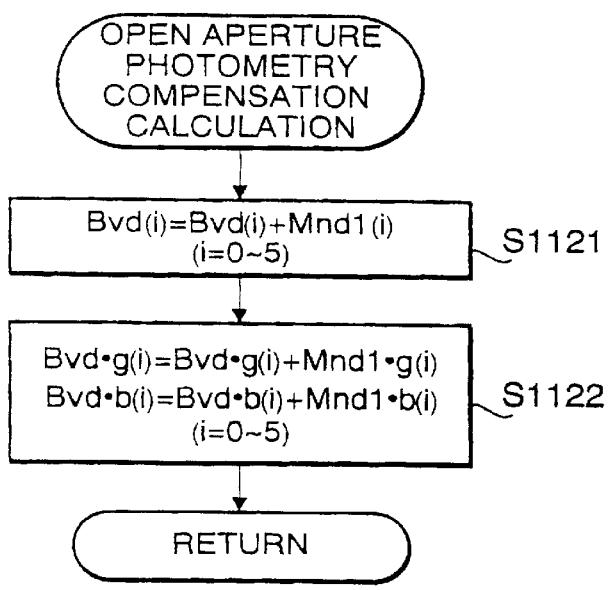
Figure 42:
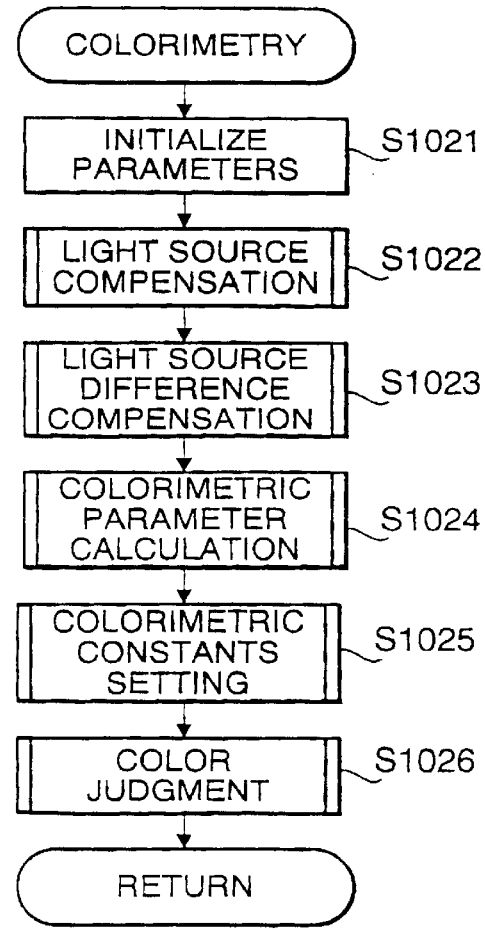
Figure 43:
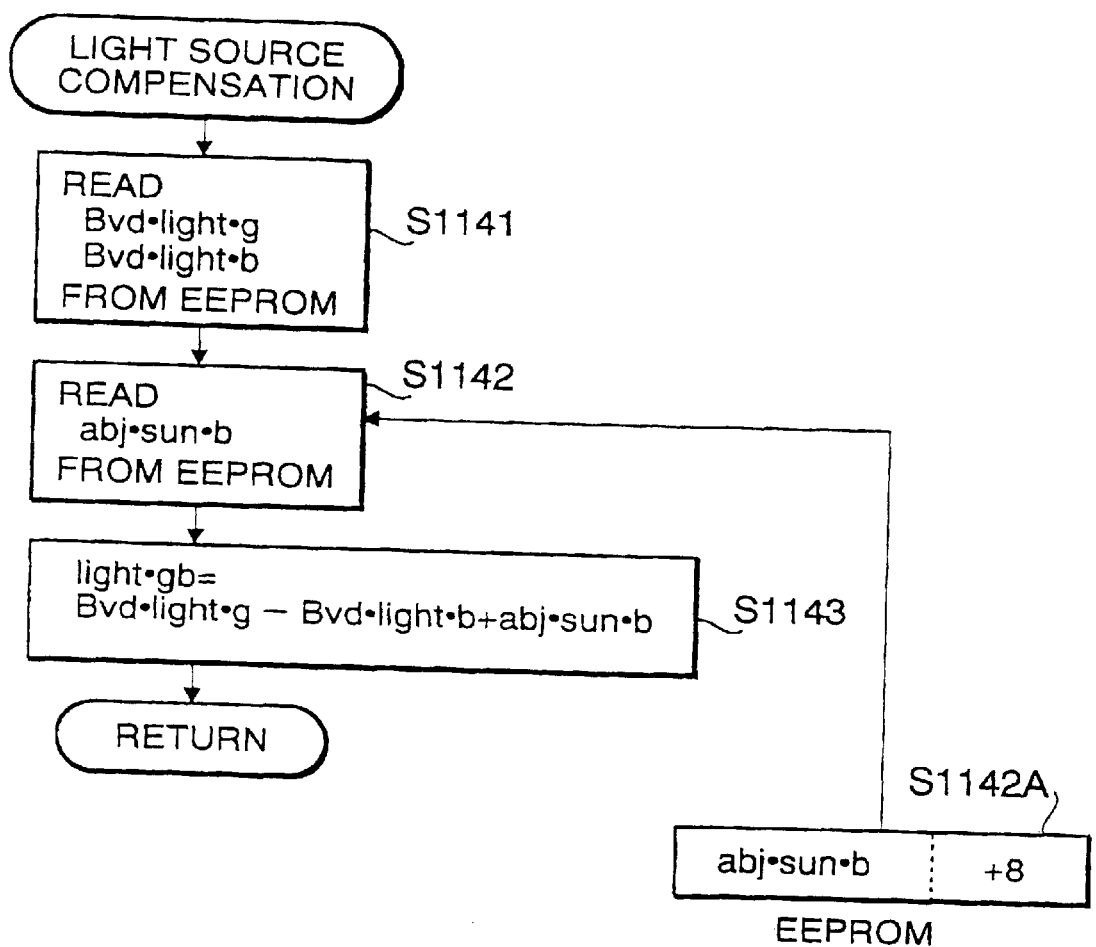
Figure 44:
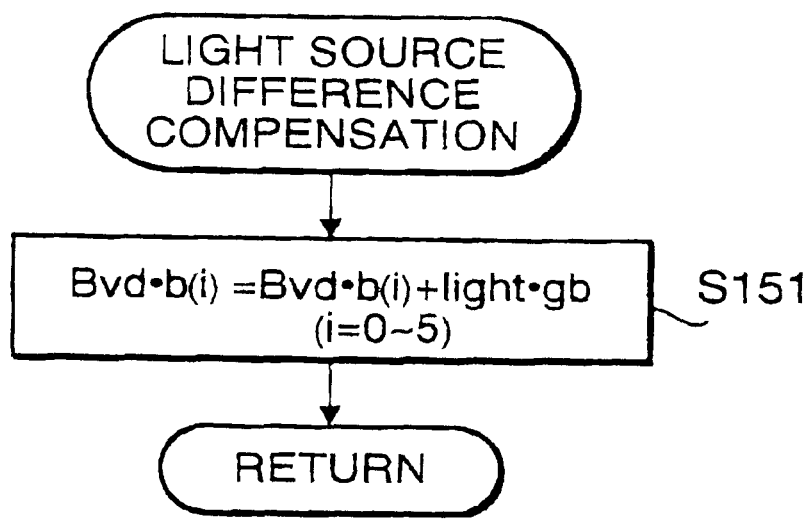
Figure 45:
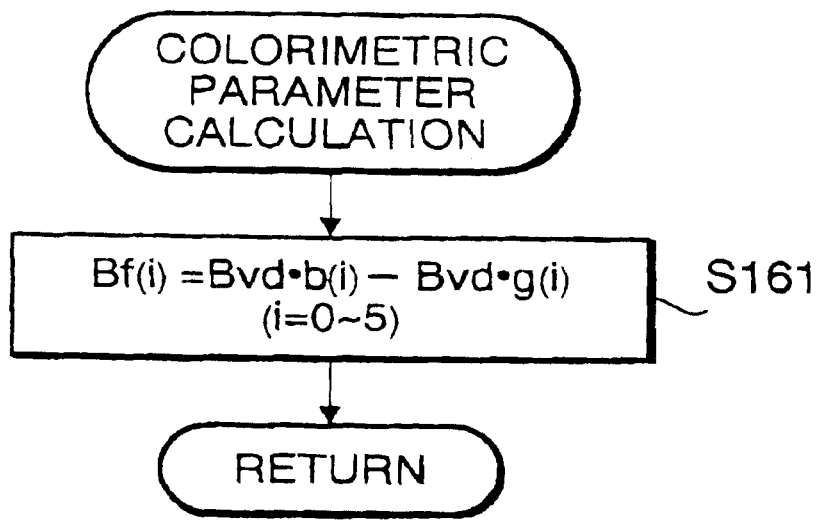
Figures 46, 46A:
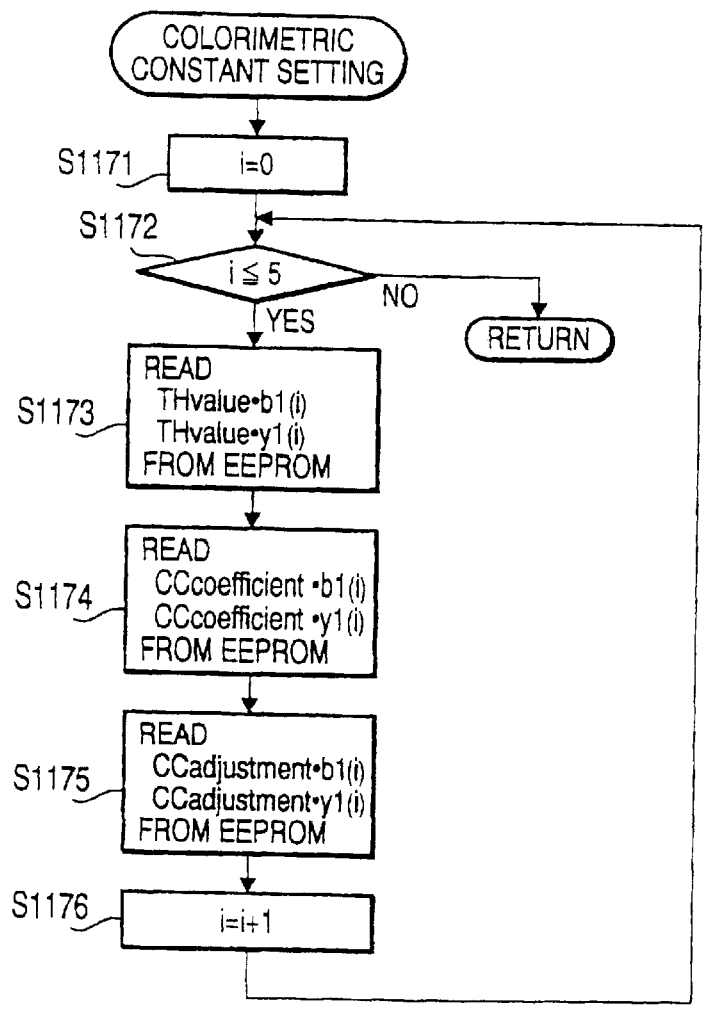
Figure 47:
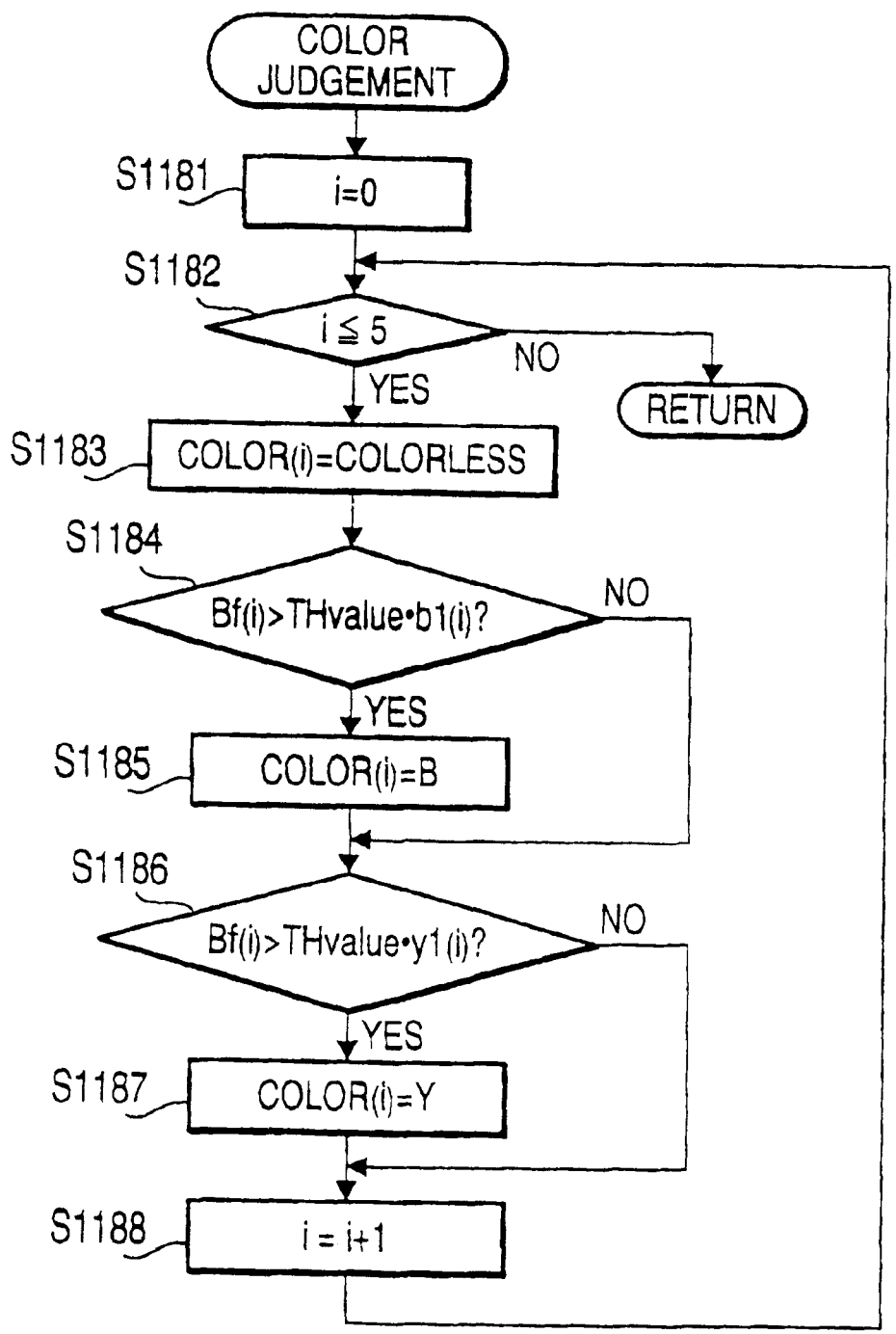
Figure 48:
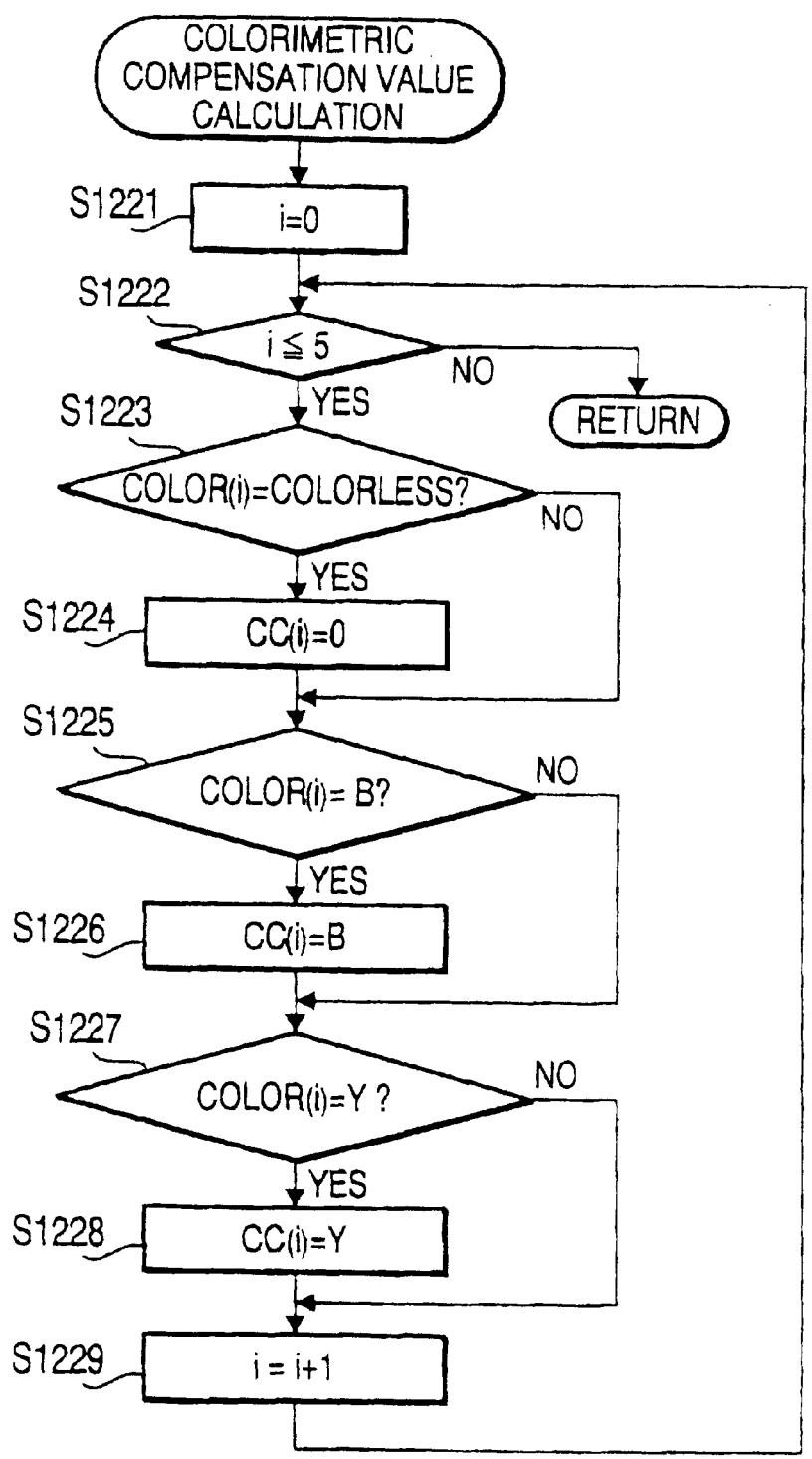
Figure 49:
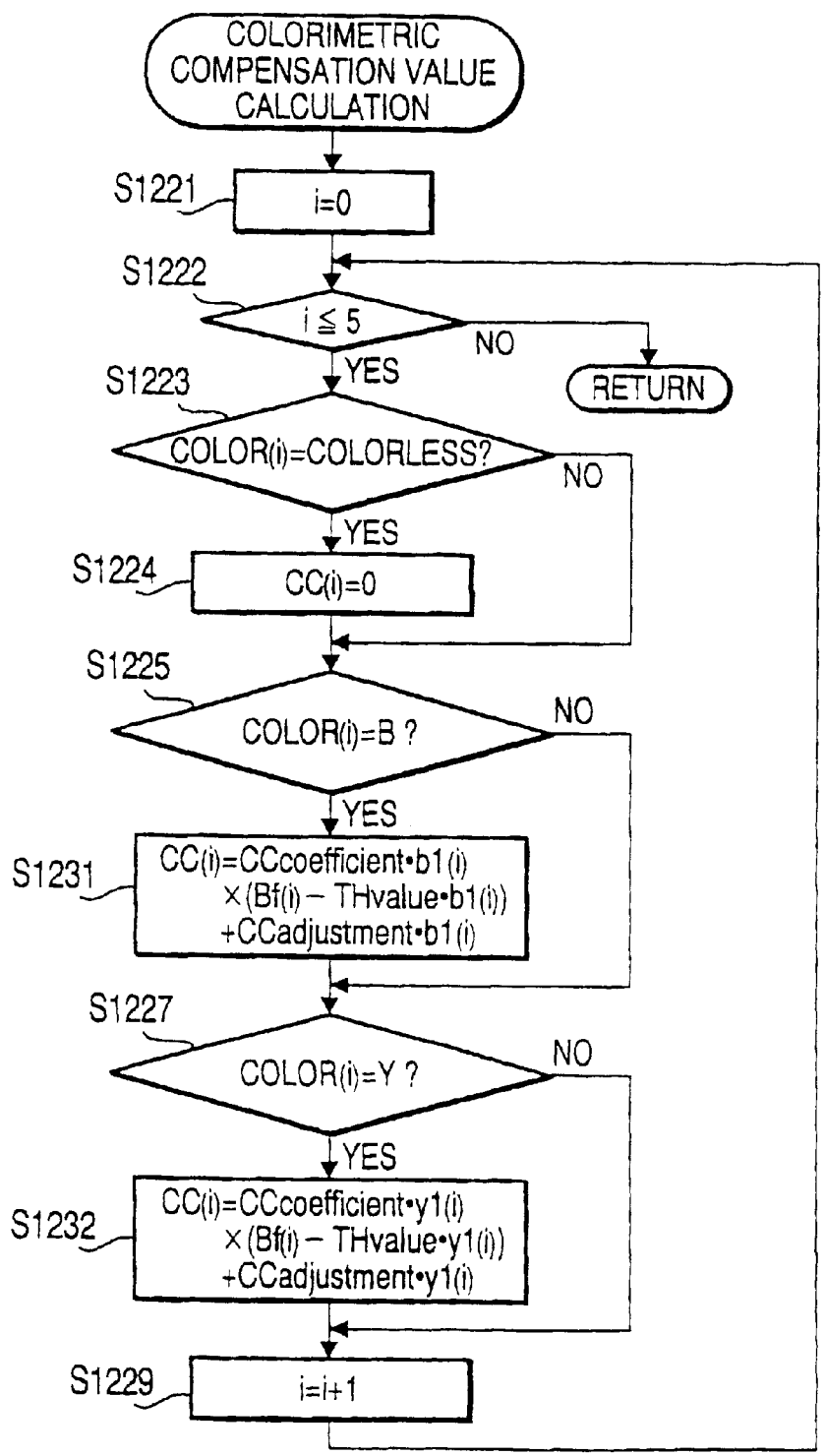
Figure 52:
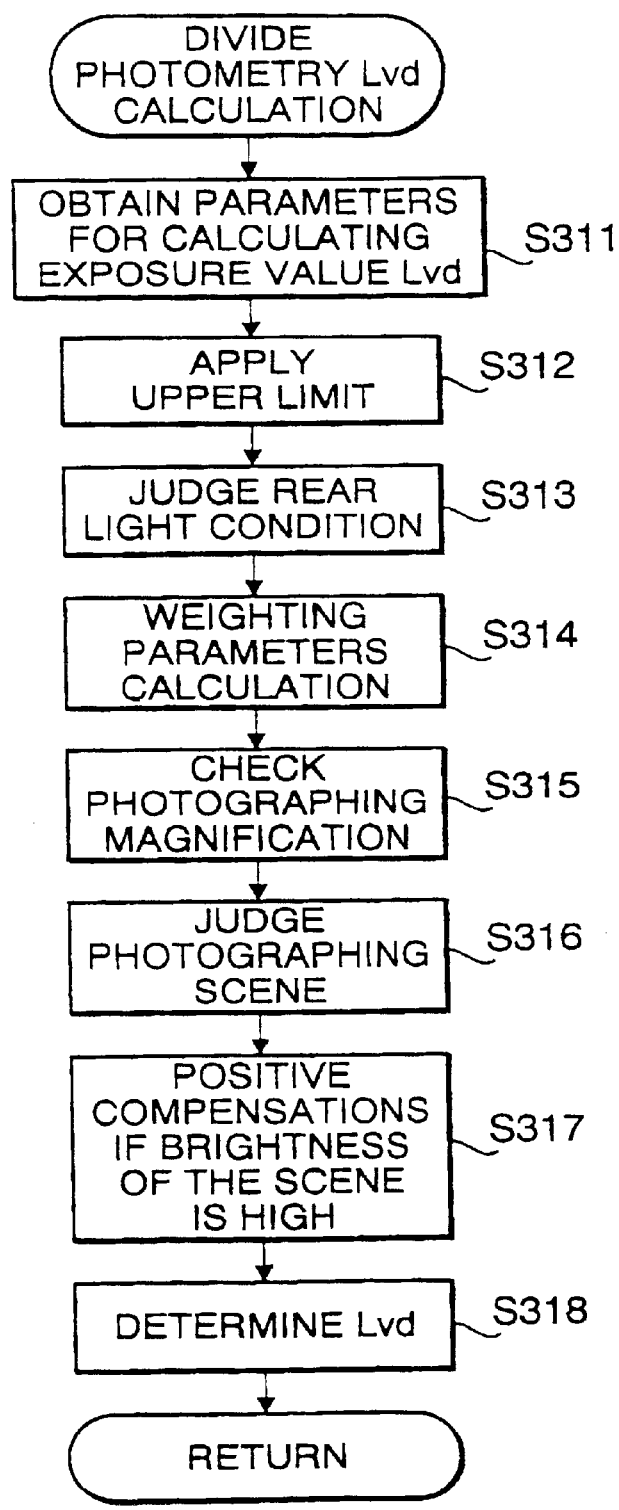
Figure 53:
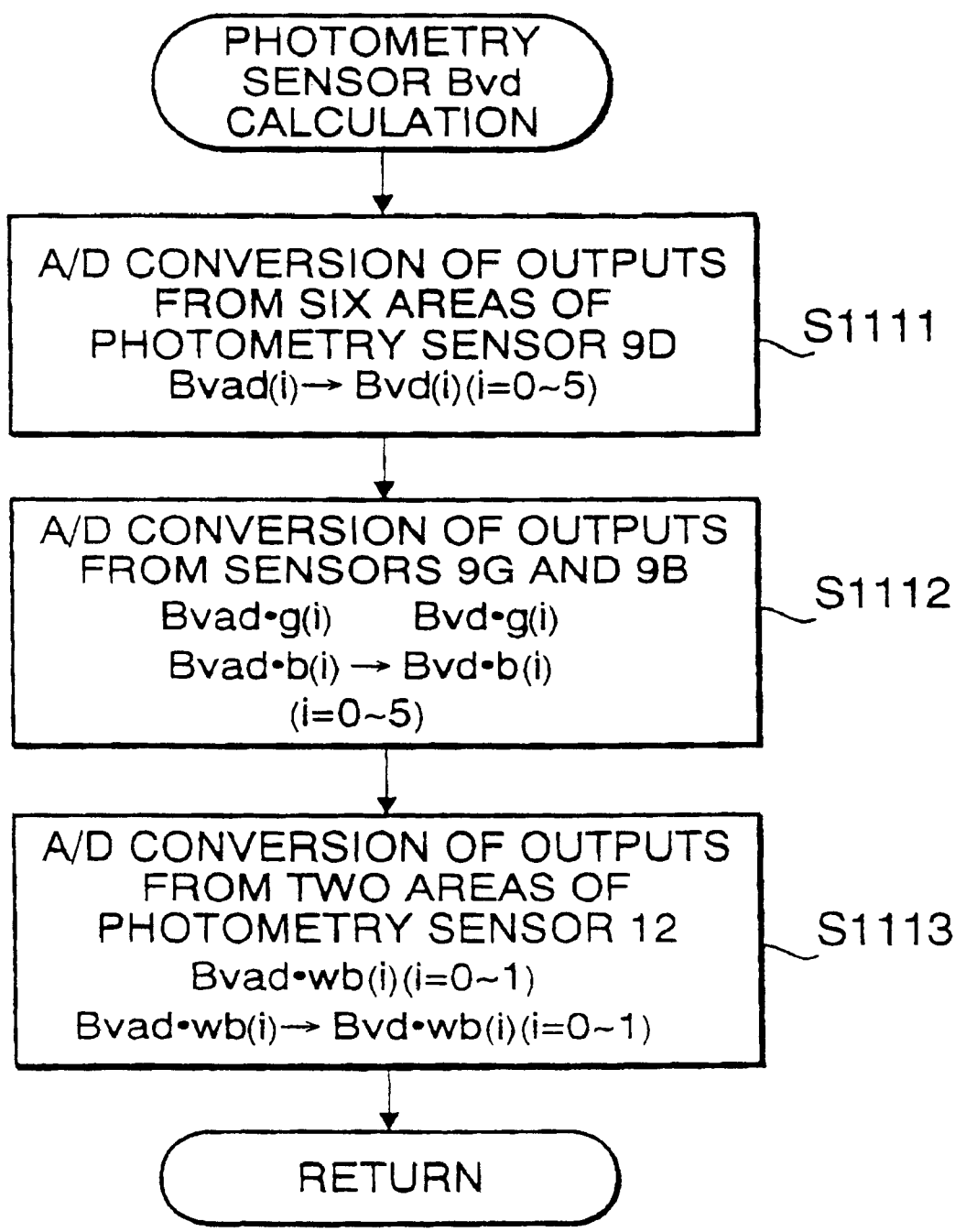
Figure 54:
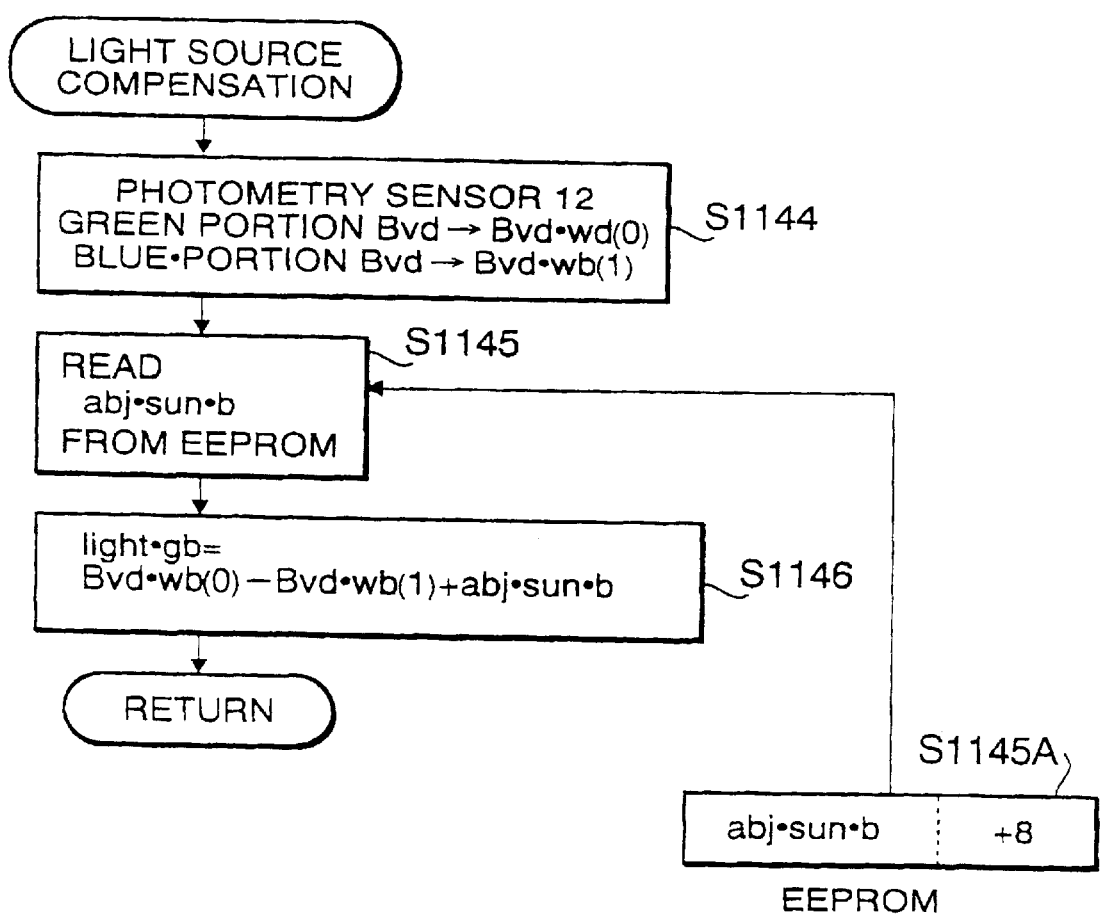
Figure 55:
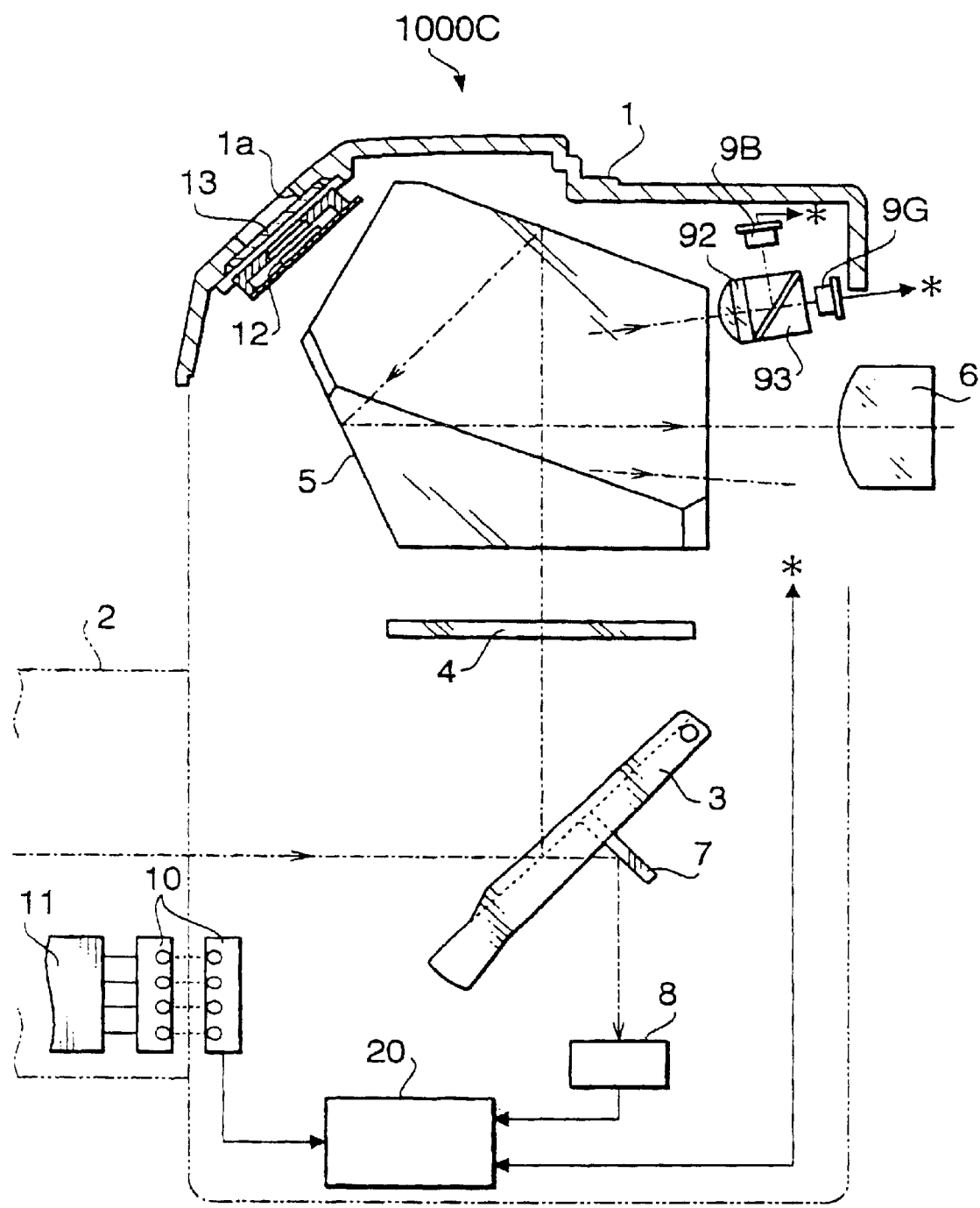
Figure 56:
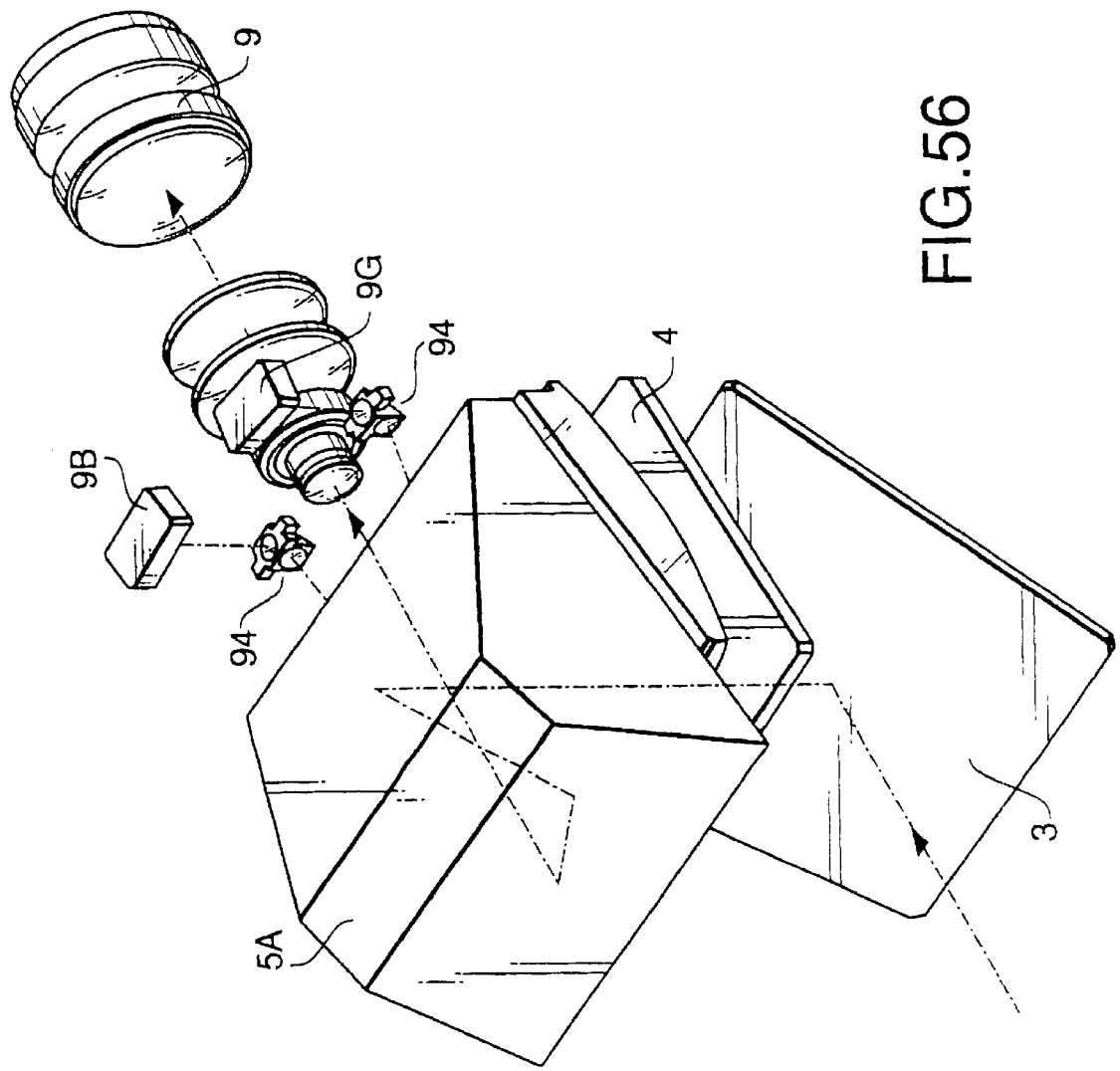

FIG. 4A schematically shows a structure of each of the photometry sensors;

FIG. 4B shows a relationship between the photometry areas;

FIG. 5 shows spectral sensitivity characteristics of the green, blue and red filters;

FIG. 6 shows a block diagram of main portions of the camera;

FIG. 7 is a flowchart illustrating a main procedure of a photometry operation according to a first embodiment;

FIG. 8 is a flowchart illustrating the "lens communication procedure";

FIG. 9 shows a flowchart illustrating the "photometry sensor Bvd calculation procedure";

FIG. 10 is a flowchart illustrating the "open aperture photometry compensation calculation procedure";

FIG. 11 is a flowchart illustrating an "exposure value calculating procedure";

FIG. 12 is a flowchart illustrating a "colorimetry procedure";

FIG. 13 is a flowchart illustrating the "light source compensation procedure";

FIG. 14 is a flowchart illustrating the "light source difference compensation procedure";

FIG. 15 is a flowchart illustrating the "calorimetric parameter calculation procedure";

FIG. 16 is a flowchart illustrating the "colorimetric constant setting procedures;

FIG. 17 shows an example of constants read from the EEPROM;

FIGS. 18 and 19 show a flowchart illustrating the "color judgment procedure";

FIG. 20 is a flowchart illustrating an example of the "area colorimetric compensation value calculating procedure";

FIG. 21 shows a table in which the relationship between the compensation value CC(i) determined in the procedure shown in FIG. 20 and the actual compensation values;

FIG. 22 shows an alternative example of the "area colorimetric compensation value calculation procedure";

FIG. 23 is a flowchart illustrating a "CC calculating procedure", which is called at S28 of the main procedure;

FIG. 24 shows a perspective view of a camera employing a photometry device according to a second embodiment;

FIG. 25 shows a block diagram of main portions of the camera shown in FIG. 24;

FIG. 26 is a flowchart illustrating a main procedure of the photometry device according to the second embodiment;

FIG. 27 is a flowchart illustrating a "colorimetry procedure";

FIG. 28 is a flowchart illustrating an "exposure value calculating procedure";

FIG. 29 shows a flowchart illustrating the "exposure value calculation procedure";

FIG. 30 shows a flowchart illustrating a "divided-photometry exposure value calculation procedure";

FIG. 31 shows a relationship between the photometry areas and a plurality of distance measuring points for detecting a focusing condition using the multi distance measuring device;

FIG. 32 shows a perspective view of a camera employing a photometry device according to a third or fourth embodiment of the invention;

FIG. 33 schematically shows the main components of the camera;

FIGS. 34A and 34B show a rear view of the pentagonal prism;

FIG. 35A shows spectral sensitivity characteristics of the photometry sensors 9D, 9B and 9G;

FIG. 35B shows sensitivity ratio characteristics of the photometry sensors 9B and 9G;

FIG. 36 shows a block diagram of main portions of the camera;

FIG. 37 is a table indicating the flowcharts for the third and fourth embodiment;

FIG. 38 shows a flowchart illustrating a main procedure of a photometry operation according to the third or fourth embodiment;

FIG. 39 is a flowchart illustrating the "lens communication procedure";

FIG. 40 shows a flowchart Illustrating the "photometry sensor Bvd calculation procedure";

FIG. 41 is a flowchart illustrating the "open aperture photometry compensation calculation procedure";

FIG. 42 is a flowchart illustrating a "colorimetry procedure";

FIG. 43 is a flowchart illustrating a light source compensation procedure";

FIG. 44 is a flowchart illustrating the "light source difference compensation procedure";

FIG. 45 is a flowchart illustrating the "calorimetric parameter calculation procedure";

FIG. 46 is a flowchart illustrating the "colorimetric constant setting procedure";

FIG. 46A shows an example of the constants read from the EEPROM;

FIG. 47 shows a flowchart illustrating the "color judgment procedure";

FIG. 48 is a flowchart illustrating an example of the "calorimetric compensation value calculating procedure";

FIG. 49 shows an alternative example of the "colorimetric compensation value calculation procedure";

FIG. 50 is a flowchart illustrating an "exposure value calculating procedure";

FIG. 51 shows a flowchart illustrating the "exposure value determination calculation procedure";

FIG. 52 shows a flowchart illustrating a "divided photometry Lvd calculation procedure";

FIG. 53 shows a flowchart illustrating the "photometry sensor output Bvd calculation procedure";

FIG. 54 is a flowchart illustrating the "light source compensation procedure";

FIG. 55 is a side view of the camera, which is a modification of the third/fourth embodiments; and FIG. 56 shows a further modification of the third/fourth embodiments.

DESCRIPTION OF THE EMBODIMENTS

Hereinafter, referring to the accompanying drawings, embodiments according to the present invention will be described.

Figure 1:
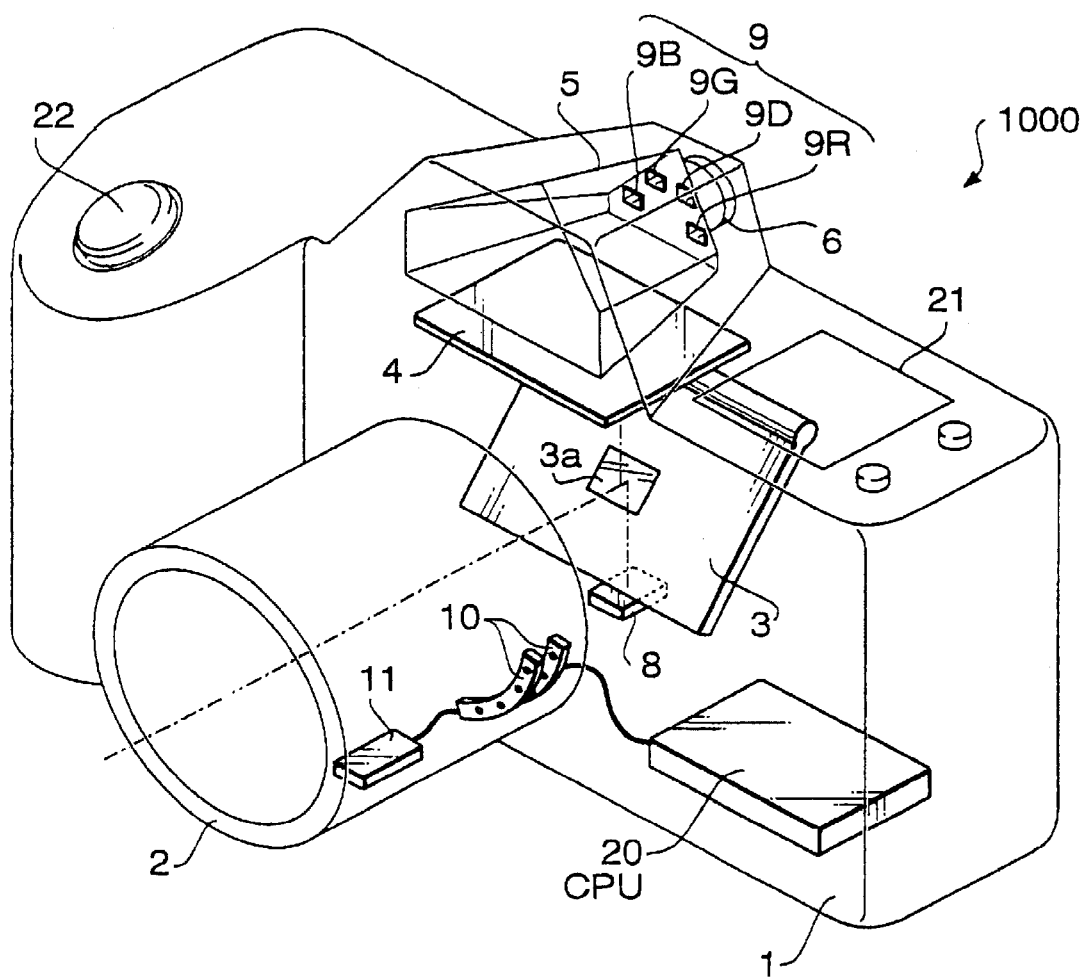
Figure 2:
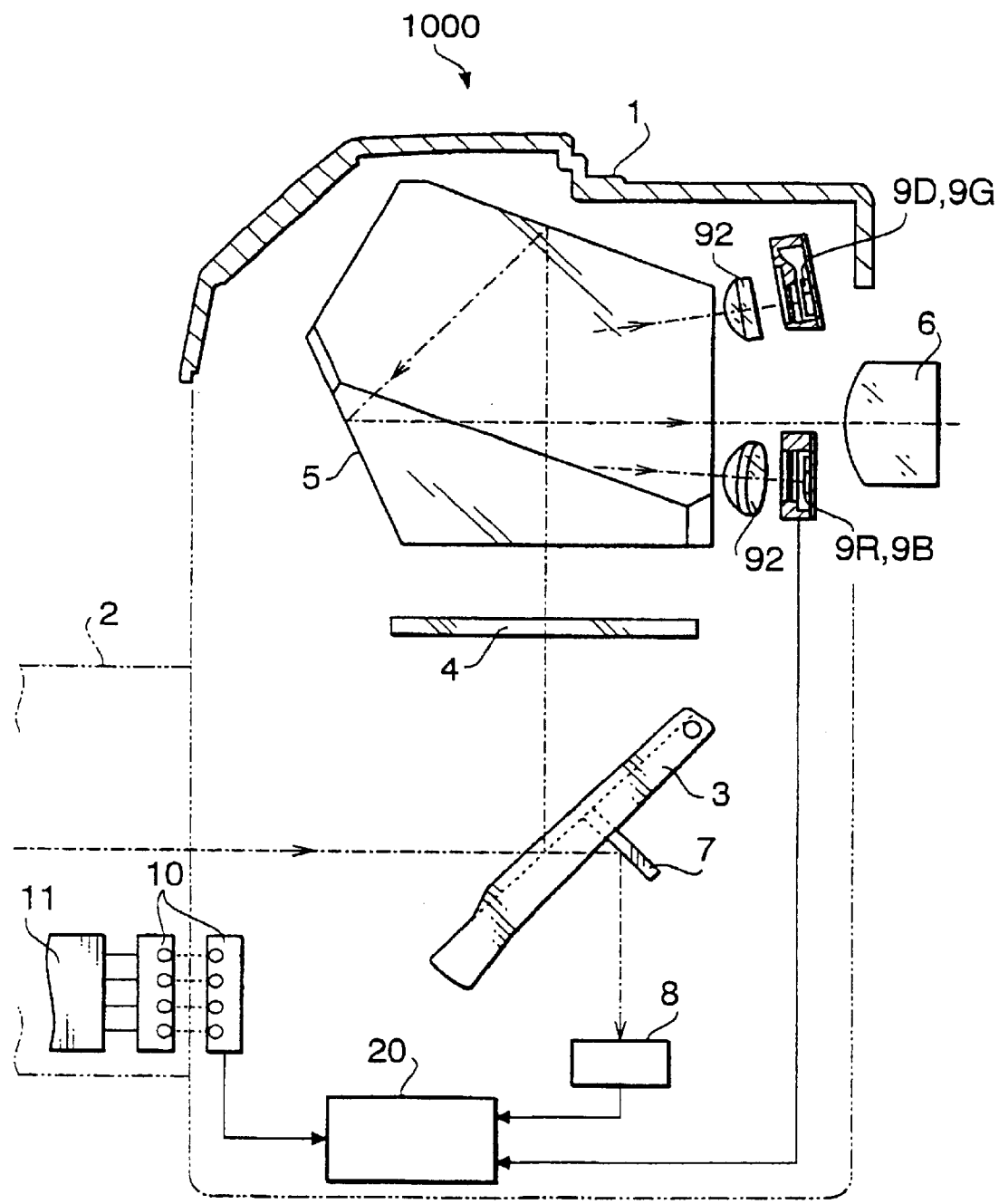

FIG. 1 shows a perspective view of a camera 1000 employing a photometry device according to the invention, and FIG. 2 schematically shows main components of the camera 1000.

The camera 1000 has a camera body 1, to which a photographing lens 2 is detachably coupled. The camera body 1 accommodates a quick return mirror 3, a focusing glass 4, a pentagonal prism 5 (or a pentagonal mirror), and an eyepiece optical system 6. A part of the quick return mirror 3 is formed to be a half mirror 3a (see FIG. 1), and behind the half mirror 3a, an auxiliary mirror 7 is provided. Light passed through the half mirror 3a is reflected by the auxiliary mirror 7, and is directed toward a distance measuring device 8. The distance measuring device 8 is used for an AF (Automatic focusing) control. On the pentagonal prism 5, four photometry sensors 9 are provided, each of which functions as a photometry element and receives light passed through the photographing lens 2. Based on the outputs of the photometry sensors 4, a photometry operation for determining exposure parameters is executed. The photographing lens 2 and the camera body 1 are electrically connected through electrical contacts 10. Thus, a lens ROM 11 built in the photographing lens 2 is electrically connected to a control circuit 20 accommodated in the camera body 1. On an outer surface of the camera body 1, an LCD (liquid crystal display) 21, and various buttons such as a release button 22 are provided. Furthermore, inside the camera body 1, various mechanisms such as a film winding mechanism are provided. However, such mechanisms are conventionally known, and description thereof will be omitted for the sake of the simplicity.

Figure 3A:
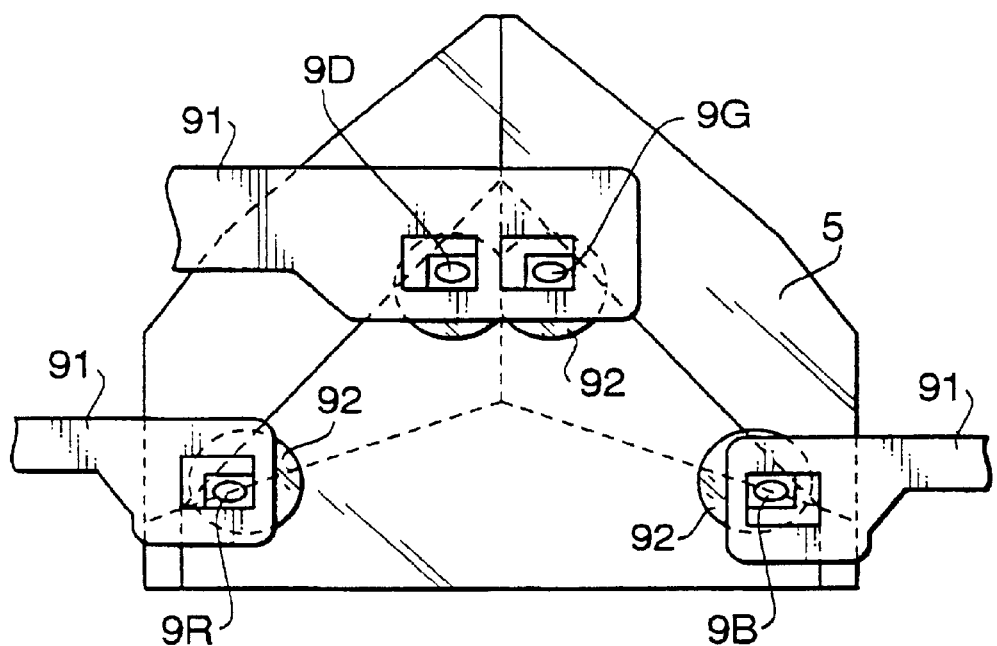
FIG. 3A shows an arrangement of photometry sensors.

FIG. 3A shows a rear view of the pentagonal prism 5. As shown in FIG. 3A, the four photometry sensors 9 includes sensors 9D and 9G provided at an upper central portion on the eyepiece side of the pentagonal prism 5, and sensors 9B and 9R provided at lower side portions on the eyepiece side of the pentagonal prism 5. The photometry sensors 9D, 9G, 9B and 9R are mounted on an FPC (flexible printed circuit board) 91 and fixedly positioned at the above-described respective positions by the FPC 91. In front of (i.e., on the pentagonal prism side of) each of the photometry sensors 9D, 9G, 9B and 9R, a collecting lens 92 is provide to form an object image on each of the sensors 9D, 9G, 95 and 9R.

FIG. 4A schematically shows a structure of each of the sensors 9D, 9G, 9B and 9R. As shown in FIG. 4A, each sensor 9 (9D, 9G, 9B or 9R) is constructed as a planar structure photometry IC chip that is configured such that a light receiving section and an amplifier AMP are integrally formed. The light receiving section includes six photometry areas, i.e., a central area A0, a left area A1, a right area A2, an upper area A3, a lower area A4, and a peripheral area A5. FIG. 43 shows a relationship between the photometry areas A0–A5 and portions of an object. The photometry areas A0–A5 of each sensor receives the light from respective portions of an object as indicated in FIG. 4B. The photometry sensor 9G is provided with a green filter on its light receiving surface, and receives a green component of light, the photometry sensor 9B is provided with a blue filter on its light receiving surface, and receives a blue component of light, and the photometry sensor 9R is provided with a red filter on its light receiving surface, and receives a red component of light. In this embodiment, the three sensors 9G, 9B and 9R are used as colorimetry elements. Spectral sensitivity characteristics of the sensors 9G, 9B and 9R respectively provided with the green, blue and red filters are indicated in FIG. 5. The sensors 9G, 9B and 9R have peaks in sensitivity at approximately 540 nm, 420 nm, and 620 nm, respectively. The remaining sensor 9D is not provided with a color filter, but a luminosity compensating filter is provided. The spectral sensitivity characteristic of the sensor 9D provided with the luminosity compensating filter has its peak within a wavelength range of 500–600 nm. The sensor 9D is used as a normal light detecting sensor.

FIG. 6 shows a block diagram of main portions of the camera 1000. The four sensors 9D, 9G, 9B and 9R output values indicative of quantity of received light (components) to the controller 20, respectively. Further, the output (i.e., a distance value) of the distance measuring device 8 is output to the controller 20, which controls the AF device 25 to perform the automatic focusing operation.

Furthermore, the controller 20 is connected with a photometry switch SWS and a shutter-release switch SWR. The photometry switch SWS is ON when the release button 22 is half depressed. The shutter-release switch SWR is ON when the shutter button is fully depressed. When the shutter button is depressed halfway and the photometry switch SWS is turned ON, the controller 20 performs a photometry calculation in accordance with a predetermined algorithm, and calculates an exposure value. Then, the controller 20 controls the exposure control device 23 in accordance with the calculated exposure value to perform a photographing operation. Further, the controller 20 drives a display driver 24 to display the calculated exposure value on the LCD panel 21. It should be noted that the controller 20 includes an EEPROM 26 storing various values necessary for the photometry calculation (which will be described in detail later), and a RAM 27 for temporarily storing various pieces of data.

An operation of the photometry device will be described hereinafter.

FIG. 7 is a flowchart illustrating a main procedure of a photometry operation. When the release button 22 is half depressed and the photometry switch SWS is ON (S11: YES), a "lens communication procedure" is performed (S12) so that the controller 20 receives data intrinsic to the photographing lens 2 currently mounted onto the camera body 1. Specifically, the data intrinsic to the photographing lens 2 includes an open aperture value, a focal length of the photographing lens 2 and the like, which may affects the photometry calculation, intrinsic to the photographing lens 2. The data is input from a lens ROM 11 of the photographing lens 2 to the controller 20 through the electrical contacts 10. Then, a "photometry sensor output Bvd calculation procedure" is executed (S13). In this procedure, the photometry sensors 9 (9D, 9G, 9B and 9R) output analog photometry values which are obtained by receiving light through the photographing lens 2, quick return mirror 3, and the pentagonal prism 5. Then, the analog values are converted into digital brightness values Bvd which can be used in the operation executed by the controller 20. Then, based on the brightness value data Bvd obtained at S13 and the lens data intrinsic to the photographing lens 2 retrieved at S12, an "open aperture photometry compensation calculation procedure" is executed (S14) to compensate for errors depending on different photographing lenses.

At S15, an "exposure value calculation procedures" is executed. In this procedure, based on the brightness value Bvd, which is obtained in accordance with the output of the photometry sensor 9D for normal light, an exposure value Lvd is calculated. In this procedure, parameters for calculating the exposure value Lvd in accordance with photographing conditions, e.g., a rear light photographing, a magnification and/or scene of photographing, are obtained. Then, based on the parameters, the exposure value Lvd is calculated.

At S16, based on the brightness value Bvd obtained by each of the sensors 9R, 9B and 9G for the RGB (Red, Green and Blue) color components, a "colorimetry procedure" is executed to determine the color of the object, and then a colorimetric compensation value CC is calculated based on the determined color of the object. In S17, an "exposure value colorimetric compensation procedure" is executed, where the exposure value Lvd obtained at S15 is compensated based on the calorimetric compensation value CC.

At S18, if the shutter-release switch SWR is ON (S18: YES), the exposure control device 23 controls the exposure operation at S20 in accordance with the exposure value Lvd obtained at S17 to executed a photographing operation. If the shutter-release switch SWR is OFF, controls goes to S19, where it is detected whether a photometry timer is OFF.

If the photometry timer is ON (i.e., if a predetermined period has not elapsed) (S19: NO), control proceeds to S12, and the foregoing procedures are repeated. If the photometry timer is OFF (i.e., if the predetermined period has elapsed) (S19: YES), control proceeds to S11.

FIG. 8 is a flowchart illustrating the "lens communication procedure", which is called at S12 of the main procedure shown in FIG. 7.

In the lens communication procedure, the controller 20 accesses the lens ROM 11 through the electrical contacts 10, and reads the data intrinsic to the photographing lens 2 stored in the lens ROM 11 (S101). The data is stored in the RAM 27 of the controller 20, and control returns. Items included in the data intrinsic to the photographing lens 2 include, for example, a lens type, lens data, the shortest focusable distance, a focusable range, a focal length of the photographing lens, an exit pupil position, an open f-number, an aperture efficiency and the like. In this embodiment, the controller 20 reads at least the focal length, the exit pupil position, the open aperture and the aperture efficiency, and stores the data in the RAM 27.

FIG. 9 shows a flowchart illustrating the "photometry sensor Bvd calculation procedure", which is called as S13 in the main procedure shown in FIG. 7.

In this procedure, data Bvad(i) which represents A/D converted output voltages (analog data) of the photometry areas Ai (i=0, 1, . . . , 5) shown in FIG. 4 of the photometry sensor 9D for normal light are obtained. Further, data Bvad·g(i) , Bvad·g(i) and Bvad·r(i) which represent A/D converted values of the output voltages of the photometry areas Ai (i=0, 1, 2, . . . 5) of each of the sensors 9G, 9B and 9R for color components are obtained. Then, the A/D converted values Bvad(i) of the sensor 9D output are adjusted to brightness values Bvd(i) (S111). The A/D converted values Bvad·g(i), Bvad·b(i) and Bvad·r(i) are also adjusted to the brightness values Bvd·g(i), Bvd·b(i) and Bvd·r(i), respectively (S112). It should be noted that the A/D conversion at steps S111 and S112 are well-know A/D conversion procedure. and the output voltage values (analog data) are converted into corresponding digital data.

FIG. 10 is a flowchart illustrating the "open aperture photometry compensation calculation procedure" which is called at S14 of the main procedure shown in FIG. 7.

At S121, an open aperture photometry compensation value Mnd1(i) is calculated based on the focal length, the exit pupil position, the open aperture and the aperture efficiency stored in the RAM 27. Compensation values mv1, mv2, mv3 and mv4 for compensating for shift amounts with respect to the reference photometry values due to the individual differences of the optical characteristics of the cameras, and the focal length, the exit pupil position, the open aperture and the aperture efficiency, are determined. Then, the sum of the compensation values mv1+mv2+mv3+mv4 is obtained, which is referred to as the open aperture compensation value Mnd1(i). Following the similar procedure, the open aperture compensation values Mnd1·g(i), Mnd·b(i), and Mnd1·r are calculated. Then the open aperture compensation value Mnd1(i) is added to the brightness value Bvd(i). and then the sum is determined as a new brightness value Bvd(i). Thus, the following calculation is executed at S121:

$$Bvd(i)=Bvd(i)+Mnd1(i).$$

Similar to the above, with respect to the brightness values Bvd·g(i), Bvd·b(i) and Bvd·r(i) obtained by the photometry sensors 9G, 9B and 9R, open aperture photometry compensation values Mnd1·g(i), Mnd1·b(i) and Mnd1·r(i) are added to obtain newly defined brightness values (S122). That is:

$$Bvd\cdot g(i)=Bvd\cdot g(i)+Mnd\cdot 1\cdot g(i).$$

$$Bvd\cdot b(i)=Bvd\cdot b(i)+Mnd\cdot 1\cdot b(i).$$

$$Bvd\cdot r(i)=Bvd\cdot r(i)+Mnd\cdot 1\cdot r(i).$$

As a result, each brightness value is free from the affect of the individual differences of photographing lenses 2 when coupled to the camera body 1.

FIG. 11 is a flowchart illustrating an "exposure value calculating procedure", which is called at S15 of the main procedure.

In the "exposure value calculating procedure", the brightness values Bvd(i) are compensated in accordance with a photographing condition to obtain an appropriate exposure value Lvd. Specifically, in the "exposure value calculating procedure", the brightness values Bvd(i) (where i=0–5) corresponding to the photometry areas A0–A5 are compared with each other, or the brightness of the object as a whole is detected, and a condition of the object to be photographed (e.g., photographing with rear light, photographing at dusk, or photographing at night) is determined. Then, based on the determined condition, the brightness values Bvd(i) are weighted, or one of the brightness values Bvd(i) is selected and then the exposure value Lvd suitable to the photographing condition is determined. Then, based on the brightness values Bvd(i), parameters for calculating the exposure value are calculated at S131. Then, the upper brightness limit of a parameter is calculated (S132), compensation value for the rear light is calculated (S133), weighting parameters are calculated (S134), a photographing magnification M is checked (S135), a photographing scene is judged (S136), a positive compensation value for a high brightness photographing scene is calculated (S137), and the exposure value Lvd is calculated based on the calculated parameters and the brightness values Bvd(i) (S138).

FIG. 12 is a flowchart illustrating a "colorimetry procedure" called at S16 of the main procedure.

In the "colorimetry procedure", the color of the object is detected, and a colorimetric compensation value CC is calculated in accordance with the detected color of the object.

At S21, colorimetric parameters are initialized (i.e., set to initial values). Depending on the color temperature of a light source illuminating the object, the colorimetric value varies. At S22, a "light source compensation procedure" is executed to obtain compensation values for the effects of the color temperature of the light source. At S23, a "light source compensation procedure" is executed using the compensation values obtained at S22. At S24, a "calorimetric parameter calculation procedure" for obtaining colorimetric parameters, which will be used for execution of a "colorimetric calculation procedure". At S25, a "colorimetric constant setting procedure" is executed to set constants used for color measurement. At S26, a "color judgment procedure" for judging a color based on the compensation values, parameters and constants obtained in the preceding steps is executed. At S27, an "area calorimetric compensation value calculating procedure" is executed for calculating calorimetric compensation values CC(i) for the photometry areas A0–A5 in accordance with the judged color. At S28, a CC calculating procedure for calculating a calorimetric compensation value CC for an entire object in accordance with the colorimetric compensation values CC(i) for the respective photometry areas is executed.

At S17 (see FIG. 7), the exposure value Lvd obtained at S15 is compensated based on the colorimetric compensation value CC as a whole to obtain a final exposure value Lvd. That is, the final exposure value Lvd is calculated by the formula below:

$$Lvd=Lvd+CC.$$

Next, steps S22–S28 shown in FIG. 12 will be described in further detail.

FIG. 13 is a flowchart illustrating the "light source compensation procedure" called at S22 of FIG. 12. In the embodiment, when the Bvd value of the photometry sensors 9 is set, a predetermined light source (light source A) for adjustment is used. When a photographing is to be executed, the Bvd should be compensated in accordance with the actually used light source, for example, the sun light. In the procedure shown in FIG. 13, relative compensation values of B (blue) and R (red) components with respect to the value for the green component are obtained.

Specifically, for the color components G, B and R, light source data Bvd·light·g, Bvd·light·b, Bvd·light·r is read from the EEPROM 26 of the controller 20 (S141). Then, a light source adjustment value adj·sun·b for the photometry sensor 9B and a light source adjustment value adj·sun·r for the photometry sensor 9R with respect to the value for G component are read from the EEPROM 26 (S142, S145). In the embodiment, the light source adjustment values are as follows (S145).

$$adj\cdot sun\cdot b=+8$$

$$adj\cdot sun\cdot r=-4$$

It should be noted that, if the adjustment of the sensors 9 is executed using the sun light instead of the predetermined light source A, the light source adjustment values are all zero.

Then, based on the light source data and the light source adjustment values, a light source compensation value light·gb for the photometry sensor 9B is obtained as follows (S143).

$$light\cdot gb = Bvd\cdot light\cdot g - Bvd\cdot light\cdot b + adj\cdot sun\cdot b$$

Similarly, a light source compensation value light·gr for the photometry sensor 9R is obtained as follows (S144).

$$light\cdot gr = Bvd\cdot light\cdot g - Bvd\cdot light\cdot r + adj\cdot sun\cdot r$$

FIG. 14 is a flowchart illustrating the "light source compensation procedure", which is called at S23 in FIG. 12. In this procedure, based on the light source compensation values for B and R, obtained at S22, the light source compensation is applied to the brightness values Bvd·b(i) and Bvd·r(i) (i=0–5) obtained at areas A0–A5 of the photometry sensors 9B and 9R, respectively.

At S151, for each photometry area of the photometry sensor 9B, the following calculation is executed.

$$Bvd\cdot b(i) = Bvd\cdot b(i) + light\cdot gb.$$

At S152, for each photometry area of the photometry sensor 9R, the following calculation is executed.

$$Bvd\cdot r(i) = Bvd\cdot r(i) + light\cdot gr.$$

With the above compensation, the photometry sensors 9G, 9B and 9R has the same photometric characteristics for the sun light.

FIG. 15 is a flowchart illustrating the "calorimetric parameter calculation procedure", which is called at S24 of FIG. 12. In this procedure, colorimetric parameters used in the calorimetric judging are calculated. As the calorimetric parameters, parameters Gf(i) for G component, parameters Bf(i) for B component, and parameters Rf(i) for R component are calculated (S161, S162 and S163) according to the following formulae.

$$Gf(i) = Bvd\cdot g(i) - \{Bvd\cdot b(i) + Bvd\cdot r(i)\}/2;$$

$$Bf(i) = Bvd\cdot b(i) - \{Bvd\cdot g(i) + Bvd\cdot r(i)\}/2;$$

and $$Rf(i) = Bvd\cdot r(i) - \{Bvd\cdot b(i) + Bvd\cdot g(i)\}/2.$$

FIG. 16 is a flowchart illustrating the calorimetric constant setting procedure, in which the calorimetric constants are read from the EEPROM 26. The calorimetric constants include:

threshold values for color judgment: THvalue·*1(i):

coefficients for color judgment: coefficient·#1(i) and coefficient·#2(i):

coefficients for calculating calorimetric compensation values: CCcoefficient·*1(i);

adjustment values for calculating the colorimetric compensation values: CCadjestment·*1(i).

In the above indication, a symbol * represents g (green), b (blue), r (red), m (magenta), y (yellow) or c (cyan), and a symbol # represents g (green), b (blue) or r (red). In this procedure, for all the photometry areas A0–A5 of the sensors 9, the colorimetric constants are set, respectively. Therefore, at S171, i is set to zero (0), and then, if i≦5 (S172: YES), the constants are read from the EEPROM (S173, S174, S175 and S176). Then, at S177, i is incremented by one, and control returns to S172. Thus, for i=0 through 5, steps S173–S176 are repeated. The constants read from the EEPROM 26 are stored in the RAM 27 of the controller 20. FIG. 17 shows an example of the constants read from the EEPROM 26.

FIGS. 18 and 19 show a flowchart illustrating the "color judgment procedure". The procedure judges the color for each of the photometry areas A0–A5 of the photometry sensors 9G, 9B and 9R, and determines the color of the object for each photometry area A0–A5.

At S181, i is set to 0. Then, if i≦5 (S182: YES), the following steps are repeated. In the following description, Color(i) represents color parameters, Color·max(i) and Color·min(i) represent color judgment parameters, respectively.

At S183, the color parameter Color(i) is set to colorless. Then, at S184, Rf(i) and THvalue·c1(i) are compared.

If Rf(i)<THvalue·c1(i) (S184:YES), |Bf(i)−Gf(i)| and |coefficient·r1(i)×Rf(i)| are compared (S185).

If |Bf(i)−Gf(i)|<|cooefficient·r1(i)×Rf(i)| (S185:YES), Color·min(i) is set to Rf(i) (S186).

If Rf(i)≧THvalue·c1(i) (S184:NO) or |Bf(i)−Gf(i)|≧|coefficient·r1(i)×Rf(i)| (S185:NO), step S186 is skipped.

At S187, Gf(i) is compared with THvalue·m1(i).

If Gf(i)<THvalue·m1(i) (S187:YES), |Bf(i)−Rf(i)| and |coefficient·g1(i)×Gf(i)| are compared (S188).

If |Bf(i)−Rf(i)|<|coefficient·g1(i)×Gf(i)| (S188:YES), Color·min(i) is set to Gf(i) (S189).

If Gf(i)>THvalue·m1(i) (S187:NO) or |Bf(i)−Rf(i)|≧|coefficient·g1(i)×Gf(i)| (S188:NO), step S189 is skipped.

At S190, Gf(i) is compared with THvalue·g1(i).

If Gf(i)>THvalue·g1(i) (S190:YES), |Bf(i)−Rf(i)| and |coefficient·g2(i)×Gf(i)| are compared (S191).

If |Bf(i)−Rf(i)|<|coefficient·g2(i)×Gf(i)| (S191:YES), Color·max(i) is set to Gf(i) (S192).

If Gf(i)≦THvalue·g1(i) (S190:NO) or |Bf(i)−Rf(i)|≧|coefficient·g2(i)×Gf(i)| (S191:N0), step S192 is skipped.

At S193, Bf(i) is compared with THvalue·b1(i).

If Bf(i)>THvalue·b1(i) (S193:YES), |Gf(i)−Rf(i)| and |coefficient·b2(i)×Bf(i)| are compared (S194).

If |Gf(i)−Rf(i)|<|coefficient·b2(i)×Bf(i)| (S194:YES), Color·max(i) is set to Bf(i) (S195). If Bf(i)≦THvalue·b1(i) (S193:NO) or |Gf(i)−Rf(i)|>|coefficient·b2(i)×Bf(i)| (S194:NO), step S195 is skipped.

At S196, Rf(i) is compared with THvalue·r1(i).

If Rf(i)>THvalue·r1(i) (S196:YES), |Bf(i)−Gf(i)| and |coefficient·r2(i)×Rf(i)| are compared (S197).

If |Bf(i)−Gf(i)|<|coefficient·r2(i)×Rf(i)| (S197:YES), Color·max(i) is set to Rf(i) (S198). If Rf(i)≦THvalue·r1(i) (S196:NO) or |Bf(i)−Gf(i)|≧|coefficient·r2(i)×Rf(i)| (S197:NO), step S198 is skipped.

At S199, Bf(i) is compared with THvalue·y1(i).

If Bf(i)<THvalue·y1(i) (S199:YES), |Gf(i)−Rf(i)| and |coefficient·b1(i)×Bf(i)| are compared (S200).

If |Gf(i)−Rf(i)|<|coefficient·b1(i)×Bf(i)| (S200:YES), Color·min(i) is set to Bf(i) (S201). If Bf(i)>THvalue·y1(i) (S199:NO) or |Gf(i)−Rf(i)|≧ coefficient·b1(i)×Bf(i)| (S200:NO), step S201 is skipped.

During the above steps, for each of the photometry areas A0–A5, color·max(i) and color·min(i) are obtained.

At S202, color min(i) and Rf(i) are compared. If color·min(i) is equal to Rf(i) (S202:YES), color(i) is set to cyan (S203). If color·min(i) is not equal to Rf(i), color·min(i) and Gf(i) are compared at S204. If color·min(i) is equal to Gf(i) (S204:YES), color(i) is set to magenta (S205). If color·min(i) is not equal to Gf(i), color·max(i) and Gf(i) are compared at S206. If color·max(i) is equal to Gf(i) (S206:YES), color(i) is set to green (S207). If color·max(i) is not equal to Gf(i) (S206:NO), then color·max(i) and Bf(i) are compared at S208. If color·max(i) is equal to Bf(i), color(i) is set to blue (S209). If color·max(i) is not equal to Bf(i) (S208:NO), then color·max(i) is compared with Rf(i) at S210. If color·max(i) is equal to Rf(i) (S210:YES), then color(i) is set to red (S211). If color·max(i) is not equal to Rf(i) (S210:NO), then color·min(i) is compared with Bf(i) at S212. If color·min(i) is equal to Bf(i) (S212:YES), color(i) is set to yellow (S213), and control proceeds to S214. If color·min(i) is not equal to Bf(i) (S212:NO), step S213 is skipped, and control proceeds to S214, where i is incremented by one. Then, control proceeds to S182 As a result of the above-described procedure, yellow has the highest priority, and in the foregoing steps, the color finally selected in accordance with the conditions is determined as the color of the photometry area.

FIG. 20 is a flowchart illustrating an example of the "area colorimetric compensation value calculating procedure", which is called at S27 of the colorimetry procedure in FIG. 12.

In this procedure, the colorimetric compensation values CC(i) corresponding to the difference of the color among the photometry areas are calculated. In the example shown in FIG. 20, the compensation values CC(i) are determined by selecting values from among predetermined values.

At S221, i is set to an initial value of zero. At S222, it is judged whether i is smaller than five. If i is 0, 1, 2, 3, 4 or 5, (S222:YES), it is judged whether color(i) is colorless (S223). If color(i) is colorless (S223:YES), CC(i) is set to zero (S224). If color(i) is not colorless (S223:NO), step S224 is skipped. At S225, it is judged whether color(i) is cyan. If color(i) is cyan (S225:YES), CC(i) is set to C (S226). If color(i) sensitivity is not cyan (S225:NO), then step S226 is skipped. At S227, it is judged whether color(i) is magenta. If color(i) is magenta (S227:YES), CC(i) is set to M (S228). If color(i) is not magenta (S227:NO), then step S228 is skipped. At S229, it is judged whether color(i) is green. If color(i) is green (S229:YES), CC(i) is set to G(S230). If color(i) is not green (S229:NO), then step S230 is skipped. At S231, it is judged whether color(i) is blue. If color(i) is blue (S231:YES), CC(i) is set to B (S232). If color(i) is not blue (S231:NO), then step S232 is skipped. At S233, it is judged whether color(i) is red. If color(i) is red (S233:YES), CC(i) is set to R (S234). If color(i) is not red (S233:NO), then step S234 is skipped. At S235, it is judged whether color(i) is yellow. If color(i) is yellow (S235:YES), CC(i) is set to Y (S236). If color(i) is not yellow (S235:NO), then step S236 is skipped. Then, at S237, i is incremented by one, and control returns to S222.

FIG. 21 shows a table in which the relationship between the compensation value CC(i) determined in the procedure shown in FIG. 20 and the actual compensation values is indicated.

FIG. 22 shows an alternative example of the "area colorimetric compensation value calculation procedure". In this procedure, the colorimetric compensation value CC(i) is obtained by calculation. It should be noted that steps S226, S228, S230, S232, S234 and S236. In FIG. 20 are replaced with steps S241, S242, S243, S244, S245 and S246, respectively. In the procedure shown in FIG. 20, the compensation values CC(i) is determined by selecting one of Y, M, C, B, G and R indicated in FIG. 21. In the procedure shown in FIG. 22, the compensation value CC(i) is determined in accordance with the parameters and setting values, which have been obtained in the preceding steps.

Specifically, at step S241, when color(i) is judged to be cyan, the calorimetric compensation value CC(i) is calculated as follows.

$$CC(i) = CC\text{coefficient·}c1(i) \times \{Rf(i) - TH\text{value·}c1(i)\} + CC\text{adjustment·}c1(i)$$

When color(i) is judged to be magenta, the colorimetric compensation value CC(i) is calculated as follows at step S242.

$$CC(i) = CC\text{coefficient·}m1(i) \times \{Gf(i) - TH\text{value·}m1(i)\} + CC\text{adjustment·}m1(i)$$

When color(i) is judged to be green, the colorimetric compensation value CC(i) is calculated as follows at step S243.

$$CC(i) = CC\text{coefficient·}g1(i) \times \{Gf(i) - TH\text{value·}g1(i)\} + CC\text{adjustment·}g1(i)$$

When color(i) is judged to be blue, the colorimetric compensation value CC(i) is calculated as follows at step S244.

$$CC(i) = CC\text{coefficient·}b1(i) \times \{Bf(i) - TH\text{value·}b1(i)\} + CC\text{adjustment·}b1(i)$$

When color(i) is judged to be red, the colorimetric compensation value CC(i) is calculated as follows at step S245.

$$CC(i) = CC\text{coefficient·}r1(i) \times \{Rf(i) - TH\text{value·}r1(i)\} + CC\text{adjustment·}r1(i)$$

When color(i) is judged to be yellow, the colorimetric compensation value CC(i) is calculated as follows at step S246.

$$CC(i) = CC\text{coefficient·}y1(i) \times \{Bf(i) - TH\text{value·}y1(i)\} + CC\text{adjustment·}y1(i)$$

By repeating the procedure shown in FIG. 22 for i=0 through 5, the colorimetric compensation values for each of the photometry areas A0–A5 can be calculated.

FIG. 23 is a flowchart illustrating a "CC calculating procedure", which is called at S28 of the colorimetry procedure in FIG. 12.

At S251, in accordance with the calorimetric compensation value CC(i) for each photometry area, a colorimetric compensation value CC for all of the photometry areas by averaging, center-weighted averaging, or adopting of the maximum value.

When the averaging is performed, the compensation value CC is calculated as follows.

$$CC = \{CC(0) + CC(1) + CC(2) + CC(3) + CC(4) + CC(5)\}/6$$

The center-weighted averaging is a weighted averaging procedure, in which the central area is weighted, and the compensation value CC is calculated as follows.

$$CC = \{CC(0) \times 4 + CC(5) + (CC(1) + CC(2) + CC(3) + CC(4) \times 3/4)/8$$

When the maximum value is used as the compensation value CC, the compensation value CC is represented by the following formula.

$$CC = \max\{CC(0), CC(1), CC(2), CC(3), CC(4), CC(5)\}$$

As above, in the colorimetry procedure, the colorimetric compensation value CC can be obtained. Using the compensation value CC, the exposure value Lvd is compensated to obtain the final exposure value Lvd.

Then, in accordance with the exposure value Lvd, the exposure control device controls the exposure operation of the camera. With this configuration, regardless of the color of the object, in other words, regardless of the reflectivity of the object, an appropriate exposure value can always be obtained. In particular, when the object color is determined to be yellow, the exposure compensation value is determined to increase the exposure value, and when the object color is determined to be blue, the exposure compensation value is determined to decrease the exposure value. With this configuration, errors in determining the exposure value when such objects are photographed, which has been desired to be solved, can be resolved.

Further, since each photometry sensor is configured to have a plurality of photometry areas, and the exposure values and the compensation values are determined in accordance with the measured values at the plurality of photometry areas, an appropriate exposure compensation value can be determined when the entire object has a predetermined color, or when the object includes a plurality of portions having different colors.

In the first embodiment, as shown in FIG. 3A, the sensor 9D for the normal light is provided at the upper central portion on the eyepiece optically system side of the pentagonal prism 5. Therefore, with respect to the object, the sensor 9D is located at the central portion in the right-and-left direction. With this structure, if the sensor 9D has a symmetrical sensitivity distribution in the right-and-left direction, the brightness of the central portion of the object can be measured at high accuracy. That is, at the central portion of the pentagonal prism 5, an angle formed between the optical axis of the photographing lens 2 and the optical axis of the eyepiece optical system 6 of the pentagonal prism 5 can be made relatively small, and therefore, the sensor 9D covers substantially all the photographing angle of the object.

Figure 3B:
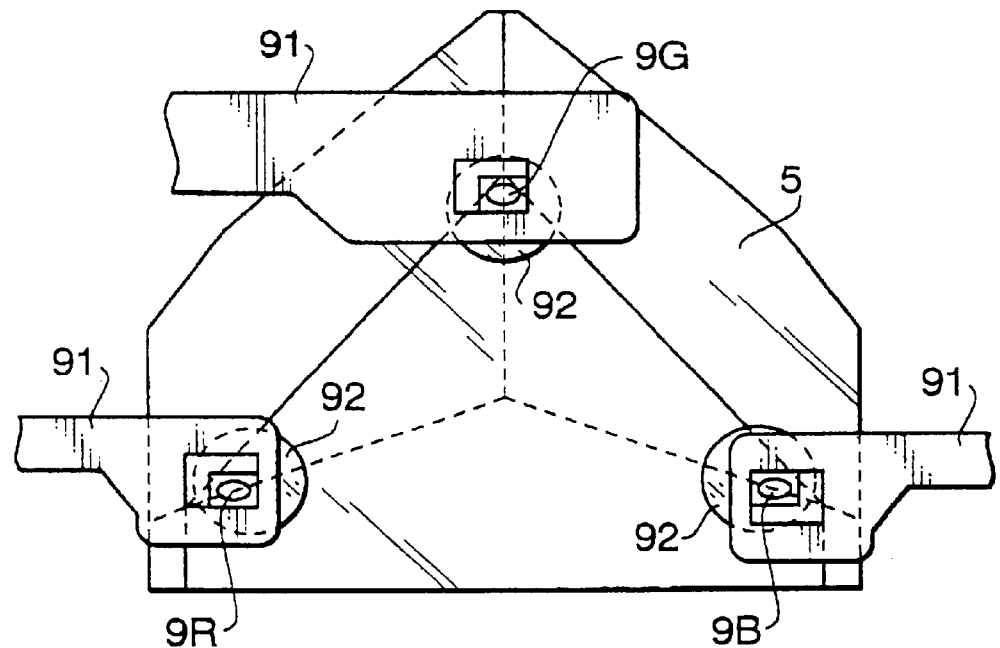
FIG. 3B shows an alternative arrangement of photometry sensors.

In the first embodiment described above, the sensor 9D for the normal light is provided besides the sensors 9B, 9G and 9R for B, G and R color components. The light receiving characteristics of the sensor G has a peak at the wavelength of 540 nm. This characteristic is close to that of the sensor 9D Therefore, the sensor 9G is used instead of the sensor 9D, and the sensor 9D is omitted, as shown in FIG. 3B. In such a case, in steps S11–S15 of the main procedure (FIG. 7), the output Bvad·g of the sensor 9G is used as Bvad, and the calculation is to be executed.

With such a structure, since the number of the sensors is reduced, the manufacturing cost can be reduced. Further, a space necessary for arranging the sensors can be reduced, which enables downsizing of the camera body. In the case of FIG. 3B, since the sensor 9G is arranged at the upper central portion on the eyepiece optical system side of the pentagonal prism, photometry can be done accurately.

Second Embodiment

A photometry device according to a second embodiment will be described hereinafter. The photometry device according to the second invention can also be employed in a camera 1000A shown in FIG. 24, which is substantially the same as the camera 1000 described above except that the camera 1000A is provided with a photometry mode selection switch 28.

FIG. 25 shows a block diagram of main portions of the camera 1000A. As described above, the block diagram shown in FIG. 25 is substantially the same as the block diagram shown in FIG. 6 except that the photometry mode selection switch 28 is provided in FIG. 25. The photometry mode selection switch 28 is used for selecting a photometry mode such as a divisional photometry mode, an averaging photometry mode, a center-weighting photometry mode or a spot photometry mode for obtaining the exposure value.

Upon operation of the photometry mode selection switch 28, a photometry mode signal representative of the selected mode is input to the controller 20.

FIG. 26 is a flowchart illustrating a main procedure of the photometry device according to the second embodiment. Steps S11–S14 and steps S18, S19 and S20 are the same as those in the procedure shown in FIG. 7. Steps S15–S17 of FIG. 7 are replaced with steps S115–S117 in FIG. 26.

When the release button 22 is half depressed and the photometry switch SWS is ON (S11: YES), a "lens communication procedure" is performed (S12) so that the controller 20 receives data intrinsic to the photographing lens 2 currently mounted onto the camera body 1. Specifically, the data intrinsic to the photographing lens 2 includes an open aperture value, a focal length of the photographing lens 2 and the like which may affects the photometry calculation, intrinsic to the photographing lens 2. The data is input from a lens ROM 11 of the photographing lens 2 to the controller 20 through the electrical contacts 10. Then, a "photometry sensor output Bvd calculation procedure" is executed (S13). In this procedure, the photometry sensors 9 (9D, 9G, 9B and 9R) outputs analog photometry values which are obtained by receiving light through the photographing lens 2, quick return mirror 3, the pentagonal prism 5. Then, the analog values of each photometry area A0, A1, A2, A3, A4 or A5 of the potometry senser 9D are converted into digital brightness values Bvd[i] which can be used in the operation executed by the controller 20. (herein, [i] means corresponding to 0 to 5 of the photometry area A0, A1, A2, A3, A4 or A5) Then, based on the brightness value data Bvd[i] obtained at S13 and the lens data intrinsic to the photographing lens 2 retrieved at S12, an "open aperture photometry compensation calculation procedure" is executed (S14) to compensate for errors depending on different photographing lenses.

At S115, based on the brightness value Bvd[i] obtained by each photometry area A0, A1, A2, A3, A4, and A5 of the sensors 9R, 9B and 9G for the RGB (Red, Green and Blue) color components, a "colorimetry procedure" is executed to determine the color of the object at each photometry area A0, A1, A2, A3, A4 or A5, and then calculates calorimetric compensation values CC(i) of each photometry area A0, A1, A2, A3, A4 or A5 at S116. At S117, an "exposure value calculation procedure" is executed. In this procedure, the colorimetric compensation values CC(i) is added to the brightness values Bvd(i), respectively. Then, based on the brightness values Bvd(i), an exposure value Lvd is calculated. In this procedure, when the exposure value Lvd is obtained, a predetermined calculation in accordance with the photometry mode selected using the photometry mode selection switch 28 is performed.

At S18, if the shutter-release switch SWR is ON (S18: YES), the exposure control device 23 controls the exposure operation in accordance with the exposure value Lvd obtained at S117 to executed a photographing operation. If the shutter-release switch SWR is OFF, controls goes to S19, where it is detected whether a photometry timer is OFF.

If the photometry timer is ON (i.e., if a predetermined period has not elapsed) (S19: NO), control proceeds to S12, and the following procedures are repeated. If the photometry timer is OFF (i.e., if the predetermined period has elapsed) (S19: YES). control proceeds to S11.

FIG. 27 is a flowchart illustrating a "colorimetry procedure", which is called at S115 of the main procedure shown in FIG. 26.

In the "colorimetry procedure", the color of the object is detected. The procedure is similar to steps S21–S26 of the procedure shown in FIG. 12, and accordingly, the description thereof will be omitted. According to the second embodiment, after the "color determining procedure" is executed at S26, the "colorimetry procedure" is terminated, and control returns.

FIG. 28 is a flowchart illustrating an "exposure value calculating procedure", which is called at S117 of the main procedure shown in FIG. 26. The "exposure value calculation procedure" is a procedure for obtaining a suitable exposure value Lvd based on the brightness values Bvd(i) and a photographing condition. Specifically, in this procedure, for example, by comparing the brightness values Bvd(i) with each other, a photographing conditions, e.g., a rear light photographing, a magnification and/or scene of photographing, is judged. Then, based on the photographing condition as judged, the exposure value Lvd is calculated by applying a predetermined algorithm with respect to the brightness values Bvd(i). For example, the exposure value Lvd suitable to the photographing condition may be determined by weighted-averaging the brightness values Bvd(i), or by selecting one of the brightness values Bvd(i).

At S131, a colorimetric compensation calculation is executed. In the colorimetric compensation calculation, colorimetric compensation values CC(i) for the photometry areas A0–A5 is added to the brightness values Bvd(i) for the photometry areas A0–A5, respectively, to obtain the compensated brightness values Bvd(i). That is:

$$Bvd(i)=Bvd(i)+CC(i)$$

Then, in accordance with the setting of the photometry mode selection switch 28, a photometry mode flag is set (S132). At S133, an "exposure value calculation procedure" is executed to calculate the exposure value Lvd in accordance with the photometry mode represented by the photometry mode flag.

FIG. 29 shows a flowchart illustrating the "exposure value calculation procedure" which is called at S133 of the flowchart shown in FIG. 28.

At S301, the photometry mode flag is checked. Depending on the photometry mode flag, control diverges to one of S302, S303, S304 and S305. Specifically, when the photometry mode flag represents the divided photometry, control proceeds to S302 and a divided-photometry exposure value Lvd is calculated. If the photometry mode flag represents the averaging photometry, control proceeds to S303 and an averaged-photometry exposure value Lvd is calculated. If the photometry mode flag represents the center-weighted photometry, control proceeds to S304 and a center-weighted photometry exposure value Lvd is calculated. If the photometry mode flag represents the spot photometry, control proceeds to S305 and a spot photometry exposure value Lvd is calculated.

FIG. 30 shows a flowchart illustrating a "divided-photometry exposure value calculation procedure", in which the exposure value Lvd is determined based on the compensated brightness values Bvd(i). Firstly, based on the compensated brightness values Bvd(i) for the photometry areas A0–A5 of the sensor 9D, parameters for calculating the exposure value Lvd is obtained (S311). Then, the parameters are compensated based on an upper limit of the brightness (S312), a rear light condition (S313), weighted parameter calculation (S314), a photographing magnification (S315), a photographing scene (S316), a positive compensation for the high brightness photographing scene (S317). Then, based on the compensated parameters, the exposure value Lvd is obtained (S318).

When the averaged-photometry exposure value is obtained at S303 of FIG. 29, the exposure value Lvd is calculated merely by averaging the brightness values Bvd(i) as follows:

$$Lvd=\{Bvd(0)+Bvd(1)+Bvd(2)+Bvd(3)+Bvd(4)+Bvd(5)\}/6$$

When the center-weighted exposure value is obtained at S304 of FIG. 29, the exposure value Lvd is calculated based on the following formula:

$$Lvd=\{(Bvd(0)\times 4)+Bvd(5)+(Bvd(i)+Bvd(2)+Bvd(3)+Bvd(4))\times 3/4\}/8$$

When the spot -photometry exposure value is obtained at S305 of FIG. 29, the maximum value of the brightness values Bvd(i) is selected. That is:

$$Lvd=\max\{Bvd(0), Bvd(i), Bvd(2), Bvd(3), Bvd(4)\ Bvd(5)\}$$

Alternatively, the brightness value Bvd(0) of the central photometry area A0 may be used as the exposure value Lvd.

FIG. 31 shows a relationship between the photometry areas A0–A5 and a plurality of distance measuring points for detecting a focusing condition using the multi distance measuring device 8. It should be noted that, when the divided-photometry, center-weighted photometry, or the spot photometry is selected. weight of the brightness values Bvd(i) corresponding to the areas including the distance measuring points P0, P1 and P2 (i.e., the areas A0, A1 and A2 in this example) may be increased, and then the calculation described above may be done. Alternatively, a compensated brightness value Bvd(i) of one of the areas including the distance measuring points may be selected and used as the exposure value Lvd as it is. Further alternatively, when the compensated brightness values are calculated, weight of the brightness values corresponding to the areas focused by the multi distance measuring device 8 is increased and calculation is performed, and then thus compensated brightness values Bvd(i) maybe used for determining the exposure value Lvd. Alternatively or optionally, only the compensated brightness values corresponding to the areas focused by the distance measuring device 8 may be used for calculating the exposure value.

Then, in accordance with the exposure value Lvd, the exposure control device controls the exposure operation of the camera. With this configuration, regardless of the color of the object, in other words, regardless of the reflectivity of the object, an appropriate exposure value can always be obtained. In particular, when the object color is determined to be yellow, the exposure compensation value is determined to increase the exposure value, and when the object color is determined to be blue or red, the exposure compensation value is determined to decrease the exposure value. With this configuration, errors in determining the exposure value when such objects are photographed, which has been desired to be solved, can be dissolved.

Further, since each photometry sensor is configured to have a plurality of photometry areas, and the exposure values and the compensation values are determined in accordance with the measured values at the plurality of photometry areas, an appropriate exposure compensation value can be determined when the entire object has a predetermined color, or when the object includes a plurality of portions having different colors.

In the second embodiment, as shown in FIG. 3A, the sensor 9D for the normal light is provided at the upper central portion on the eyepiece optically system side of the pentagonal prism 5. Therefore, with respect to the object, the sensor 9D is located at the central portion in the right-andleft direction With this structure, if the sensor 9D has a symmetrical sensitivity distribution in the right-and-left direction, the brightness of the central portion of the object can be measured at high accuracy. That is, at the central portion of the pentagonal prism 5, an angle formed between the optical axis of the photographing lens 2 and the optical axis of the eyepiece optical system 6 of the pentagonal prism 5 can be made relatively small, and therefore, the sensor 9D covers substantially all the photographing angle of the object.

In the second embodiment described above, the sensor 9D for the normal light is provided besides the sensors 9B, 9G and 9R for B, G and R color components. The light receiving characteristics of the sensor G has a peak at the wavelength of 540 nm. This characteristic is close to that of the sensor 9D. Therefore, the sensor 9G is used instead of the sensor 9D, and the sensor 9D is omitted, as shown in FIG. 3B. In such a case, in steps S11–S117 of the main procedure (FIG. 26), the output Bvad·g of the sensor 9G is used as Bvad, and the calculation is to be executed.

With such a structure, since the number of the sensors is reduced, the manufacturing cost can be reduced. Further, a space necessary for arranging the sensors can be reduced, which enables downsizing of the camera body. In the case of FIG. 3B, since the sensor 9G is arranged at the upper central portion on the eyepiece optical system side of the pentagonal prism, photometry can be done accurately.

Third & Fourth Embodiment

FIG. 32 shows a perspective view of a camera 1000B employing a photometry device according to a third or fourth embodiment of the invention, and FIG. 33 schematically shows the main components of the camera 1000B.

The camera 1000B has a camera body 1, to which a photographing lens 2 is detachably coupled. The camera body 1 accommodates a quick return mirror 3, a focusing glass 4, a pentagonal prism 5 (or a pentagonal mirror), and an eyepiece optical system 6. A part of the quick return mirror 3 is formed to be a half mirror 3a (see FIG. 32), and behind the half mirror 3a, an auxiliary mirror 7 is provided. Light passed through the half mirror 3a is reflected by the auxiliary mirror 7, and is directed toward a distance measuring device 8. The distance measuring device 8 is used for an AF (Automatic focusing) control. On the pentagonal prism 5, three photometry sensors 9 are provided, each of which functions as a photometry element and receives light passed through the photographing lens 2. Based on the outputs of the photometry sensors 9, a photometry operation for determining exposure parameters is executed. On a front surface of the camera body 1, a window 1a is formed. Inside the window 1a, a photometry sensor 12 for a light source is provided. Further, in front of the photometry sensor 12, a semi-opaque diffusing plate 13 is arranged. The diffusing plate 13 receives the ambient light, which also illuminates an object, and the ambient light is metered using the photometry sensor 12 The photographing lens 2 and the camera body 1 are electrically connected through electrical contacts 10. Thus, a lens ROM 11 built in the photographing lens 2 is electrically connected to a control circuit 20 accommodated in the camera body 1. On an outer surface of the camera body 1, an LCD (liquid crystal display) 21, and various buttons such as a release button 22 and a photometry mode selection switch 28 are provided. Furthermore, inside the camera body 1, various mechanisms such as a film winding mechanism are provided. However, such mechanisms are conventionally known, and description thereof will be omitted for the sake of the simplicity.

FIG. 34A shows a rear view of the pentagonal prism 5. As shown in FIG. 34A, the three photometry sensors 9 includes a sensor 9D provided at an upper central portion of the eyepiece side of the pentagonal prism 5, and sensors 9G and 9B provided at lower side portions on the eyepiece side of the pentagonal prism 5. The photometry sensors 9D, 9G and 95 are mounted on an FPC (flexible printed circuit board) 91 and fixedly positioned at the above-described respective positions by the FPC 91. In front of (i.e., on the pentagonal prism side of) each of the photometry sensors 9D, 9G and 9B, a collecting lens 92 is provide to form an object image on each of the sensors 9D, 9G and 9B. Similarly to the first and second embodiments, each sensor 9 (9D, 9G and 9B) is constructed as a planar structure photometry IC chip that is configured such that a light receiving section and an amplifier AMP are integrally formed as shown in FIG. 4A. The light receiving section includes six photometry areas, i.e., a central area A0, a left area A1, a right area A2, an upper area A3, a lower area A4, and a peripheral area A5. FIG. 4B shows a relationship between the photometry areas A0–A5 and portions of an object The photometry areas A0–A5 of each sensor receives light from portions of an object as indicated in FIG. 4B, respectively. The photometry sensor 9G is provided with a green filter on its light receiving surface, and receives a green component of light, the photometry sensor 9B is provided with a blue filter on its light receiving surface, and receives a blue component of light. In this third embodiment, the two sensors 9G and 9B are used as calorimeter elements. Spectral sensitivity characteristics of the sensors 9G and 9B provided with the green and blue filters are indicated in FIG. 35A. The sensors 9G and 9B provided with the green and blue filters have peaks in sensitivity at approximately 540 nm and 420 nm, respectively. The remaining sensor 9D is not provided with a color filter, but a luminosity compensating filter is provided. The spectral sensitivity characteristic of the sensor 9D provided with the luminosity compensating filter has its peak within a wavelength range of 500–600 nm. The sensor 9D is used as a normal light detecting sensor.

FIG. 36 shows a block diagram of main portions of the camera 1000B. The three sensor 9D, 9G and 9B output values indicative of quantity of received light (components) to the controller 20, respectively. The photometry sensor 12 is also connected to the controller 20, and input a signal indicative of quantity of received ambient light to the controller 20. Further, the output (i.e., a distance value) of the distance measuring device 8 is input to the controller 20, which controls the AF device 25 to perform the automatic focusing operation.

Furthermore, the controller 20 is connected with a photometry switch SWS and a shutter-release switch SWR. The photometry switch SWS is ON when the release button 22 is half depressed. The shutter-release switch SWR is ON when the shutter button is fully depressed. When the shutter button is depressed halfway and the photometry switch SWS is turned ON, the controller 20 performs a photometry calculation in accordance with a predetermined algorithm, and calculates an exposure value. It should be noted that the calculation of the exposure value is executed in accordance with a photometry mode selected by the photometry mode selection switch 28. Then, the controller 20 controls the exposure control device 23 in accordance with the calculated exposure value to perform a photographing operation. Further, the controller 20 drives a display driver 24 to display the calculated exposure value on the LCD panel 21. It should be noted that the controller 20 includes an EEPROM 26 storing various values necessary for the photometry calculation (which will be described in detail later), and a RAM 27 for temporarily storing various pieces of data.

FIG. 37 is a table indicating the flowcharts referred to in the description on the third and fourth embodiments. Flowcharts shown in FIGS. 40 and 43 will be referred to when the third embodiment is described, while flowcharts shown in FIGS. 53 and 54 will not be referred to when the third embodiment is described. Flowcharts shown in FIGS. 40 and 43 will not be referred to when the fourth embodiment is described, while flowcharts shown in FIGS. 53 and 54 will be referred to when the fourth embodiment is described.

An operation of the photometry device will be described hereinafter.

FIG. 38 shows a flowchart illustrating a main procedure of a photometry operation according to the third or fourth embodiment.

When the release button 22 is half depressed and the photometry switch SWS is ON (S1011: YES), a "lens communication procedure" is performed (S1012) so that the controller 20 receives data intrinsic to the photographing lens 2 currently mounted onto the camera body 1. Specifically, the data intrinsic to the photographing lens 2 includes an open aperture value. a focal length of the photographing lens 2 and the like, which may affects the photometry calculation, intrinsic to the photographing lens 2. The data is input from a lens ROM 11 of the photographing lens 2 to the controller 20 through the electrical contacts 10. Then, a "photometry sensor output Bvd calculation procedure" is executed (S1013). In this procedure, the photometry sensors 9 (9D, 9G and 9B) outputs analog photometry values which are obtained by receiving light through the photographing lens 2, a quick return mirror 3 and the pentagonal prism 5. Then, the analog values are converted into digital brightness values Bvd which can be used in the operation executed by the controller 20. Then, based on the brightness value data Bvd obtained at S1013 and the lens data intrinsic to the photographing lens 2 retrieved at S1012, an "open aperture photometry compensation calculation procedure" is executed (S1014) to compensate for errors depending on different photographing lenses.

At S1015, a "colorimetry procedure" is performed in accordance with the brightness values Bvd obtained by the sensors 9G and 9B to determine the color of the object. At S1016, based on the object color determined at S1015, a "colorimetric compensation value calculation procedure" is executed to determine colorimetric compensation values CC. Then, at S1017, an "exposure value calculation procedure" is executed. In this procedure, by compensating for the brightness value Bvd, which is obtained in accordance with the output of the photometry sensor 9D for normal light, using the colorimetric compensation values CC, an exposure value Lvd is calculated.

At S1018, if the shutter-release switch SWR is ON (S1018: YES), the exposure control device 23 controls the exposure operation (S1020) in accordance with the exposure value Lvd obtained at S1017 to executed a photographing operation. If the shutter-release switch SWR is OFF, controls goes to S1019, where it is detected whether a photometry timer is OFF.

If the photometry timer is ON (i.e., if a predetermined period has not elapsed) (S1019: NO), control proceeds to S1012, and the following procedures are repeated. If the photometry timer is OFF (i.e., if the predetermined period has elapsed) (S1019: YES), control proceeds to S1011.

FIG. 39 is a flowchart illustrating the "lens communication procedure", which is called at S1012 of the main procedure shown in FIG. 38.

In the "lens communication procedure", the controller 20 accesses the lens ROM 11 through the electrical contacts 10, and reads the data intrinsic to the photographing lens 2 stored in the lens ROM 11 (S1101). The data is stored in the RAM 27 of the controller 20, and control returns. Items included in the data intrinsic to the photographing lens 2 include, for example, a lens type, lens data, the Shortest focusable distance, a focusable range, a focal length of the photographing lens, an exit pupil position an open f-number, an aperture efficiency and the like. In this embodiment, the controller 20 reads at least the focal length, the exit pupil position, the open aperture and the aperture efficiency, and stores the data in the RAM 27.

FIG. 40 shows a flowchart illustrating the "photometry sensor Bvd calculation procedure", which is called at S1013 in the main procedure shown in FIG. 38.

In this procedure, data Bvad(i) which represents A/D converted output voltages (analog data) of the photometry areas Ai (i=0, 1, . . . , 5) shown in FIG. 4A of the photometry sensor 9D for normal light is obtained. Then, the A/D converted value Bvad(i) is adjusted to a brightness value Bvd(i) which corresponds to the brightness (S1111). Further, data Bvad·g(i) and Bvad·b(i) which represent A/D converted values of the output voltages of the photometry areas Ai (i=0, 1, 2, . . . 5) of the sensors 9G and 9B are obtained. The A/D converted values Bvad·g(i) and Bvad·b(i) are adjusted to represent the brightness values Bvd·g (i) and Bvd·b(i), respectively (S1112). It should be noted that the A/D conversion at steps S1111 and S1112 are well-know A/D conversion procedure, and the output voltage values (analog data) are converted into corresponding digital data.

FIG. 41 is a flowchart illustrating the "open aperture photometry compensation calculation procedure" which is called at S1014 of the main procedure shown in FIG. 38.

At S1121, an open aperture photometry compensation value Mnd1(i) is calculated based on the focal length, the exit pupil position, the open aperture and the aperture efficiency stored in the RAM 27. Specifically, compensation values mv1, mv2, mv3 and mv4 for compensating for shift amounts with respect to the reference photometry values due to the individual differences of the optical characteristics of the cameras, and due to the individual differences of the focal length, the exit pupil position, the open aperture and the aperture efficiency of each photographing lenses 2, are calculated. Then, the sum of the compensation values mv1+mv2+mv3+mv4 is obtained, which is referred to as the open aperture compensation value Mnd1 (i). Following the similar procedure, the open aperture compensation values Mnd1·g(i) and Mnd1·b(i) are calculated for the photometry sensor 9G and 9B. Then the open aperture compensation value Mnd1(i) is added to the brightness value Bvd(i), and then the sum is determined as a new brightness value Bvd (i). Thus, the following calculation is executed at S1121:

$$Bvd(i)=Bvd(i)+Mnd1(i).$$

Similar to the above, with respect to the brightness values Bvd·g(i) and Bvd·b(i) obtained by the photometry sensors 9G and 9B, open aperture photometry compensation values Mnd1·g(i) and Mnd1·b(i) are added to obtain newly defined brightness values S(1122). That is:

$$Bvd·g(i)=Bvd·g(i)+Mnd1·g(i).$$

$$Bvd·b(i)=Bvd·b(i)+Mnd1·b(i).$$

As a result, each brightness value is free from the affect of the individual differences of photographing lenses 2 when coupled to the camera body 1.

FIG. 42 is a flowchart illustrating a "colorimetry procedure" called at S1015 of the main procedure shown in FIG. 38.

In the "colorimetry procedure", the color of the object is detected, and a calorimetric compensation value CC is calculated in accordance with the detected color of the object.

At S1021, calorimetric parameters are initialized (i.e., set to initial values). Depending on the color temperature of a light source illuminating the object, the calorimetric value varies. At S1022, a "light source compensation procedure" is executed to obtain compensation values for the effects of the color temperature of the light source. At S1023, a "light source difference compensation procedure" is executed using the compensation values obtained at S1022. At S1024, a "colorimetric parameter calculation procedure" for obtaining colorimetric parameters, which will be used in a "color judgment procedure", is executed. At S1025, a "calorimetric constant setting procedure" is executed to set constants used for color measurement. At S1026, a "color judgment procedure" is executed to judge the color in accordance with the compensation values, parameters and the constants.

FIG. 43 is a flowchart illustrating the "light source compensation procedure" called at S1022 of FIG. 42. In the third embodiment, when the Bvd value of the photometry sensors 9 is set, a predetermined light source (A light source) for adjustment is used. When a photographing is to be executed, the Bvd should be compensated in accordance with the actually used light source, for example, the sun light. In the procedure shown in FIG. 43, relative compensation value of B (blue) component with respect to the value for the G (green) component are obtained.

Specifically, for the color components G and B, light source data Bvd·light·g and Bvd·light·b is read form the EEPROM 26 of the controller 20 (S1141). Then, a light source adjustment value adj·sun·b for the photometry sensor 9B with respect to the value for G component is read from the EEPROM 26 (S1142). In the embodiment, the light source adjustment is as follows (S1142A).

$$adj \cdot sun \cdot b = +8$$

It should be noted that, if the adjustment of the sensors 9 is executed using the sun light instead of the predetermined light source A, the light source adjustment value is zero.

Then, based on the light source data and the light source adjustment value, a light source compensation value light·gb for the photometry sensor 9B is obtained as follows (S1143).

$$light \cdot gb = Bvd \cdot light \cdot g \cdot Bvd \cdot light \cdot b + adj \cdot sun \cdot b$$

FIG. 44 is a flowchart illustrating the "light source difference compensation procedure". which is called at S1023 in FIG. 42. In this procedure, based on the light source compensation value for B, obtained at S1022, the light source compensation is applied to the brightness value Bvd·b(i) (i=0–5) obtained at areas A0–A5 of the photometry sensor 9B.

At S1151, for each photometry area of the photometry sensor 9B, the following calculation is executed.

$$Bvd \cdot b(i) = Bvd \cdot b(i) + light \cdot gb.$$

With the above compensation, the photometry sensors 9G and 9B have the same photometric characteristics for the sun light.

FIG. 45 is a flowchart illustrating the "calorimetric parameter calculation procedure", which is called at S1024 of FIG. 42. In this procedure, colorimetric parameters used in the calorimetric judging are calculated. As the colorimetric parameters, parameters Bf(i) for B component with respect to the photometric output Bvd·g(i) of the sensor 9G is calculated (S1161) according to the following formula.

$$Bf(i) = Bvd \cdot b(i) - Bvd \cdot g(i) \; (i=0-5)$$

FIG. 46 is a flowchart illustrating the "calorimetric constant setting procedure", in which the colorimetric constants are read from the EEPROM 26. The colorimetric constants include:

threshold values for color judgment: THvalue·b1(i) and THvalue·y1;

coefficients for calculating colorimetric compensation values: CCcoefficient·b1(i) and CCcoefficient·y1;

adjustment values for calculating the colorimetric compensation values: CCadjustment·b1(i) and CCadjustment·y1.

In the above indication, a symbol b1 represent blue, and y1 represents yellow, which is a complementary color of blue. In this procedure, for all the photometry areas A0–A5 of the sensors 9, the colorimetric constants are set, respectively. Therefore, at S1171, i is set to zero (0), and then, if i≦5 (S1172: YES). the constants are read from the EEPROM (S1173, S1174 and S1175). Then, at S1176, i is incremented by one, and control returns to S1172 Thus, for i=0 through 5, steps S1173–S1176 are repeated. The constants read from the EEPROM 26 are stored in the RAM 27 of the controller 20. FIG. 46A shows an example of the constants read from the EEPROM 26.

FIG. 47 shows a flowchart illustrating the "color judgment procedure". The procedure judges the color for each of the photometry areas A0–A5 of the photometry sensors 9G and 9B, and determines the color of the object for each photometry area A0–A5.

At S1181, i is set to 0. Then, if i≦5 (S1182: YES), the following steps are repeated.

At S1183, the color parameter Color(i) is set to colorless. Then, at S1184, Bf(i) and THvalue·b1(i) are compared. If Bf(i)>THvalue·b1(i) (S1184:YES), Color(i) is set to blue (S1185). If Bf(i)≦THvalue·b1(i) (S1184:NO) step S1185 is skipped.

At S1186, Bf(i) is compared with THvalue·y1(i). If Bf(i) <THvalue·y1(i) (S1186:YES), Color(i) is set to yellow (S1187). If Bf(i)s≦>THvalue·y1(i) (S1186:NO) step S1187 is skipped. At S1188, i is incremented by one. Then, control proceeds to S1182. With the above procedure, for each of the areas A0–A5, the color is determined from among one of colorless, blue and yellow.

FIG. 48 is a flowchart illustrating an example of the "colorimetric compensation value calculating procedure", which is called at S1016 of the main procedure shown in FIG. 38.

In this procedure, the calorimetric compensation values CC(i) corresponding to the difference of the color among the photometry areas are calculated. In the example shown in FIG. 48, the compensation values CC(i) are determined by selecting values from among predetermined values.

At S1221, i is set to an initial value of zero. At S1222, it is judged whether i is smaller than five. If i is 0, 1, 2, 3, 4 or 5, (S1222:YES), it is judged whether color(i) is colorless (S1223). If color(i) is colorless (S1223:YES), CC(i) is set to zero (S1224). If color(i) is not colorless (S1223:NO), step S1224 is skipped. At S1225, it is judged whether color(i) is blue. If color(i) is blue (S1225:YES), CC(i) is set to B (S1226). If color(i) is not blue (S1225:NO), then step S1226 is skipped. At S1227, it is judged whether color(i) is yellow. If color(i) is yellow (S1227:YES), CC(i) is set to Y (S1228). If color(i) is not yellow (S1227:NO), then step S1228 is skipped. Then, at S1229, i is incremented by one, and control returns to S1222. During this procedure, each of the compensation values CC(i) is set to 0, B or Y. It should be noted that B represents +6, and Y represents −8. By substituting these values, the compensation values CC(i) are obtained.

FIG. 49 shows an alternative example of the "calorimetric compensation value calculation procedure". In this alternative procedure the colorimetric compensation value CC (i) is obtained by calculation. It should be noted that steps S1226 and S1228 in FIG. 48 are replaced with steps S1231 and S1232, respectively. In the procedure shown in FIG. 49, the compensation value CC(i) is determined in accordance with the parameters and setting values, which have been obtained in the preceding steps.

Specifically, at step S1231, when color(i) is judged to be blue (S1225:YES), the colorimetric compensation value CC(i) is calculated as follows.

$$CC(i) = CC\text{coefficient-}b1(i) \times \{Bf(i) - TH\text{value-}b1(i)\} + CC\text{adjustment-}b1(i)$$

When color(i) is judged to be yellow (S1227:YES), the colorimetric compensation value CC(i) is calculated as follows at step S1232.

$$CC(i) = CC\text{coefficient-}y1(i) \times \{Bf(i) - TH\text{value-}y1(i)\} + CC\text{adjustment-}y1(i)$$

By repeating the procedure shown in FIG. 49 for i=0 through 5, the colorimetric compensation values for each of the photometry areas A0–A5 can be calculated.

FIG. 50 is a flowchart illustrating an "exposure value calculating procedure", which is called at S1017 of the main procedure shown in FIG. 38. The "exposure value calculation procedure" is a procedure for obtaining a suitable exposure value Lvd based on the compensated brightness values Bvd(i) and a photographing condition. Specifically, in this procedure, for example, by comparing the brightness values Bvd(i) with each other to determine a photographing condition, e.g., a rear light photographing, a magnification or scene of photographing. Then, based on the determined photographing condition, the exposure value Lvd is calculated by applying a predetermined algorithm with respect to the compensated brightness values Bvd(i). For example, the exposure value Lvd suitable to the photographing condition may be determined by weighted-averaging the compensated brightness values Bvd(i), or by selecting one of the compensated brightness values Bvd(i). The procedure is similar to that shown in FIG. 28, and therefore, description thereof will not be repeated.

FIG. 51 shows a flowchart illustrating the "exposure value determination calculation procedure", which is called at S133 of the exposure value (Lvd) calculation shown in FIG. 50. This procedure is similar to the procedure shown in FIG. 29, and therefore, description thereof will not be repeated.

FIG. 52 shows a flowchart illustrating a "divided photometry Lvd calculation procedure". This procedure is similar to that shown in FIG. 30, and therefore, description thereof will not be repeated.

As above, in the "colorimetry procedure", the colorimetric compensation value CC can be obtained. Using the compensation value CC, the exposure value Lvd is compensated to obtain the final exposure value Lvd.

Then, in accordance with the exposure value Lvd, the exposure control device controls the exposure operation of the camera. With this configuration, regardless of the color of the object, in other words, regardless of the reflectivity of the object, an appropriate exposure value can always be obtained. In particular, when the object color is determined to be yellow, the exposure compensation value is determined to increase the exposure value, and when the object color is determined to be blue, the exposure compensation value is determined to decrease the exposure value. With this configuration, errors in determining the exposure value when such objects are photographed, which has been desired to be solved, can be dissolved.

Further, since each photometry sensor is configured to have a plurality of photometry areas, and the exposure values and the compensation values are determined in accordance with the measured values at the plurality of photometry areas, an appropriate exposure compensation value can be determined when the entire object has a predetermined color, or when the object includes a plurality of portions having different colors.

In the third embodiment, two photometry sensors 9G and 9B are arranged inside the camera 1000B, and the colorimetry is performed using the light passed through the photographing lens. That is, a TTL colorimetry is performed. In such a configuration, the spectral reflectivity characteristics of the object and the spectral illumination characteristics of the light source are overlapped. Therefore, depending on the illumination characteristics of the light source, compensation values in accordance with the colorimetry may include errors and the appropriate exposure value may not be obtained. In the fourth embodiment described hereinafter, the spectral illumination characteristics of the light source is measured independently, and the photometry result is further compensated based on the spectral illumination characteristics of the external light source.

Fourth Embodiment

According to the fourth embodiment, in order to measure the spectral illumination characteristics of the external light source, the sensor 12 (see FIGS. 32 and 33) is used. The photometry sensor 12 is a photometry IC chip configured similarly to the sensors 9 (9D, 9G and 9B) as shown in FIG. 4A. It should be noted, however, that the sensor 12 uses only areas A0 and A1. Although not shown in the drawing, a green filter is provided in front of the photometry area A0, and a blue filter is provided in front of the photometry area A1. The green and blue filters respectively provided in front of the photometry areas A0 and A1,and the spectral sensitivity characteristics of the sensor 12, which receives the light passed through the green and blue filters are shown in FIG. 35B. It should be noted that the characteristics of the green and blue filters are similar to those provided in front of the photometry sensors 9G and 9B, respectively.

Constructed as above, the sensor 12 measures the illumination light emitted by the external light source using the photometry areas A0 and A1 by dividing the green and blue components. Since the all the photometry sensors are constructed similarly, the sensors have substantially the same spectral sensitivity and output characteristics. Further, since the same sensor is used for any one of the plurality of sensors, manufacturing cost can be reduced.

As above, in the fourth embodiment, the external light source is measured using the photometry sensor 12, and the light source compensation is performed in accordance with the photometry value of the sensor 12.

As described above with reference to FIG. 37, according to the fourth embodiment, at S1013 of the main procedure shown in FIG. 38, the procedure shown in FIG. 53 is called, and at S1022 of the flowchart shown in FIG. 42, the procedure shown in FIG. 54 is called.

FIG. 53 shows a flowchart illustrating the "photometry sensor output Bvd calculation procedure", which is called as S1013 in the main procedure shown in FIG. 38.

In this procedure, data Bvad(i) which represents A/D converted output voltages (analog data) of the photometry areas Ai (i=0, 1, . . . , 5) shown in FIG. 4 of the photometry sensor 9D for normal light is obtained. Then, the A/D converted values Bvad(i) of the sensor 9D output are adjusted to brightness values Bvd(i) (S1111). Further, data Bvad·g(i) and Bvad·g(i) which represent A/D converted values of the output voltages of the photometry areas Ai (i=0, 1, 2, . . . 5) of each of the sensors 9G and 9B for color components are obtained. The A/D converted values Bvad·g(i) and Bvad·b(i) are also adjusted to the brightness values Bvd·g(i) and Bvd·b(i), respectively (S1112). Furthermore, data Bvad·wb(i) (i=0–1) which represent A/D converted values of the output voltages of the photometry areas Ai (i=0, 1) of the sensor 12 are obtained. The A/D converted values Bvad·wb(i) are also adjusted to the brightness values Bvd·w(i), respectively (S1113). It should be noted that the A/D conversion at steps S1111, S1112 and S1113 are well-known A/D conversion procedure, and the output voltage values (analog data) are converted into corresponding digital data.

FIG. 54 is a flowchart illustrating the "light source compensation procedure" called at S1022 of FIG. 42. In the fourth embodiment, when the Bvd value of the photometry sensors 9 is set, a predetermined light source for adjustment is used. When a photographing is to be executed, the Bvd should be compensated in accordance with the actually used light source, for example, the sun light. In the procedure shown in FIG. 54, relative compensation value of B (blue) component with respect to the value for the G (green) component is obtained.

Specifically, for the color components G and B, the brightness values Bvd·wb(0) and Bvd·wb(1), which are measured using the photometry sensor 12 at S1113 of the flowchart shown in FIG. 53, are inputted (S1144). Then, alight source adjustment value adj·sun·b for the B component with respect to the G component is read from the EEPROM 26 (S1145). In the embodiment, the light source adjustment is as follows (S1145A).

Then, based on the light source data and the light source adjustment value, a light source compensation value light·gb for the photometry sensor 9B is obtained as follows (S1146).

light·gb=Bvd·wb(0)−Bvd·wb(1)+adj·sunb

The other procedures are similar to those in the third embodiment, and therefore, description thereof will not be repeated.

As above, according to the fourth embodiment, the effect of the spectral illumination characteristics of the external light source illuminating the object can be removed when the colorimetry is performed. Therefore, regardless of the types of the light source illuminating the object, the color of the object can be determined accurately. Accordingly, the compensation amount in accordance with the colorimetry operation can be made accurate, and an appropriate exposure value can be obtained.

In the third and fourth embodiments, a sensor for the G component is used as a first photometry sensor. However, it can be replaced with a Y sensor, which is a complement color of blue. In any event, the first sensor has a peak in its spectral sensitivity within a wavelength area greater than 500 nm, and the second sensor has a peak in its spectral sensitivity within a wavelength range less than 500 nm. Thus, if the first and second sensors measures light components which are the complement colors, various combinations can be realized.

As shown in FIG. 3A, the sensor 9D for the normal light is provided at the upper central portion on the eyepiece optically system side of the pentagonal prism 5. Therefore, with respect to the object, the sensor 9D is located at the central portion in the right-and-left direction. With this structure, if the sensor 9D has a symmetrical sensitivity distribution in the right-and-left direction, the brightness of the central portion of the object can be measured at high accuracy. That is, at the central portion of the pentagonal prism 5, an angle formed between the optical axis of the photographing lens 2 and the optical axis of the eyepiece optical system 6 of the pentagonal prism can be made relatively small, and therefore, the sensor 9D covers substantially all the photographing angle of the object.

In the third and fourth embodiments described above, the sensor 9D is provided independently from the sensors 9B and 9G for the B and G color components. The light receiving characteristics of the sensor G has a peak at the wavelength of 540 nm. This characteristic is close to that of the sensor 9D. Therefore, the sensor 9G is used instead of the sensor 9D, and the sensor 9D is omitted, as shown in FIG. 34B. In such a case, in steps S1011–S1015 of the main procedure (FIG. 38), the output Bvad·g of the sensor 9G is used as Bvad, and the calculation is to be executed.

With such a structure, since the number of the sensors is reduced, the manufacturing cost can be reduced. Further, a space necessary for arranging the sensors can be reduced, which enables downsizing of the camera body.

FIG. 55 is a side view of the camera 1000C which is a modification of the third/fourth embodiments. As described above, according to a modification of the third or fourth embodiment, the invention is realized using only two photometry sensors for the G and B components. In the modification shown in FIG. 55, a beam splitter 93 is provided behind the collecting lens 92 at the upper central portion on the eyepiece optical system side of the pentagonal prism 5. The beam splitter 93 splits the light into two components, which are directed to the photometry sensors 9B and 9G, respectively. With this structure, the angle formed between the optical axis of the photographing lens 2 and the optical axis of the eyepiece optical system 6 is made relatively small. Therefore, it becomes possible cover substantially the entire angle of view for photographing by the photometry sensors 9B and 9G. Further, if the beam splitter 93 is configured such that the transmissivity and reflectivity are changed at the wavelength of approximately 500 nm photometry can be performed with the characteristics shown in FIG. 35B without providing the filters, whose characteristics are indicated in FIG. 35A, onto the sensors 9G and 9B.

FIG. 56 shows a further modification of the third/fourth embodiments. In the example shown in FIG. 56, a trapezoidal prism 5A is employed in the eyepiece optical system. In this type of eyepiece optical system, the central area of the eyepiece optical system is used for finder view, and the photometry sensors should be arranged aside as shown in FIG. 56. In such an optical system, since only the two sensors for G and B components are sufficient, a photometry device as described above can be realized. Specifically, in FIG. 56, at side portions on the eyepiece side of the trapezoidal prism 5A, reflection prisms or mirrors 94 and 94 are arranged to direct the light toward the photometry sensors 9B and 9G. With this structure, the finder system and therefore the camera body can be downsized, and the manufacturing cost can be reduced.

The present disclosure relates to the subject matters contained in Japanese Patent Applications No. HEI 11-349983, filed on Dec. 9, 1999, No. 2000-119660, filed on Apr. 20, 2000, No. 2000-235358, filed on Aug. 3, 2000, No. 2000-239414, filed on Aug. 8, 2000, and No. 2000-332520, filed on Oct. 31, 2000, which are expressly incorporated herein by reference in their entireties.

What is claimed is:

1. A photometry device for a camera, comprising:
   a normal light metering system having spectral sensitivity characteristics close to visual sensitivity characteristics;
   a plurality of light metering systems, each light metering system having spectral sensitivity characteristics that are different from the spectral sensitivity characteristics of said normal light metering system;
   an exposure amount determining system that determines an exposure amount of an object in accordance with an output of said normal light metering system;
   a colorimetry system that judges a color of the object in accordance with outputs of said plurality of light metering systems;
   a compensation amount determining system that determines an exposure compensation amount in accordance with the color judged by said colorimetry system; and
   a controller that compensates the exposure amount determined by said exposure amount determining system in accordance with the determined exposure compensation amount;
   wherein said normal light metering system and each of said plurality of light metering systems have divided photometry areas, said exposure amount determining system and said compensation amount determining system respectively determining the exposure amount and the exposure compensation amount in accordance with a metering amount obtained for each of said divided photometry areas.

2. The photometry device according to claim 1, wherein said normal light metering system includes a normal light photometry sensor, having a peak sensitivity at a wavelength within a range from 500 nm through 600 nm; and
   wherein said plurality of light metering systems includes at least a first photometry sensor and a second photometry sensor, said first photometry sensor having a peak sensitivity on a shorter wavelength side with respect to the peak sensitivity of said normal light photometry sensor, and said second photometry sensor having a peak sensitivity on a longer wavelength side with respect to the peak sensitivity of said normal light photometry sensor.

3. The photometry device according to claim 1, wherein said said plurality of light metering systems includes:
   a blue light photometry sensor that meters blue light;
   a green light photometry sensor that meters green light; and
   a red light photometry sensor that meters red light.

4. The photometry device according to claim 1, wherein said colorimetry system judges at least yellow, blue and red from among yellow, magenta, cyan, blue, green and red, in accordance with the outputs of said plurality of photometry sensors; and
   wherein said compensation amount determining system calculates the exposure compensation amount in an over exposure side if the colorimetry system judges the color is yellow, and said compensation amount determining system calculates the exposure compensation amount in an under exposure side if the colorimetry system judges the color is blue or red.

5. The photometry device according to claim 4, wherein said compensation amount determining system calculates the compensation amount to be zero if the colorimetry system judges the color is magenta, cyan or green.

6. The photometry device according to claim 1, wherein said colorimetry system judges the color of the object at each of said divided photometry areas, and said compensation amount determining system determines the exposure compensation amount for each of said divided photometry areas.

7. The photometry device according to claim 6, wherein said exposure amount determining system determines an exposure compensation amount for the entire object by applying a predetermined calculation to the exposure compensation amounts obtained for each of said divided photometry areas.

8. The photometry device according to claim 3, wherein said normal light metering system and said plurality of light metering systems are arranged on an eyepiece optical system side of a pentagonal prism of a single lens reflex camera, at least said normal light metering system being arranged at an upper central portion of said pentagonal prism.

9. The photometry device according to claim 8, wherein, at the upper central portion of said pentagonal prism, said normal light metering system and said green light photometry sensor are arranged side by side, said blue light photometry sensor and said red light photometry sensor being arranged at a right portion and a left portion of said eyepiece optical system.

10. A photometry device for a camera, comprising:
    a plurality of light metering systems, comprising a green light photometry sensor that meters green light, a blue light photometry sensor that meters blue light and a red light photometry sensor that meters red light, the green light photometry senor further serving as a normal light metering system having spectral sensitivity characteristics close to visual sensitivity characteristics;
    an exposure amount determining system that determines an exposure amount of an object in accordance with an output of the normal light metering system;
    a colorimetry system that judges a color of the object in accordance with outputs of each of the plurality of light metering systems;
    a compensation amount determining system that determines an exposure compensation amount in accordance with the color judged by said colorimetry system; and
    a controller that compensates the exposure amount determined by said exposure amount determining system in accordance with the calculated exposure compensation amount.

11. The photometry device according to claim 10, wherein said plurality of light metering systems are arranged on an eyepiece optical system side of a pentagonal prism of a single lens reflex camera; and
    wherein said green light photometry sensor is arranged at an upper central portion of said pentagonal prism, said blue light photometry sensor is arranged at a right portion of the eyepiece optical system and said red light photometry sensor arranged at a left portion of the eyepiece optical system.

12. A photometry device for a camera, comprising:
    a normal light metering system having spectral sensitivity characteristics close to visual sensitivity characteristics, said normal light metering system dividing a photometry area into a plurality of areas and performing photometry for each of said plurality of areas;
    a plurality of light metering systems having spectral sensitivity characteristics that are different from the spectral sensitivity characteristics of said normal light metering system, each of said plurality of light metering system dividing a corresponding photometry area into a plurality of areas and performing photometry for each of said plurality of areas;

a brightness determining system that determines a brightness value of an object at each of said plurality of areas in accordance with an output of said normal light metering system;

a colorimetry system that judges a color of the object at each of said plurality of areas in accordance with outputs of said plurality of light metering systems;

a compensation amount determining system that determines a compensation amount of each brightness value for each of said plurality of areas, in accordance with the respective color of each of said plurality of areas judged by said colorimetry system;

a compensation system that compensates each brightness value of each of said plurality of areas, in accordance with the respectively determined compensation amount; and an exposure amount determining system that determines an exposure amount in accordance with the compensated brightness values.

13. The photometry device according to claim 12, wherein said normal light metering system includes a normal light photometry sensor, a spectral sensitivity characteristic of which has a peak sensitivity at a wavelength within a range from 500 nm through 600 nm; and wherein said plurality of light metering systems includes at least a first photometry sensor and a second photometry sensor, said first photometry sensor having a peak sensitivity of a spectral sensitivity characteristic on a shorter wavelength side with respect to the peak sensitivity of said normal light photometry sensor, and said second photometry sensor having a peak sensitivity of a spectral sensitivity characteristic on a longer wavelength side with respect to the peak sensitivity of said normal light photometry sensor.

14. The photometry device according to claim 12, wherein said plurality of light metering systems include:

a blue light photometry sensor that meters blue light;

a green light photometry sensor that meters green light; and a red light photometry sensor that meters red light.

15. The photometry device according to claim 14, wherein said colorimetry system judges at least yellow, blue and red from among yellow, magenta, cyan, blue, green and red, in accordance with the outputs of said plurality of light metering systems; and wherein said compensation amount determining system determines each compensation amount in an over exposure side if the colorimetry system judges the color is yellow, and determines each compensation amount in an under exposure side if the colorimetry system judges the color is blue or red.

16. The photometry device according to claim 15, wherein said compensation amount determining system determines that each compensation amount is zero if the colorimetry system judges the color is magenta, cyan or green.

17. The photometry device according to claim 12, wherein said exposure amount determining system determines the exposure amount by at least one of:

a. performing a divided photometry in accordance with a predetermined algorithm;

b. averaging the compensated brightness values for each of said plurality of areas, respectively;

c. performing a center-weighted averaging of the brightness values; and d. selecting one of the brightness values corresponding to each of said plurality of areas.

18. The photometry device according to claim 17, wherein said exposure amount determining system determines the exposure amount in accordance with the brightness values at a plurality of areas corresponding to areas at which focusing is performed.

19. The photometry device according to claim 17, wherein said at least one of the functions is selectable.

20. The photometry device according to claim 14, wherein said normal light metering system and said plurality of light metering systems are arranged on an eyepiece optical system side of a pentagonal prism of a single lens reflex camera, at least said normal light metering system being arranged at an upper central portion of said pentagonal prism.

21. The photometry device according to claim 20, wherein, at the upper central portion of said pentagonal prism, said normal light metering system and said green light photometry sensor are arranged side by side, said blue light photometry sensor and said red light photometry sensor being arranged at a right portion and a left portion of said eyepiece optical system.

22. The photometry device according to claim 14, wherein said green light photometry sensor further serves as said normal light metering system, and wherein an output of said green light photometry sensor is regarded as the output of the normal light metering system.

23. A photometry device for a camera, comprising:

a normal light metering system having spectral sensitivity characteristics close to visual sensitivity characteristics;

a first metering system, a spectral sensitivity characteristic of which has a peak sensitivity at a wavelength greater than 500 nm;

a second metering system, a spectral sensitivity characteristic of which has a peak sensitivity at a wavelength shorter than 500 nm;

a colorimetry system that determines a color of an object by comparing outputs of said first metering system and said second metering system;

a compensation amount determining system that determines a compensation value; and an exposure amount determining system that determines an exposure amount in accordance with an output of said normal light metering system and said compensation value.

24. The photometry device according to claim 23, wherein said first metering system further serves as said normal light metering system.

25. The photometry device according to claim 23, wherein a first color metered by said first metering system is a complement color to a second color metered by said second metering system.

26. The photometry device according to claim 23, wherein said first metering system includes a green light metering sensor that meters a green light component, and said second metering system includes a blue light metering sensor that meters a blue light component.

27. The photometry device according to claim 23, wherein said first metering system and said second metering system include:

photometry sensors having substantially the same characteristics; and optical filters arranged in front of said photometry sensors, respectively, said optical filters having the same spectral sensitivity characteristics as said first metering system and said second metering system, respectively.

28. The photometry device according to claim 23, further comprising a beam splitter that splits at least part of light passed through a photographing lens of said camera into a first beam and a second beam, a wavelength range of said first beam and a wavelength range of said second beam being different from each other, wherein said first metering system and said second metering system include photometry sensors having substantially the same characteristics, said first beam being incident on said first metering system, said second beam being incident on said second metering system.

29. The photometry device according to claim 23, wherein said normal light metering system, said first metering system and said second metering system receive light passed through a photographing lens of said camera, respectively.

30. The photometry device according to claim 29, further comprising a light source metering system that meters light of an external light source illuminating the object, the outputs of said first metering system and said second metering system being compensated in accordance with an output of said light source metering system.

31. The photometry device according to claim 23, wherein each of said normal light metering system, said first metering system and said second metering system comprises divided photometry areas, said colorimetry system determining the color of the object based on colors determined at each of said divided photometry areas, said compensation amount determining system determining compensation amounts of brightness values at each of said divided photometry areas, in accordance with the colors determined by said colorimetry system, and said exposure amount determining system compensating the brightness value at each of said photometry areas output by said normal light metering system in accordance with said compensation value, and determining the exposure amount in accordance with the compensated brightness values.

32. The photometry device according to claim 31, wherein said exposure amount determining system determines the exposure amount by at least one of:
  a. performing a divided photometry in accordance with a predetermined algorithm;
  b. averaging the compensated brightness values for said divided photometry areas, respectively;
  c. performing a center-weighted averaging of the brightness values of said divided photometry areas; and
  d. selecting one of the brightness values corresponding to said divided photometry areas.

33. The photometry device according to claim 32, wherein said exposure amount determining system determines the exposure value in accordance with the brightness values at a plurality of photometry areas corresponding to the areas at which focusing is performed.

34. The photometry device according to claim 32, wherein said at least one of the functions is selectable.

35. The photometry device according to claim 23, wherein said normal light metering system, said first metering system and said second metering system are arranged on an eyepiece optical system side of a pentagonal prism of a single lens reflex camera, at least said normal light metering system being arranged at an upper central portion of said pentagonal prism.

36. The photometry device according to claim 23, wherein said first and second metering systems are arranged at right-and-left portions, on an eyepiece optical system side of a trapezoidal prism of said camera.

* * * * *